(12) United States Patent
Licht et al.

(10) Patent No.: US 12,544,705 B2
(45) Date of Patent: Feb. 10, 2026

(54) METHOD AND APPARATUS FOR MAKING CARBON NANOMATERIALS AND METHODS USING LOW-LITHIUM ELECTROLYTES

(71) Applicant: C2CNT, LLC, Venice, FL (US)

(72) Inventors: Gad Licht, Venice, FL (US); Stuart Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

(21) Appl. No.: 18/812,169

(22) Filed: Aug. 22, 2024

(65) Prior Publication Data

US 2025/0073629 A1    Mar. 6, 2025

Related U.S. Application Data

(60) Provisional application No. 63/580,235, filed on Sep. 1, 2023.

(51) Int. Cl.
| | |
|---|---|
| *B01D 53/00* | (2006.01) |
| *C01F 3/02* | (2006.01) |
| *C25B 1/135* | (2021.01) |
| *C25B 15/08* | (2006.01) |
| *C25D 9/08* | (2006.01) |
| *C25D 21/02* | (2006.01) |

(52) U.S. Cl.
CPC ............. *B01D 53/00* (2013.01); *C01F 3/02* (2013.01); *C25B 1/135* (2021.01); *C25B 15/08* (2013.01); *C25D 9/08* (2013.01); *C25D 21/02* (2013.01); *B01D 2257/504* (2013.01)

(58) Field of Classification Search
CPC ......... B01D 53/00; C25B 1/135; C25B 15/08; C01F 3/02
See application file for complete search history.

(56) References Cited

U.S. PATENT DOCUMENTS

| | | |
|---|---|---|
| 2011/0100832 A1 | 5/2011 | Lubomirsky et al. |
| 2018/0044183 A1* | 2/2018 | Licht ............. C25B 11/061 |
| 2019/0039040 A1 | 2/2019 | Licht |
| 2020/0032404 A1 | 1/2020 | Licht |
| 2020/0378014 A1 | 12/2020 | Licht |
| 2021/0348282 A1 | 11/2021 | Licht |

FOREIGN PATENT DOCUMENTS

WO    2021087165 A1    5/2021

OTHER PUBLICATIONS

Duan et al., Proceedings of 28th Ann Int Pittsburgh Coal Conf., Sep. 12-15, 2011.*
Sasaki et al., ISIJ Int., (2012), 52(7), 1233-1240.*
Duan et al., Proceedings of 28th Ann Int Pittsburgh Coal Conf., Sep. 12-15, 2011. (previously provided).*
Sasaki et al., ISIJ Int., (2012), 52(7), 1233-1240. (previously provided).*
Li et al. "Carbon dioxide electrolysis and carbon deposition in alkaline-earth-carbonate-included molten salts electrolyzer", Aug. 15,m 2018, New Journal of Chemistry, 42, 14 pages.
Li et al. "Carbon Nanotubes Synthesis from CO2 Based on the Molten Salts Electrochemistry: Effect of Alkaline Earth Carbonate Additives on the Diameter of the Carbon Nanotubes" Jun. 11, 2019, Journal of the Electrochemical Society, 7 pages (2019).

* cited by examiner

*Primary Examiner* — Yong L Chu
(74) *Attorney, Agent, or Firm* — Chamberlain, Hrdlicka, White, Williams & Aughtry; Aly Z. Dossa

(57) ABSTRACT

The embodiments of the present disclosure relate to a method and compounds for capturing and releasing carbon dioxide. The method comprises heating, and/or pressurizing, or electrolyzing a carbon capture compound that comprises beryllium in order to reduce a carbon dioxide content of a carbon dioxide containing gas.

15 Claims, 26 Drawing Sheets

METHOD AND APPARATUS FOR MAKING CARBON NANOMATERIALS AND METHODS USING LOW-LITHIUM ELECTROLYTES

TECHNICAL FIELD

This disclosure generally relates to a method of using a compound that comprises beryllium carbonate. In particular, this disclosure relates to a method of capturing and releasing carbon dioxide using the compound.

BACKGROUND

Graphene nanocarbons (GNCs) are carbon nanomaterials with various shapes that retain the fundamental structure of graphene. Graphene is a two-dimensional, honeycomb-structured material formed by a single layer of $sp^2$ hybrid orbital carbon atoms with a thickness of about 0.335 nm, which corresponds to the thickness of one carbon atom. The graphene structure imparts remarkably high strength, and conductivity as well as solid lubricant, electronic, medical and catalytic activity properties. These properties may be accentuated or modified by building the graphene structure into different shapes (e.g., wrapping and stacking). GNCs have various morphologies including a single planar layer that is referred to as graphene, and multiple layered graphene, which are carbon nano-platelets. Both are 2D (two dimensional, planar symmetry) materials. The 0D graphene structure (with point symmetry) consists of concentric layer spheres of one or more spheres of graphene, and includes either solid (carbon nano-onion), or hollow (hollow carbon nano-onion) morphologies. Rather than being formed into a sphere, the graphene plane can be wrapped as a cylinder, and one or more concentric cylinders can then combine to form a carbon nanotube. The cylindrical, walled carbon nanotube structure further reinforces the high strength of graphene. Carbon nanotubes (CNTs) have the highest measured tensile strength (strength 93,900 MPa) of any material. Multi-walled CNTs consist of concentric walls of cylindrical graphene sheets. Concentric cylinders are examples of 1D (linear) symmetry. Nano-scaffolds are an example of 3D GNCs in which multilayered graphene is stacked at sharp angles in an open structure.

CNTs have many useful properties including high electrical-conductivity, high thermal-conductivity, flexibility, and they can be chemically modified. The implication of these useful properties is that CNTs have had a steady rise in their applications. For example, low (typically much less than 1%) concentrations of CNTs in structural materials can increase the strength of a range of structural materials such as cement, steel, and aluminum. Because each of these materials can have a high carbon-footprint, a carbon composite with increased strength that requires less material may dramatically decrease the carbon-footprint.

A known process by which CNTs are produced is chemical vapor deposition (CVD). However, CVD of CNTs is expensive and has a high carbon-footprint.

In addition to chemical vapor deposition (CVD), electrolysis reactions that use carbon dioxide ($CO_2$) and a lithium-carbonate electrolyte are also known processes for making CNTs. These electrolysis reactions may employ electrolysis potentials of less than 1 volt for splitting $CO_2$ in molten lithium-carbonate solutions to produce uniform CNTs and a carbon nanofiber product at high coulombic efficiency. The $CO_2$ from the atmosphere can be directly converted to CNTs, as confirmed by isotope ($^{13}C$) tracking. The electrolytic splitting of $CO_2$ in molten lithium-carbonate can occur as direct carbon capture and conversion from the air without $CO_2$ pre-concentration, or with exhaust gas $CO_2$, or with concentrated $CO_2$.

These known electrolysis reactions have typically demonstrated when using carbonate electrolytes that include lithium such as pure molten lithium carbonate ($Li_2CO_3$, with a melting point of about 723° C.), or an electrolyte with a substantial fraction of $Li_2CO_3$ mixed with other carbonates such as sodium carbonate ($Na_2CO_3$), potassium carbonate ($K_2CO_3$), magnesium carbonate ($MgCO_3$), calcium carbonate ($CaCO_3$), barium carbonate ($BaCO_3$) or $Li_2CO_3$ mixed with other salts including oxides, borates, sulfates, phosphates or nitrates. It was generally assumed that lithium cations might be a necessary component to make CNTs using molten carbonates and $CO_2$ in an electrolysis reaction. However, the cost of lithium generally results in a high cost of operating these electrolytic reactions and, therefore, further methods and systems for producing graphitic carbon nanomaterials are desirable.

$Li_2CO_3$ is expensive, and this is in part due to the competitive demand of $Li_2CO_3$, in particular for use in the preparation of Li-ion batteries for the growing electronic vehicle (EV) market. Global $Li_2CO_3$ prices in 2022 to 2023 have increased and vacillated in the range of $25,000 to $75,000 per tonne. These elevated prices present a cost constraint to the alternative use of $Li_2CO_3$ as a molten electrolyte in the electrolytic transformation of $Li_2CO_3$ to GNCs. Alternatively, $Na_2CO_3$ and $K_2CO_3$ are available at a much lower global cost of less than $2,000 per tonne. However, even low-level additions of these alternative carbonates, to replace some of the $Li_2CO_3$, substantially disfigures the morphology of the GNCs.

SUMMARY

The embodiments of the present disclosure relate to a method and compound for reducing the carbon dioxide content of a gas that contains carbon dioxide.

Some embodiments relate to a method for capturing and releasing carbon dioxide, the method comprising the steps of: heating a beryllium carbonate and/or beryllium oxide containing compound to form a lower carbon dioxide content compound and releasing a first carbon dioxide containing gas. The method further comprises a step of cooling the lower carbon dioxide content compound in a presence of a second carbon dioxide containing gas to reform the beryllium carbonate containing compound and cycling the two previous steps to capture carbon dioxide from the second carbon dioxide containing gas. The first carbon dioxide containing gas has a higher carbon dioxide content than the second carbon dioxide containing gas.

Other embodiments of the present disclosure relate to a method for capturing and releasing carbon dioxide, the method comprising the steps of: depressuring (decreasing pressure of) a beryllium carbonate containing compound to form a lower carbon dioxide content compound and releasing a first carbon dioxide containing gas. The method further comprises a step of pressurizing the lower carbon dioxide content compound in the presence of a second carbon dioxide containing gas to reform the beryllium carbonate containing compound. The two prior steps are cycled to capture carbon dioxide from a carbon dioxide containing gas. The first carbon dioxide containing gas has a higher carbon dioxide content than the second carbon dioxide containing gas. A further embodiment comprises heating and depressuring a beryllium carbonate and/or beryllium oxide containing compound to form a lower carbon dioxide content compound and releasing a first carbon dioxide containing gas. The method further comprises a step of cooling the lower carbon dioxide content compound in a presence of a second carbon dioxide containing gas to reform the beryllium carbonate containing compound and cycling the two previous steps to capture carbon dioxide from the second carbon dioxide containing gas. The first carbon dioxide containing gas has a higher carbon dioxide content than the second carbon dioxide containing gas.

Some embodiments of the present disclosure relate to a beryllium carbonate containing compound that can be used as a carbon capture and release compound. In some embodiments of the present disclosure, the compound comprises $xBeO \cdot y(BeCO_3)$ wherein x is 0 or higher than 0 and wherein y is greater than 0.

In some embodiments of the present disclosure, the beryllium carbonate containing compound comprises an alkali carbonate, an alkali earth carbonate or any combination thereof.

In some embodiments of the present disclosure, the beryllium carbonate containing compound comprises a salt that comprises one or more elements from column 4, 5, 6 or 7 from the periodic table of elements.

In some embodiments of the present disclosure, the beryllium carbonate containing compound is a binary, ternary, quaternary or higher component mix of beryllium carbonate or beryllium oxide with at least one of an alkali carbonate, an alkali earth carbonate, or a salt that comprises an element from column 4, 5, 6 or 7 of the table of periodic elements.

In other embodiments of the present disclosure, beryllium carbonate containing compounds can lower the melting point of other alkali/alkali earth carbonates useful for molten carbonate electrolysis.

Without being bound by any particular theory, the beryllium carbonate containing compound may have a lower melting point than another compound that lacks beryllium carbonate. This lower melting point may allow the beryllium carbonate containing compound to capture and release carbon dioxide in an energy efficient manner by altering the temperature and/or pressure of the environment in which the compound resides.

BRIEF DESCRIPTION OF THE DRAWINGS

These and other features of the present disclosure will become more apparent in the following detailed description in which reference is made to the appended drawings.

DETAILED DESCRIPTION

Figure 1:
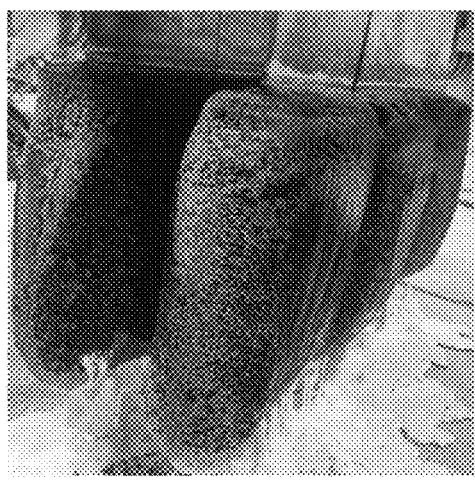
FIG. 1 Left panel: an extracted cathode after the electrolysis of $CO_2$ in a pure 750° C. $Li_2CO_3$ electrolyte. In the middle and right panels SEM image of the washed carbon nanotube product are shown at a magnification of ×710 and ×2250, respectively.
Figure 1:
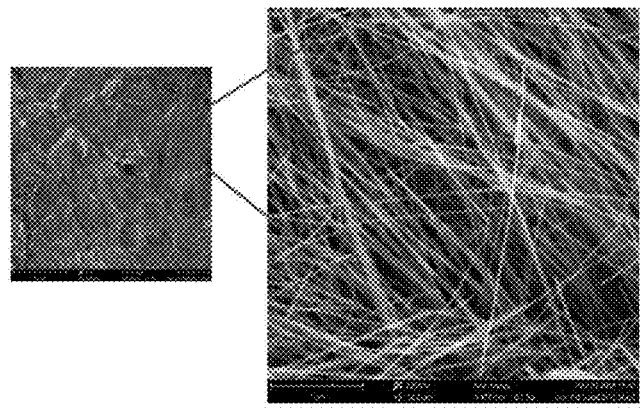

The embodiments of the present disclosure relate to methods and apparatus for producing a graphene nanocarbon (GNC) product that comprises graphitic carbon nanostructures, such as carbon nanotubes (CNTs), carbon nano-onions (CNOs) and other carbon nanostructures. The methods and apparatus employ carbon dioxide ($CO_2$) as a reactant in an electrolysis reaction in order to make the GNC product. The embodiments of the present disclosure employ an electrolyte that has low-lithium, referred to herein as a low-lithium electrolyte.

Some embodiments of the present disclosure relate to methods that employ an electrolysis reaction for making a GNC product. The electrolysis reaction occurs in an environment with a molten, low-lithium electrolyte that is positioned between an anode and a cathode. Carbon is introduced into the molten electrolyte, as either pure $CO_2$, concentrated $CO_2$, $CO_2$ that is entrained in atmospheric air, another carbon-containing gas or other anthropogenic sources of $CO_2$.

Some embodiments of the present disclosure relate to an apparatus and a system that employs the apparatus. The apparatus comprises an electrolytic cell that includes an anode and a cathode. In some embodiments of the present disclosure, the anode and cathode are arranged vertically spaced apart from each other.

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

As used herein, the expression "low-lithium" means a low content of lithium such as when small amounts of lithium may be present, or when no detectable amounts of lithium are present. In some embodiment of the present disclosure, a "low-lithium carbonate electrolyte" is used to refer to a carbonate electrolyte that has less lithium present than a carbonate electrolyte that has lithium carbonate alone. For clarity the expression "low-lithium carbonate electrolyte", is used here to refer to an electrolyte in which the lithium content is greater than about 5% on a weight basis (wt %) and less than about 100% wt % of the entire mixture. For clarity, the expressions "lithium-free carbonate electrolyte", and "predominantly non-lithium electrolyte" are used here in to refer to an electrolyte in which there is no detectable amount of lithium or where a small amount of lithium is present when the electrolyte is a mixture and the lithium-containing component forms less than about 5% wt % of the entire mixture or less than about 4 wt %, less than about 3 wt %, less than about 2 wt %, less than about 1 wt %, less than about 0.5 wt %, less than about 0.25 wt %, less than about 0.1 wt %, less than about 0.05 wt %, or less than about 0.025 wt % or less than about 0.01 wt % of the entire mixture.

Embodiments of the present disclosure will now be described and include references to the Examples and the figures.

Some embodiments of the present disclosure relate to a method for producing a GNC product that comprises CNTs. The method comprises the steps of heating a low-lithium carbonate electrolyte to obtain a molten, low-lithium carbonate electrolyte; positioning the molten, low-lithium carbonate electrolyte between an anode and a cathode in an electrolytic cell; applying an electrical current to the cathode and the anode in the electrolytic cell; and, collecting a GNC product from the cathode. In some embodiments of the present disclosure, the method further comprises a step of employing one or more non-lithium GNC facilitation elements and/or a step of introducing a graphene-defect agent into the low-lithium carbonate electrolyte, either before the heating step or after. In some embodiments of the present disclosure, the GNC product is doped or magnetic or not.

The step of heating the low-lithium carbonate electrolyte can be achieved by various approaches, as would be appreciated by the skilled reader. For example, a heating apparatus such as an oven or furnace can be used to heat the electrolyte to a sufficient temperature so that it transitions into a molten, liquid state. As such, any heating apparatus that can achieve the temperatures required to heat the electrolyte to its melting point are contemplated herein.

In some embodiments of the present disclosure, the low-lithium electrolyte can be a binary mixture, a ternary mixture, or a mixture of more than three components. For example, the binary mixture may comprise two components selected from: lithium carbonate, and either strontium carbonate, or strontium oxide, or any other strontium salt. A ternary mixture may comprise lithium carbonates, low-lithium carbonates or oxides, and a graphene-defect agent. A more complex mixture may include substances to dope products, enhance thermal or electrical properties of electrolyte, or in other way modify the electrolyte or product.

Without being bound by any particular theory, the reduction of $CO_2$ in a lithiated or strontiated carbonate electrolyte is a 4e" process that proceeds in accordance with Equation 1A or 1B (EQN. 1A or 1B):

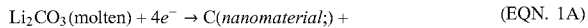
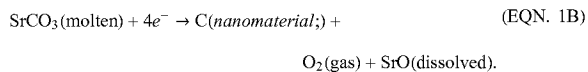

$$Li_2CO_3(\text{molten}) + 4e^- \rightarrow C(nanomaterial;) + \qquad \text{(EQN. 1A)}$$
$$O_2(\text{gas}) + Li_2O(\text{dissolved}).$$

$$SrCO_3(\text{molten}) + 4e^- \rightarrow C(nanomaterial;) + \qquad \text{(EQN. 1B)}$$
$$O_2(\text{gas}) + SrO(\text{dissolved}).$$

Without being bound by any particular theory, $CO_2$ added to the electrolyte chemically reacts with lithium oxide to renew and reform $Li_2CO_3$ in accordance with Equation 2A or 2B (EQN. 2A or 2B):

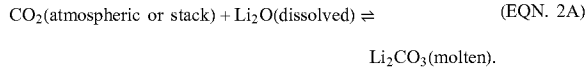
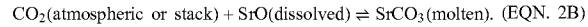

$$CO_2(\text{atmospheric or stack}) + Li_2O(\text{dissolved}) \rightleftharpoons \qquad \text{(EQN. 2A)}$$
$$Li_2CO_3(\text{molten}).$$

$$CO_2(\text{atmospheric or stack}) + SrO(\text{dissolved}) \rightleftharpoons SrCO_3(\text{molten}). \quad \text{(EQN. 2B)}$$

Without being bound by any particular theory, when EQN. 1A or 1B is combined with EQN. 2A or 2B yields a net electrolysis reaction, in accordance with Equation 3 (EQN. 3):

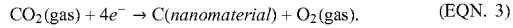

$$CO_2(\text{gas}) + 4e^- \rightarrow C(nanomaterial) + O_2(\text{gas}). \qquad \text{(EQN. 3)}$$

Without being bound by any particular theory, at temperatures higher than about 800° C., a two, rather four, electron reduction can increasingly dominate, and by about 950° C., the electrolysis product is pure carbon monoxide, rather than carbon, in accordance with Equation 4 (EQN. 4):

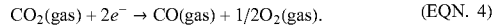

$$CO_2(\text{gas}) + 2e^- \rightarrow CO(\text{gas}) + 1/2O_2(\text{gas}). \qquad \text{(EQN. 4)}$$

A ternary Li, Na, and K carbonate eutectic mixture has a melting point below 400° C. The potassium component of the electrolyte has been observed to inhibit carbon nanomaterial formation and, as such, under some conditions potassium may not be a desirable component of the low-lithium carbonate electrolyte. Below about 600° C. the electrolysis reaction products in the ternary carbonate electrolyte are largely amorphous carbon and platelets arranged in a 1 to 2 µm "honeycombed" morphology. Above about 600° C. the electrolysis carbon product increasingly exhibits a mix of GNC products.

Without being bound by any particular theory, the embodiments of the present disclosure relate to electrolytes that facilitate GNC formation including: (i) low-lithium agents that include non-lithium salts including, but not limited to: strontium carbonate, beryllium carbonate, sodium carbonate, calcium carbonate, barium carbonate and oxides, such as strontium oxide, barium oxide, beryllium oxide, sodium oxide, calcium oxide, iron oxide, cobalt oxide, lithium oxide or any combination thereof (to allow carbon nanomaterials to form); (ii) molten and stable between about 700° C. and about 850° C.; (iii) able to readily dissolve oxides; and, (iv) inexpensive as compared to lithium carbonate. Strontium carbonate has a high melting point of about 1494° C. Strontium carbonate and strontium salts are an order of magnitude less expensive than lithium carbonate.

The molten electrolyte is then positioned between an anode and a cathode within an electrolytic cell. The electrolytic cell may be any type of vessel that can maintain its structural integrity in the face of the electrochemical environment that occurs during the electrolysis reactions of the present disclosure. The electrolytic cell may have one or more walls that may be made of a desired material or that are coated with a desired material that will not degrade in the environment of the electrolysis reaction. In some embodiments of the present disclosure, the electrolytic cell is made of substantially pure alumina. In some embodiments of the present disclosure, the electrolytic cell is a tubular vessel with a closed end.

In some embodiments of the present disclosure, the electrolyte mixture may be melted inside the electrolytic cell or it may be melted outside the cell and transferred thereto. Because the electrolysis reaction will typically occur over a time period whereby the molten electrolyte could cool, the electrolytic cell can be configured with its own integral heating apparatus, such as an integral heater, or it may be configured to be heated by an external heater that is external to the electrolytic cell so that the electrolyte is maintained in the molten state for the desire period of time.

In some embodiments of the present disclosure, the electrolytic cell may be configured to maintain the electrolyte at least at about 650° C., at least at about 675° C., at least at about 700° C., at least at about 725° C., at least at about 750° C., at least at about 775° C., at least at about 800° C., at least at about 825° C., at least at about 850° C., at least at about 875° C., at least at about 900° C., at least at about 1000° C. or greater than about 1000° C.

The anode can be made of various metals or alloys. Some anodes can be made of materials that comprise nickel. Some non-limiting examples of suitable materials for the anodes of the present disclosure include: substantially pure nickel, an alloy that is comprised of substantially mostly nickel, an alloy that is comprised of some nickel. For example, stainless steel 304 or stainless steel 306 or other stainless steels, Inconel 718 or other Inconels, such as, but not limited to Inconel 600 and Inconel 625, Nichrome A (composed of about 80% nickel and about 20% chromium), Nichrome C (composed of nickel, iron and chromium), Incoloy alloy (such as Incoloy 800 composed of about 40% iron, about 30-35% nickel and about 19-23% chromium).

The anode may be planar in shape and it can be made of various dimensions. In some embodiments of the present disclosure, the anode may be made of wire that is rolled into a substantially flat coil with an upper face and a lower face. The upper and lower faces of the coiled anode may have substantially equal areas that are suitable for fitting within the electrolytic cell. In some embodiments, the coiled anode faces have an area that is between about 1 cm² and about 20 cm²; between about 2 cm² and 10 cm²; or between about 3 cm² and about 5 cm². The skilled person will appreciate that the size of the electrolytic cell may dictate the size of the coiled anode. The coiled anode may be arranged to be generally aligned with a horizontal plane. In some embodiments of the present disclosure, the walls of the electrolytic cell may be made of or lined with a material that acts as an anode.

The cathode can be made of various metals or alloys. Some cathodes can be made of materials that comprise steel, galvanized steel, copper, or any combinations thereof. Some further non-limiting examples of suitable materials for the cathodes of the present disclosure include: copper alloys such as Monel, $Cu_2O_2$, and Cu708, bronze and brass, such as Muntz Brass.

The cathode may be planar in shape and can be made of various dimensions. In some embodiments of the present disclosure, the cathode may be made of wire that is rolled into a flat coil with an upper face and a lower face. The upper and lower faces of the coiled cathode may have substantially equal areas that are suitable for fitting within the electrolytic cell. In some embodiments, the coiled cathode faces have an area that is between about 1 $cm^2$ and about 20 $cm^2$; between about 2 $cm^2$ and 10 $cm^2$; or between about 3 $cm^2$ and about 5 $cm^2$. The skilled person will appreciate that the size of the electrolytic cell may dictate the size of the coiled cathode. The coiled cathode may be arranged to be generally aligned with a horizontal plane.

In some embodiments of the present disclosure, the size and orientation of the cathode can be selected to substantially mirror the size and orientation of the anode. In some embodiments of the present disclosure, the anode and the cathode may be generally aligned with a horizontal plane and vertically spaced apart from each other. As the skilled person will appreciate, the distance between the electrodes must permit the passage of sufficient electric current therebetween but the amperage of the electric current and the size of the electrolytic cell may also influence how far apart the electrodes are vertically spaced apart. In some embodiments of the present disclosure, the electrodes may be vertically spaced apart from each other by about 0.25 cm, about 0.5 cm, about. 0.75 cm, about 1 cm, about 1.25 cm, about 1.5 cm, about 1.75 cm, about 2 cm, about 3 cm, about 4 cm, about 5 cm, about 7.5 cm, about 10 cm or further.

In order to initiate and maintain the electrolysis reaction within the electrolytic cell, an electric current is supplied from a source of electric current and while the current is applied, it passes between the anode and cathode via the molten electrolyte therebetween. In some embodiments of the present disclosure, the electric current may be an alternating current or a direct current. In some embodiments of the present disclosure, the current may be between about 0.01 amps (A) and about 5 A. In some embodiments of the present disclosure, the current may be between about 0.025 A and about 4 A; between about 0.05 A and about 3 A; between about 0.075 A and about 2 A; between about 0.1 A and about 1 A. In some embodiments of the present disclosure the current is about 0.5 A.

In some embodiments of the present disclosure, the current is applied at a substantially constant current density. For example, the current density of the applied current may be between about 0.01 $A/cm^2$ and about 1 $A/cm^2$. In some embodiments of the present disclosure, the current density of the applied current may be between about 0.025 $A/cm^2$ and about 0.75 $A/cm^2$; between about 0.05 $A/cm^2$ and about 0.5 $A/cm^2$; between about 0.075 $A/cm^2$ and about 0.25 $A/cm^2$; or between about 0.01 $A/cm^2$ and about 0.1 $A/cm^2$. In some embodiments of the present disclosure, the current density is about 0.1 $A/cm^2$. In some embodiments of the present disclosure, an initial lower current density is used to control conductivity during formation of the GNC product and a second higher current density is used to facilitate growth of the GNC product.

In some embodiments of the present disclosure, the method further comprises the step of employing one or more non-lithium GNC facilitation elements. In some embodiments of the present disclosure, the one or more non-lithium GNC facilitation elements may comprise: (i) adding a non-lithium salt, such as but not limited to: a strontium salt, a beryllium salt, a sodium salt, a calcium salt, a barium salt, a radium salt, (ii) enhancing transition metal nucleation, iii) adding one or more defect inducing agents, (iv) reducing or removing an electrolyte conductivity impediment element, and (v) any combination thereof.

In some embodiments of the present disclosure, the step of enhancing transition metal nucleation may comprise adding a transition metal nucleating agent to the low-lithium electrolyte, either before, during or after the heating step. In some embodiments, the transition metal oxide may be iron oxide ($Fe_2O_3$), chromium oxide ($Cr_2O_3$), or a combination thereof. In a particular embodiment, the transition metal nucleating agent is $Fe_2O_3$. In some embodiments, the transition metal nucleating agent may be a transition metal salt of one or more of an iron, chromium, nickel, copper, manganese, titanium, zirconium, molybdenum, tantalum, tungsten, silver, cadmium, tin, ruthenium, vanadium, or cobalt salt. In some embodiments, the transition metal nucleating agent may be a transition metal oxide.

In some embodiments of the present disclosure, the step of adding one or more defect inducing agents comprises a step of introducing a graphene-defect agent into the low-lithium carbonate electrolyte, either before, during or after the heating step. This adding step can be achieved by various approaches, depending on what the nature of the graphene-defect agent is. For example, the graphene-defect agent may be a chemical, a mechanical element, an optical element, a physical element or any combination thereof that induces graphene defects and/or graphene vacancies in graphitic structures of the GNC product. This step of introducing the graphene-defect agent into the low-lithium carbonate electrolyte can occur before, during or after the low-lithium carbonate electrolyte is heated to a molten state.

In some embodiments of the present disclosure, the graphene defects are localized within a graphene component of the graphitic carbon nanostructures within the GNC product and the defects are intrinsic, extrinsic or any combination thereof.

Examples of intrinsic graphene defects are Stone-Wales defects, single vacancy defects, multiple vacancy defects, line defects, the inclusion of carbon adatoms or any combination thereof.

Examples of extrinsic graphene-defects are the inclusion of foreign adatoms or substitutional impurities.

In adatom defects, oxygen may attach to the surface of the CNT or other carbon nanomaterials and disrupt the bonding, or may replace carbon in the structure itself.

In some embodiments of the present disclosure, the graphene-defect agent is an oxide. The oxide may be introduced into the low-lithium carbonate electrolyte by adding a chemical oxide, by a chemical reaction caused by a change in the temperature of the molten carbonate electrolyte, by degradation of the electrodes, by oxidation of the anode or any combination thereof.

Suitable examples of chemical oxides that may be added into the low-lithium carbonate electrolyte include, but are not limited to: an alkali oxide, an alkali earth oxide, a metal oxide, a non-metal oxide or any combination thereof. In some embodiments of the present disclosure, one or more oxides may be added to the low-carbonate electrolyte, including but not limited to: strontium oxide (SrO), sodium oxide ($Na_2O$), barium oxide (BaO), beryllium oxide (BeO), calcium oxide (CaO), aluminum oxide ($Al_2O_3$) or any combination thereof. Combinations may also be added as reorganized oxide salts, for example, without being limited to, sodium or barium aluminate. In some embodiments of the present disclosure, the oxide is one or more of barium oxide, sodium oxide or calcium oxide. In some embodiments of the present disclosure, the oxide is iron or cobalt oxide. In some embodiments of the present disclosure, the oxide is lithium oxide at about 5 percent or less concentration.

Figure 2:
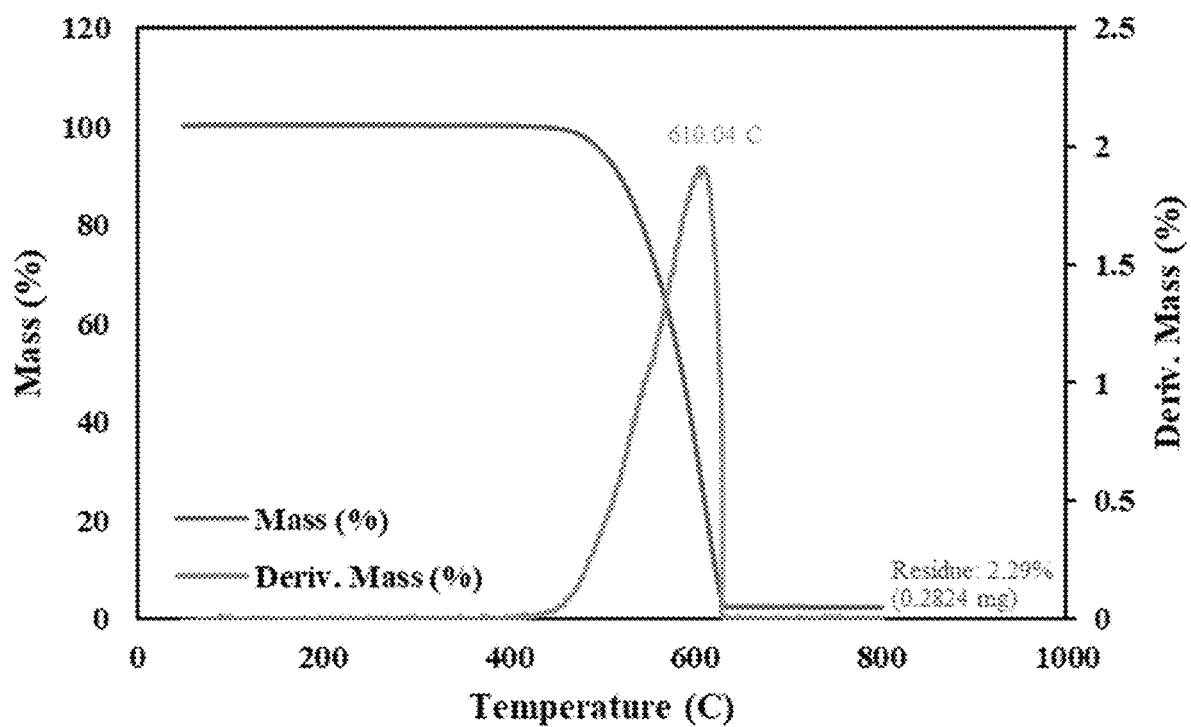
FIG. 2 shows thermogravimetric analysis (TGA) analysis of the FIG. 1 electrolysis product.

In the process of a $CO_2$ molten carbonate electrolysis reaction, small transition metal "seeds" have been observed at the ends of the CNT product, and it was shown that the mechanism of molten carbonate CNT growth may be activated by both tip and root transition metal nucleation processes by use of transition metals as nucleating agents. Without being bound to any particular theory, the mechanistic concept that graphene defects or vacancies may facilitate CNT growth in low-lithium molten carbonate electrolytes can be seen in FIG. 2. In FIG. 2A, the catalyst tip can move along with the CNT growth. In FIG. 2B, the catalyst is at the stationary root or base from which the CNT grows. SEM evidence of both tip and root growth CNT has been observed. FIG. 2 shows two schematics that represent proposed carbon nanotube (CNT) growth mechanisms upon a cathode during a carbon dioxide ($CO_2$) electrolysis reaction, wherein FIG. 2A shows a $CO_2 \rightarrow CNT+O_2$ electrolysis tip growth mechanism and FIG. 2B shows $CO_2 \rightarrow CNT+O_2$ a root growth mechanism. The top arrow 202 of FIG. 2A represents $CO_2$ dissolution reaction in molten carbonate represented by the equation: $CO_2 \text{ (gas)} + M_2O_{(dissolved)} \rightarrow 2M^+_{(molten)} + CO_3^{2-}_{(molten)}$. The arrow 204 represents the net cathode reaction, represented by the equation: $2M^+ + CO_3^{2-} + 4e^- \rightarrow C + M_2O + 2O^{2-}$. The arrow 206 represents the net anode reaction, represented by the equation: $2O^{2-} \rightarrow O_2 + 4e^-$. For both FIG. 2A and FIG. 2B, there are $sp^3$ oxide induced graphene defects, wherein low $M=Li^+$; and high $M=Li^+$ or $Na^+$. For FIG. 2A, the metal catalyst 210 is at the tip of the CNT cylindrical graphene walls 208 of a carbon nanotube 210, which is above a layered graphene 218. For FIG. 2B, the metal catalyst 210 is at the bottom of the CNT cylindrical graphene walls 208 of a carbon nanotube 210, closer to the cathode 216. In both FIG. 2A and FIG. 2B, the growth direction is represented by arrow 214 and the double arrows 218 pointing upwards represent $4e^-$.

Without being bound by any particular theory, the carbonate species, generated from the continuous $CO_2$ renewal of the low-lithium carbonate electrolyte provide the ongoing carbon building blocks of CNT walls, and the carbonate reduction to carbon occurs at a metal catalyst interface with the growing CNT cylindrical graphene walls. However, carbonate must have easy access not only to the interface with the outer CNT walls, but also to interface with the inner CNT walls. Carbonate movement to the interior of the growing carbon nanotube may be inhibited by charge buildup. This charge buildup may be reduced if cations also have easy access to the interior walls. The lithium cation is a small cation, and requires relatively few defects or vacancies in the growing cylindrical carbon nanotube walls to access the interior regions of the CNT. However, a higher number of defects is required to facilitate ions larger than lithium cations to transfer through the CNT walls. A higher number of defects may be accomplished through the addition of a graphene-defect agent. This is, at least part of, the basis upon which the embodiments of the present disclosure were developed to grow a GNC product by $CO_2$ electrolysis in low-lithium carbonate electrolyte(s).

The use of an electrolyte that is a binary mixture (for example, strontium carbonate/lithium carbonate or strontium oxide/lithium carbonate), and/or an electrolyte that is a ternary mixture (for example, strontium/sodium/lithium carbonate), and/or has more components and that can provide an electrolyte melting point within the optimal range for $CO_2$ to carbon nanomaterial growth of between about 700° C. to about 850° C. Low-lithium electrolysis may be performed using a planar, rather than a coiled, and brass, rather than Monel, cathode without substantially affecting low-lithium CNT growth.

In the embodiments of the present disclosure, the electrolyte is a mixture of at least one non-lithium salt and optionally a lithium salt to form the low-lithium carbonate electrolyte. $SrCO_3$ is available at a more stable global price of approximately $1,500 per tonne; a cost that is 1 to 2 orders of magnitude less than $Li_2CO_3$. Strontium is the tenth most abundant metal in the earth's core, while lithium is known to be twenty-fourth most abundant. Strontium carbonate is widely mined, and refined as strontium sulfate or carbonate. Formerly, strontium carbonate was used in glass compositions for television and cathode ray devices, but is not used in today's flat screens. Today strontium is used in pyrotechnics, and applications including some ceramics, ferrite magnets, superconductors, biomaterials, chemical sensors, and catalysts. It is also used to protect certain magnesium alloys against corrosion and in specialized cement compositions.

Because strontium carbonate and strontium oxide are substantially less expensive than comparable lithium-carbonate based electrolytes and because strontium is widely available, strontium salts are suitable candidates for making a low-lithium carbonate salt. However, strontium carbonate ($SrCO_3$) is solid at 1494° C., which is too high for $CO_2$ electrolysis to synthesize solid GNC products. The inventors have demonstrated that temperatures below 800° C. are suitable for $CO_2$ molten carbonate electrolysis. At higher temperatures, carbon monoxide gas increasingly forms, and the product is pure carbon monoxide gas by 950° C. Carbon monoxide is not preferred as a decomposition product because its main use is as an oxidant, and in that use the carbon monoxide returns $CO_2$ to the atmosphere. Alternatively, GNCs retain the high (geologic stability) of the mineral graphite to sequester the $CO_2$.

Beryllium carbonate ($BeCO_3$) is another non-lithium salt that can be used to make a low-lithium carbonate electrolyte mixture that is useful with the embodiments of the present disclosure. Beryllium carbonate has anomalous physical chemical characteristics compared to the alkali and alkali earth carbonates, both in its very low 54° C. melting point, and its release of $CO_2$ to form beryllium oxide, beryllium carbonate only loosely binds carbon dioxide. At room temperature beryllium carbonate (solid $BeCO_3$) is often stored under a blanket of $CO_2$ gas to prevent its decomposition), beryllium oxide is the lightest weight oxide (other than water), and lithium and beryllium oxide have among the highest carbon capture storage capacities (as moles $CO_2$ storable per kg oxide), in the reverse equilibrium of EQN 5, for example with M as Be or Li:

$$CO_2 + MO \rightleftharpoons MCO_3 \qquad \text{(EQN. 5)}$$

It was observed that beryllium oxide or beryllium carbonate can substantially decrease the melting point of strontium carbonate mixes or other alkali or alkali earth carbonates used alone or in combination. As one example, a eutectic mix of lithium, sodium and potassium carbonate is known to have a very low melting point (compared to the minimum melting point of over 700° C. of their pure carbonates) of approximately 394 to 399° C., which can be lowered by the addition beryllium carbonate or beryllium oxide.

In some embodiments of the present disclosure, the GNC product made according to the methods, apparatus and systems described herein above, may result in a doped GNC product. Without being bound by any particular theory, if a doping component, also referred to as a dopant, is introduced into the method, apparatus or system, then atoms of the dopant may be directly incorporated into various of the graphitic structures of the GNC product. When atoms of the doping component are directly introduced into the GNC product, as it is being built in situ upon the cathode, the resulting doped GNC product has desired chemical physical properties that are different than a GNC product (a non-doped GNC product) that does not include atoms of the doping component. Without being bound by any particular theory, the doping component may include at least one material with a group IIIA element, a non-carbon group IVA element, a group VA element, a group VIA chalcogenide element, or at least one material with gold, platinum, iridium, iron or other row 4, 5, or 6 metals. In some embodiments of the present disclosure, the doping component comprises: a chemical species with oxygen atoms, halide atoms, one or more of nitrate, a phosphate, a thiophosphate, a silicate, a thionyl chloride, a sulfur chloride, a silicon chloride, a thiophosphate, a thionyl nitrate, a silicon nitrate, a silicon nitrite, a sulfur oxide and a nitrous oxide gas. Without being bound by any particular theory, the desired chemical properties of the doped GNC product may include: a greater electrical conductivity (as compared to a non-doped GNC product), enhanced electrical charge storage (as compared to a non-doped GNC product), a heterogenous catalytic property, a homogeneous catalytic property, a fuel cell catalytic property, an aerobic oxidation catalytic property, an enhanced reaction activity property and any combination thereof. The desired physical chemical properties of the doped GNC product made according to the embodiments of the present disclosure may have a wide variety of applications, such as: catalysts, heavy metal removal, energy storage, sorption applications, batteries, ultra-sensitive sensors and combinations thereof. For clarity, transition metals that are used as a nucleating agent during the initial root or tip growth phase of making the carbon nanostructures constituent within the GNC product are either not the type of chemical element that will impart the desired chemical properties to the constituent structures of the GNC product or they are not used in a sufficient amount so as to impart the desired chemical properties.

In some embodiments of the present disclosure, the GNC product made according to the methods, apparatus and systems described herein above, may result in a magnetic GNC product. For clarity, a magnetic GNC product is includes magnetic carbon nanostructures as constituent structures where some, most or substantially all of such constituent carbon nanostructures contain a sufficient amount of magnetic chemical elements so as to be physically movable with a magnetic field. For example, the movability in response to a magnetic field may be due to the increased presence of magnetic chemical elements positioned within individual carbon nanostructures that are constituent within the GNC product, where such presence extends substantially throughout each carbon nanostructure. This substantial extension throughout each carbon nanostructure is in contrast with the presence of nucleation agents, such as a transition metal, that facilitates the initial root or tip growth of a given carbon nanostructure within the GNC product. For clarity, transition metal nucleating agents may be useful in contributing towards making magnetic carbon nanostructures but such nucleating agents alone are insufficient in making magnetic carbon nanostructures as they do not impart a sufficient amount of magnetic chemical elements into the carbon nanostructures. Without being bound by any particular theory, if a magnetic additive component, is introduced into the method, apparatus or system, then growth of various carbon nanostructures within the magnetic GNC product occurs. In some embodiments of the present disclosure, the magnetic additive component comprises at least one of a magnetic material addition component, a carbide-growth component and any combination thereof. In some embodiments of the present disclosure, the magnetic material addition component is wherein the magnetic material additive component is one or more of iron, nickel, cobalt, gadolinium, samarium, neodymium, steel and alloys comprising one or more magnetic materials with ferromagnetic properties, paramagnetic properties, diamagnetic properties and any combination thereof. In some embodiments of the present disclosure, the iron-based additive is one or more of cast iron powder, iron metal, steel, stainless steel, an iron containing metal alloy, an iron oxide, FeO, $Fe_2O_3$, $Fe_3O_4$, or an iron containing salt. Within the magnetic GNC product, the magnetic additive component is incorporated or formed as one or more nodules, that may be covered in one or more layers of graphitic carbon, on the magnetic GNC product. In some embodiments of the present disclosure, the carbide-growth component may be a metal carbide, such as: iron carbide, a nickel carbide, a cobalt carbide; a zirconium carbide, a chromium carbide, a tantalum carbide, a hafnium carbide and any combination thereof. In some embodiments of the present disclosure, the carbide-growth component may be a non-metal carbide, such as silicon carbide, a germanium carbide and any combination thereof. The magnetic additive component may be added to the methods, apparatus and systems of the present disclosure, as a chemical additive or it may originate from one or more walls of the electrolysis cell, from the anode, from the cathode, the electrolyte media and any combination thereof.

EXAMPLES

For Examples 1 to 9, the constituents of the molten electrolyte mixtures described herein are commercially available: strontium carbonate ($SrCO_3$); Chemsavers, about 98% pure or about 99% pure, strontium oxide (SrO); Chemsavers, about 98% pure or about 99% pure, barium carbonate ($BaCO_3$; Alfa Aesar, about 99.5% pure), lithium carbonate ($Li_2CO_3$; Alfa Aesar, about 99% pure), sodium carbonate ($Na_2CO_3$; Alfa Aesar, about 99% pure), lithium oxide ($Li_2O$; Alfa Aesar, about 99.5% pure), and barium oxide (BaO; Alfa Aesar, about 97% pure).

For the other examples, the constituents of the molten electrolyte mixtures employed in the examples below were commercially available: lithium carbonate was purchased as battery grade>99.5%, and used as received. The lithium carbonate had a compositional analysis of 99.8% ($Li_2CO_3$, Green Chemical Co). Strontium carbonate used was 99.4% purity SrCO$_3$ (Shendong Zhi Chemical Co. Strontium oxide, SrO (99% purity, Chemsavers) and used as an electrolyte constituent component. A lower purity SrCO$_3$ (98.6%; Hengshui Haoye Co,) containing minor ternary mix components (0.8% BaCO$_3$ and 0.2 wt % CaCO$_3$) was also compared to the higher grade SrCO$_3$ in the solubility sections described below. BaCO$_3$ (Alfa Aesar, 99.5%), Na$_2$CO$_3$ (Alfa Aesar, 99%), Li$_2$O (Alfa Aesar, 99.5%), and BaO (Alfa Aesar, 97%), were combined to form the various low-lithium carbonate electrolytes described in the examples below.

Muntz Brass (0.25 inch thick in the <2000 cm$^2$ electrolysis processes, and 0.5 inches thick in the larger cathode study) is a high zinc brass alloy composed of 60% copper and 40% zinc, also referred to as 280 brass, served as the cathode, and was purchased from onlinemetals.com, and in larger quantities from Marmetal Industries. As described herein, some examples relate to electrolysis processes that were conducted in 304 stainless steel "carbon pots". The pot acts as both the cell case and its inner walls serve as the anode. In one case, as described hereinbelow, the pot inner wall was lined with Nichrome A to serve as an alternative electrolysis anode.

For various of the electrolysis processes described herein below, a variety of sized 304 stainless cases were used. In each case, the cathode was mounted vertically in the electrolyte and across from the carbon pot wall serving as the anode and immersed in the electrolyte. When larger cathodes were used, they were maintained in large thermostatically controlled kilns. These kilns simultaneously sustained electrolysis in several carbon pots. The electrolyte has a strong affinity for CO$_2$ from the open air, and air was used as the CO$_2$ source. The kilns can also be configured to effectively use as an alternative CO$_2$ source. For example, the kilns can receive a direct feed of a 5% CO$_2$ emission from a 860 MW natural gas electric power plant. The electrodes were immersed subsequent to melting of the electrolyte. Once melted, the electrolytes were maintained at about 750° C. to about 790° C. The electrolysis process was conducted galvano-statically with a described constant current density. CO$_2$ was transformed into carbon at the cathode, growing as a carbanogel containing a matrix of the GNCs and the molten electrolyte.

Specific electrolyte compositions were pre-mixed by weight in the noted ratios for each of the electrolytes described below. For the electrolysis potential measurements, the electrolyte to be studied was melted in at 770° C. in a small (12 cm×1×2 cm×15 cm tall) 304 stainless steel case. A 0.2 cm wide, 1.5 cm long Muntz brass cathode wire was placed 3 mm from a flat, oversized (3 cm×6 cm) 304 stainless steel anode and immersed in the electrolyte. Electrolysis potentials were measured. Fixed galvanostatic currents were applied and the electrolysis was measured via a DataQ DAQ interface.

Subsequent to the electrolysis process, the cathode raw product was cooled, collected from the cathode, ground and remelted and pressed and/or aqueous acid washed. The washed carbon product was separated by vacuum filtration. The washed carbon product was dried overnight at 60° C. in an oven, yielding a black power product.

The GNC product made by the examples below were washed (with either deionized water or up to 6 M HCl) to remove excess electrolyte, separated from the washing solution, and analyzed by PHENOM Pro-X Energy Dispersive Spectroscopy on the PHENOM Pro-X scanning electron microscope (SEM); by high resolution FEI Tenco LV SEM, and/or by FEI Talos F200X transmission electron microscope (TEM) with High Angle Annular Dark-Field analysis (HAADF).

Raman spectroscopy was measured with a LabRAM HR800 Raman microscope (HORIBA) with 532.14 wavelength incident laser light, with a high resolution of 0.6 cm$^{-1}$.

Thermogravimetric analysis (TGA) was measured with a Perkin Elmer STA 6000 TGA/DSC with autosampler instrumentation.

Example 1

Production of high purity graphene nanocarbons, such as carbon nanotubes, by electrolysis in pure (100 wt %) molten lithium carbonate.

In order to make GNC product, an electrolysis reaction was conducted in an electrolysis cell with an anode and a cathode.

The anode was configured to generate oxygen during the electrolysis reaction. The anode was made of stainless steel 304 and was substantially flat planar.

The cathode was made of brass and it was also substantially flat planar.

In this Example 1, the electrolyte was pure (100 wt %) lithium carbonate (Li$_2$CO$_3$). The electrolyte was heated to about 750° C. and positioned within the electrolytic cell between the anode and the cathode.

The electrolysis reaction was initiated by applying a substantially constant current density of about 0.2 A/cm$^2$.

Carbon dioxide from the air was directly captured by the molten electrolyte during the electrolysis reaction.

After about 4 hours, the electric current was turned off and the electrolysis reaction was stopped. The cathode was removed from the tubular vessel and allowed to cool and the solid GNC product was removed from the cathode.

The left side of FIG. 1 is a photograph of an extracted cathode after electrolysis of CO$_2$ for 16 hours at 2620 Amp in a pure 750° C. Li$_2$CO$_3$ electrolyte. The photograph includes frozen electrolyte removed with the cathode. CO$_2$ has been split in a pure 750° C. Li$_2$CO$_3$ electrolyte. The white color of the frozen electrolyte is indicative of the high purity of the post electrolysis pure Li$_2$CO$_3$. During the electrolysis, the molten Li$_2$CO$_3$ electrolyte and cathodes are contained within a 304 Stainless Steel "carbon pot" which also serves as the oxygen generating anode. The product shown resides on the 13,104 cm$^2$ Muntz Brass cathodes. Post electrolysis the product is subsequently pressed/and or washed to remove and recover remaining electrolyte from the product. SEM of the washed product is shown in the middle and right sides of FIG. 1. The SEM on the middle and right respectively are at a magnification of ×710 and ×2250, and exhibit a CNT of purity 93%.

FIG. 2 presents a TGA analysis of the FIG. 1 electrolysis GNC product. FIG. 2 shows a purity of 97.1% of the Li$_2$CO$_3$ electrolyte used in the CO$_2$ electrolysis process that made the GNC product of FIG. 1. Furthermore, the TGA exhibits an inflection temperature of $T_{infl}$=610° C., which is indicative of a temperature resistant nanographene structure, and is unlike an alternative common amorphous carbon which oxidizes at a several hundred degrees lower temperature.

Figure 3:
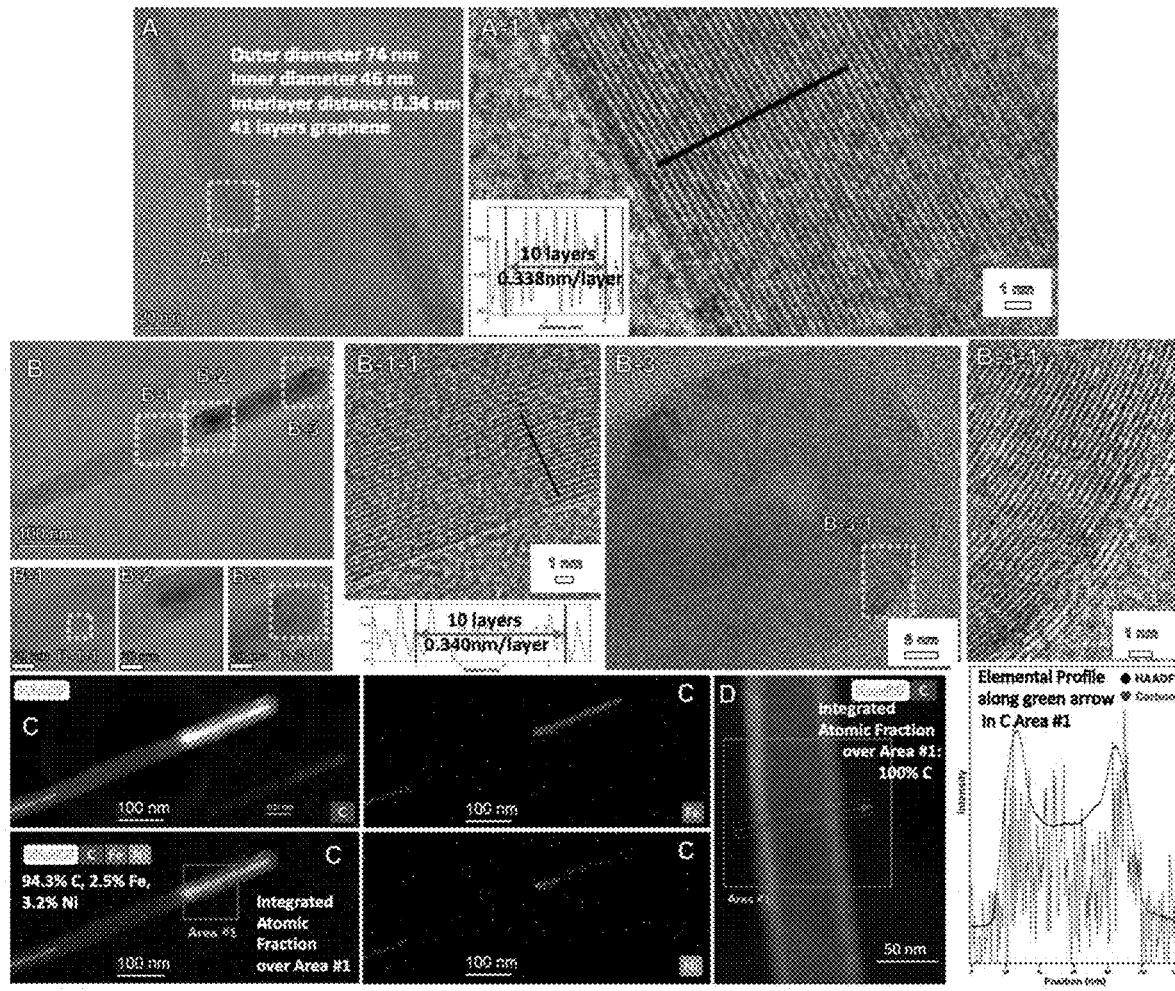
FIG. 3 transmission electron microscope (TEM) with High Angle Annular Dark-Field (HAADF) elemental analysis imaging of the carbon nanotube product produced by the electrolysis of $CO_2$ in molten pure $Li_2CO_3$.

FIG. 3 presents TEM (Transmission Electron Microscopy, panels A & B) and Elemental HAADF (High Angle Annular Dark-Field analysis, panels C & D) of high-purity, high-yield carbon nanotubes synthesized by electrolytic splitting of CO$_2$ in 770° C. Li$_2$CO$_3$. In the top row a cross section of the CNT product is analyzed by TEM with scale bars of 20 nm (left panel) or 1 nm (right), and on the right the alignment and spacing of the single carbon atom thick cylindrical graphene walls is evident. In the middle the nanoscopic structure at the tip of the CNT includes graphene walls curving around a transition metal nucleation point, and in the lower row the iron composition of this nucleating metal is evident, as well as the pure carbon composition of the remainder of the carbon nanotube.

The average GNC purity ranges from 90 to 98% purity, depending on pure $Li_2CO_3$ electrolysis conditions and post electrolysis press extraction and/or polish washing. In accord with the electrolytic splitting of $CO_2$: $CO_2 \rightarrow C_{GNC} + O_2$; 1 tonne of GNC are synthesized via the C2CNT (carbon dioxide to carbon nanomaterial technology) process effectively removes 3.7 tonnes of carbon dioxide from the atmosphere or flue gas. CNTs have found applications in materials such as polymers, batteries, cement, textiles.

Example 2

Production of a variety of high purity graphene nanocarbon (GNC) structures by electrolysis in generally pure (100 wt %) molten lithium carbonate.

This example used many of the same steps as Example 1, with one exception being the modification of the electrochemical conditions resulting in the formation of a variety of high purity graphene nanocarbons in addition to carbon nanotubes.

Figure 4:
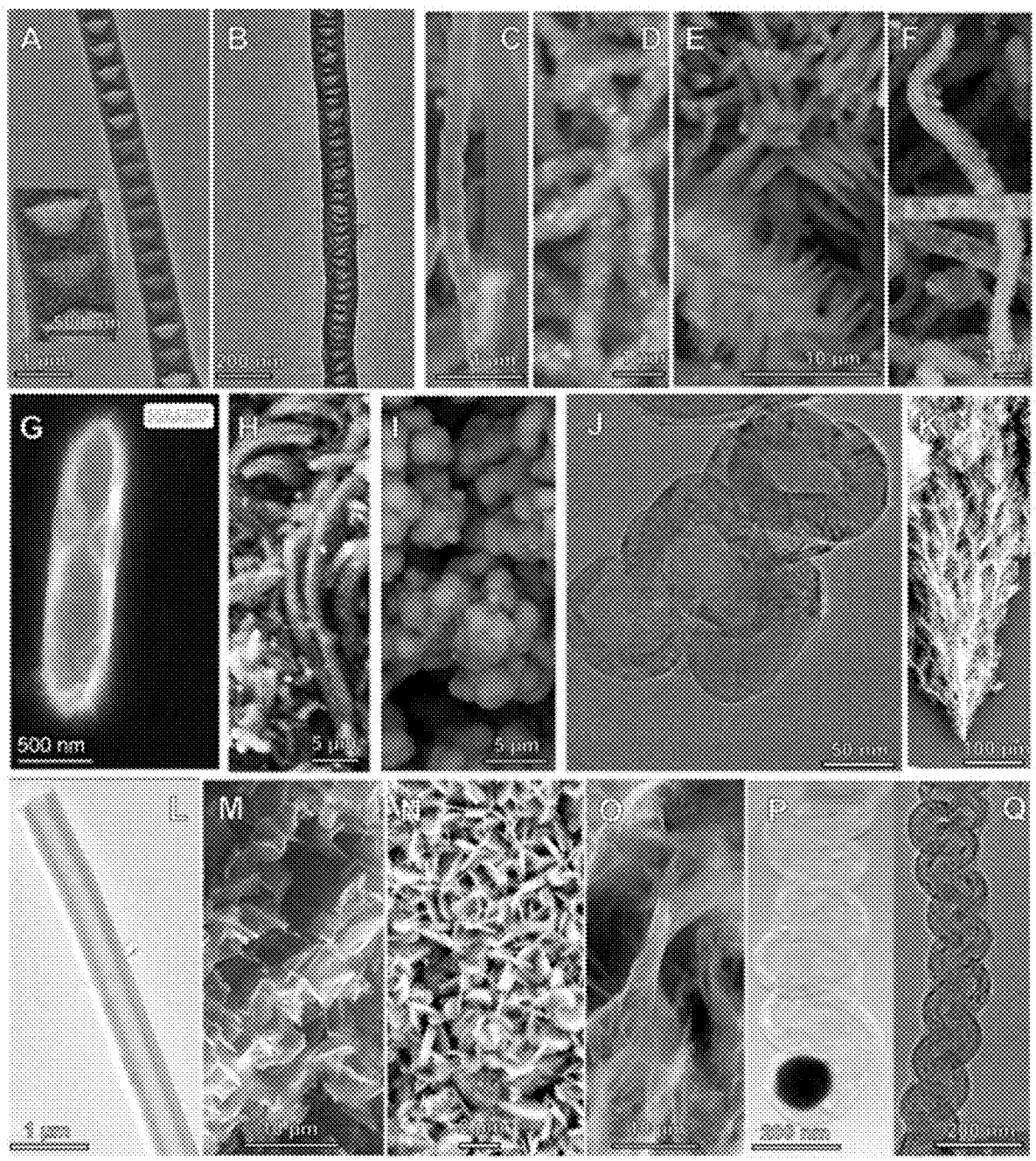
FIG. 4 shows scanning electron microscope (SEM) images of nanocarbon allotropes synthesized by the electrolytic splitting of $CO_2$ in molten carbonate. Top row (from left to right): conical CNT, nano-bamboo, nano-pearl, Ni-coated CNT, nano-flower, nano-dragon. Middle row: nano-rod, nano-belt, nano-onion, hollow nano-onion, and nano-tree. Bottom row (from left to right) Carbon nanotube, nano-scaffold, nano-platelet, graphene, nano-helices.

Representative examples of several of other GNC structures grown from $CO_2$ in $Li_2CO_3$, or $Li_2CO_3$ plus $Na_2CO_3$, electrolytes are shown in FIG. 4. These alternative GNCs are each prepared by varying the molten carbonate electrolysis conditions, such as variation of the temperature, current density and the composition and structure of the electrodes. Carbon nanotubes constrain graphene as concentric cylinders forming the CNT walls.

The alternative GNCs, constrain the conventional 2 dimensional planar graphene $sp^2$ planar morphology, within a variety of geometric shapes, such as carbon nano-onions (concentric graphene hollow or solid spheres), conventional graphene, nanoscaffold, nano-bamboo, nano-platelets, nano-pearls, nanorods, nano helices (including helical CNTs, braided double helical CNTs, and flat nanospirals), nanorods, nano-dragons, nanobelts, conical nanofibers nanotrees, nanoweb, and nanosponges. These alternative morphologies further tune graphene's extraordinary strength, conductivity, lubrication, catalysis and electronic properties, within a variety of geometric shapes.

FIG. 4 presents SEM of nanocarbon allotropes synthesized by the electrolytic splitting of $CO_2$ in molten carbonate. Top row (from left to right): conical CNF, nano-bamboo, nano-pearl, Ni-coated CNT, nano-flower, nano-dragon. Middle row: nano-rod, nano-belt, nano-onion, hollow nano-onion, and nano-tree. Bottom row (from left to right) Carbon nanotube, nano-scaffold, nano-platelet, graphene, and nano-carbon helices.

Figure 5:
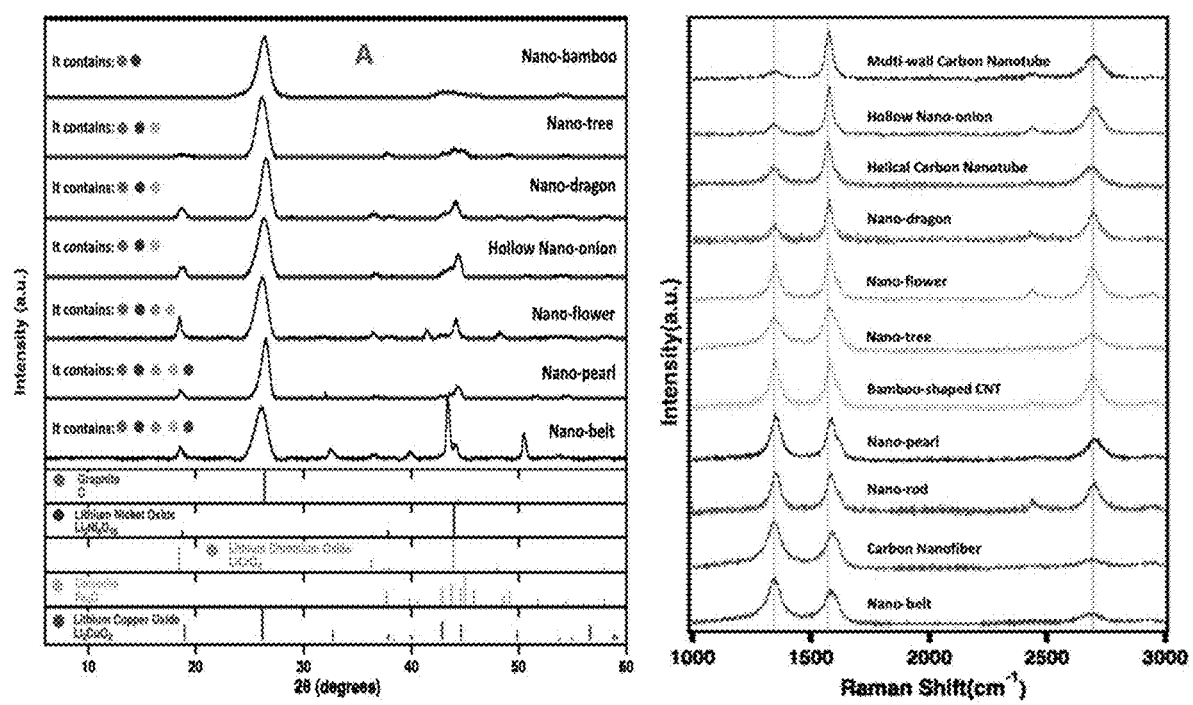
FIG. 5 shows Left: x-ray diffraction analysis (XRD) spectra, and right: Raman spectra of several other GNC products synthesized by the electrolytic splitting of $CO_2$ in pure $Li_2CO_3$, or $Li_2CO_3$ with $Na_2CO_3$ through variation of the electrolysis conditions.

The left side of FIG. 5 presents XRD Spectra of several alternative GNC products synthesized by the electrolytic splitting of $CO_2$ in pure $Li_2CO_3$, or $Li_2CO_3$ with $Na_2CO_3$ through variation of the electrolysis conditions. In the XRD analysis, a strong crystalline graphene (non amorphous) peak is evident at $2\theta = \sim 26°$ C., while the additional presence of nickel, iron, chromium and copper salts is distinctive to the various GNC structures.

The right of FIG. 5 presents Raman Spectra of several alternative GNC products synthesized by the electrolytic splitting of $CO_2$ in pure $Li_2CO_3$, or $Li_2CO_3$ with $Na_2CO_3$ through variation of the electrolysis conditions. In the Raman spectral, the ratio of the D (defect) peak intensity at $\sim 1300$ $cm^{-1}$ to G (graphene) peak at $\sim 1600$ $cm^{-1}$ is indicative of the number of defects to the graphene structure.

Example 3

The high cost lithium carbonate and the challenge of its partial replacement by low cost sodium or potassium carbonate.

This example used many of the same steps as Example 1. The primary difference with Example 1 was the partial replacement of the lithium carbonate electrolyte with either sodium or potassium carbonate.

$Li_2CO_3$ is expensive and contributes to a cost constraint in its use as a molten electrolyte in the transformation, by electrolytic splitting of the greenhouse gas $CO_2$, to GNCs. Due to the competitive demand of $Li_2CO_3$, in particular for use in the preparation of Li-ion batteries for the growing electric vehicle (EV) market, global $Li_2CO_3$ prices in 2022 to 2023 have increased and vacillated in the range of $25,000 to $75,000 per tonne. These elevated prices present a cost constraint to the alternative use of $Li_2CO_3$ as a molten electrolyte in the transformation, by electrolytic splitting, of $Li_2CO_3$ to GNCs.

Alternatively, $Na_2CO_3$ and $K_2CO_3$ are available at a much lower global cost of less than $2,000 per tonne.

Figure 6:
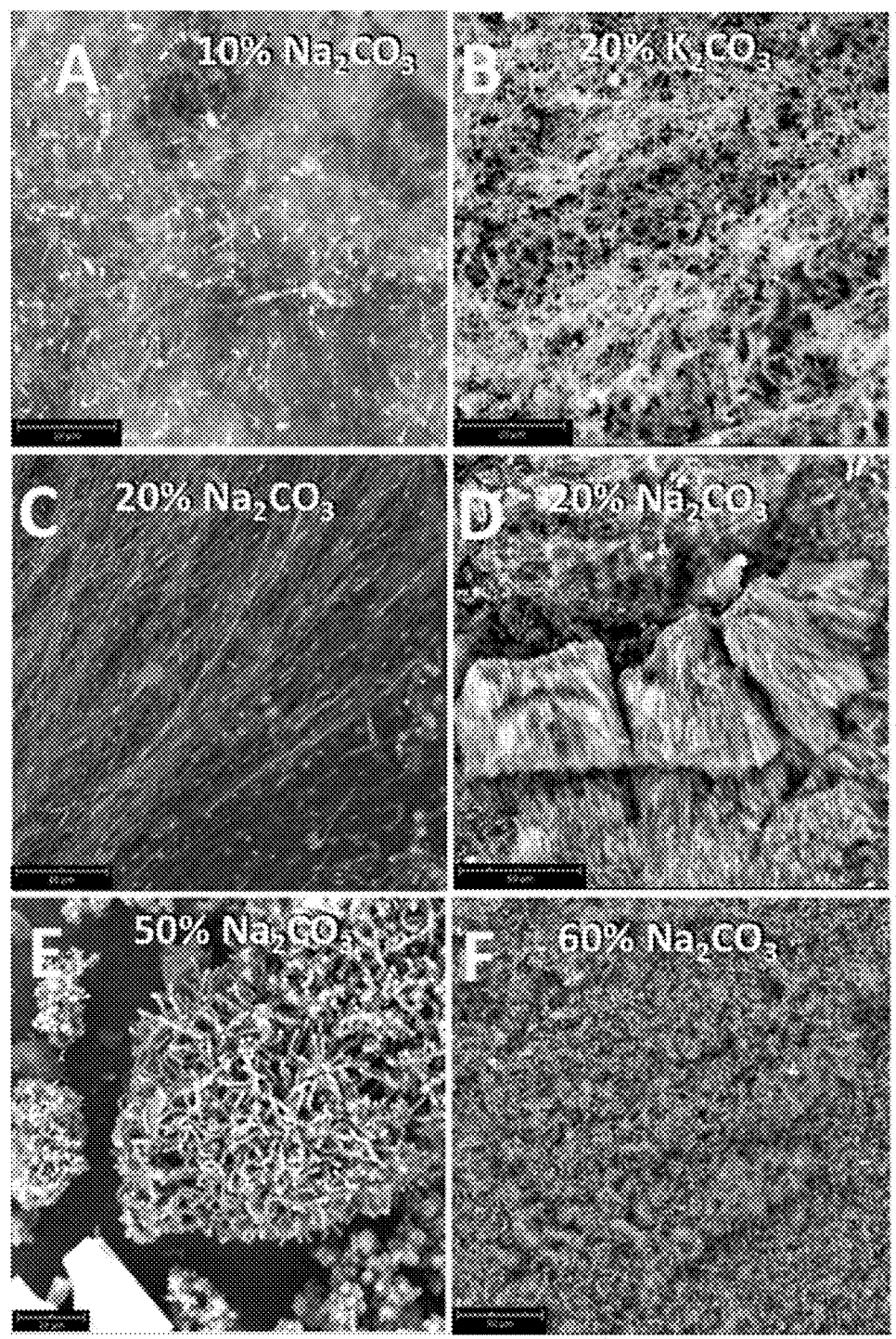
FIG. 6 shows SEM images of the product of electrolysis in various molten 770° C. $Li_2CO_3$ electrolytes mixed with $Na_2CO_3$ or $K_2CO_3$. The electrolyses are conducted with an additional 8 wt % $LiBO_2$, which improves the CNT product morphology. SEM image of washed carbon nanotube product obtained panel A from $Na_2CO_3$ 10 wt % electrolysis A (10 µm scale bar); panel B from $K_2CO_3$ 20 wt % electrolysis (20 µm scale bar); panel C from $Na_2CO_3$ 20 wt % electrolysis (10 µm scale bar) & panel D (10 µm scale bar); panel E from $Na_2CO_3$ 50 wt % electrolysis (10 µm bar,) and panel F from $Na_2CO_3$ 60 wt % electrolysis (50 µm scale bar).

However, even low-level additions of these alternative sodium or potassium carbonates, to replace some of the $Li_2CO_3$, substantially disfigures the morphology of the GNCs. The morphology of the GNCs is improved by the addition of low levels of metaborates, such as 8 wt % $LiBO_2$. However, as shown in the SEM images of FIG. 6, even with the inclusion of $LiBO_2$, the addition of more than 10 wt % $K_2CO_3$, or more than 20 wt % $Na_2CO_3$, to $Li_2CO_3$ as a molten electrolyte for $CO_2$ electrolysis results in the loss of CNT structure, both in the drop in CNT purity, and a drop in the CNT aspect ratio (the ratio of the CNT length to its diameter) in the electrolysis product.

Example 4

The high melting point of strontium carbonate and the unexpected high solubility of strontium salts in low temperature molten $Li_2CO_3$.

Unlike the global $Li_2CO_3$ prices of $25,000 to $75,000 per tonne, $SrCO_3$ is available or a more stable global price of approximately $1,500 per tonne; a cost that is 1 to 2 orders of magnitude less than $Li_2CO_3$. However, its 1494° C. melting point is too high for $CO_2$ electrolysis to solid carbon products. This melting point is considerably higher than the respective 723° C., 851° C. or 891° C. melting points of $Li_2CO_3$, $Na_2CO_3$ or $K_2CO_3$.

Electrolysis in molten carbonates containing over 10 wt % $SrCO_3$ had been an unexplored domain. While binary mixes of $Li_2CO_3$, $Na_2CO_3$ and $K_2CO_3$ have been well characterized, there is little information available on the melting point of the binary $Li_2CO_3/SrCO_3$ mixture. However, it is discovered that a mix of over 45 wt % $SrCO_3$ and 55 wt % $Li_2CO_3$ melts at less than 750° C., increasing to 50 wt % or more at 780° C. In addition, strontium oxide, SrO, which is useful in the rapid reactive dissolution of $CO_2$, is measured here to be highly soluble (at $\sim 25$ wt % in $Li_2CO_3$ at 750° C.). Efficacy of these salts as molten electrolytes at temperatures below 800° C. is of import as above these temperatures $CO_2$ increasingly electrolytically splits to gaseous CO, rather than the desired solid phase GNC products, and by 950° C. the product is entirely CO, rather than solid GNC structures.

Example 5

The different affinity of strontium, compared to sodium or potassium, carbonate to bind and release carbon dioxide.

An affinity for carbon dioxide is a critical component in the molten carbonate electrolytic transformation of $CO_2$ to GNC structures. The equilibrium for alkali and alkali earth carbonates to separate to carbon dioxide and oxides, or to form carbonate from them in the reverse reaction, is given by a generalization of EQN. 5:

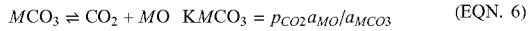

$$MCO_3 \rightleftharpoons CO_2 + MO \quad K_{MCO_3} = p_{CO_2} a_{MO}/a_{MCO_3} \quad \text{(EQN. 6)}$$

where examples of M are $Li_2$, $Na_2$, $K_2$, Mg, Ba or Sr.

When calculating the equilibrium, $K_{MCO_3}$ EQN. 6 is used:

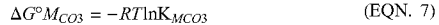

$$\Delta G°M_{CO_3} = -RT \ln K_{MCO_3} \quad \text{(EQN. 7)}$$

$K_{MCO_3}$ is calculated from the thermochemical free energies for a variety of alkali and alkali earth carbonates, their oxides, and from $CO_2$.

Figure 7:
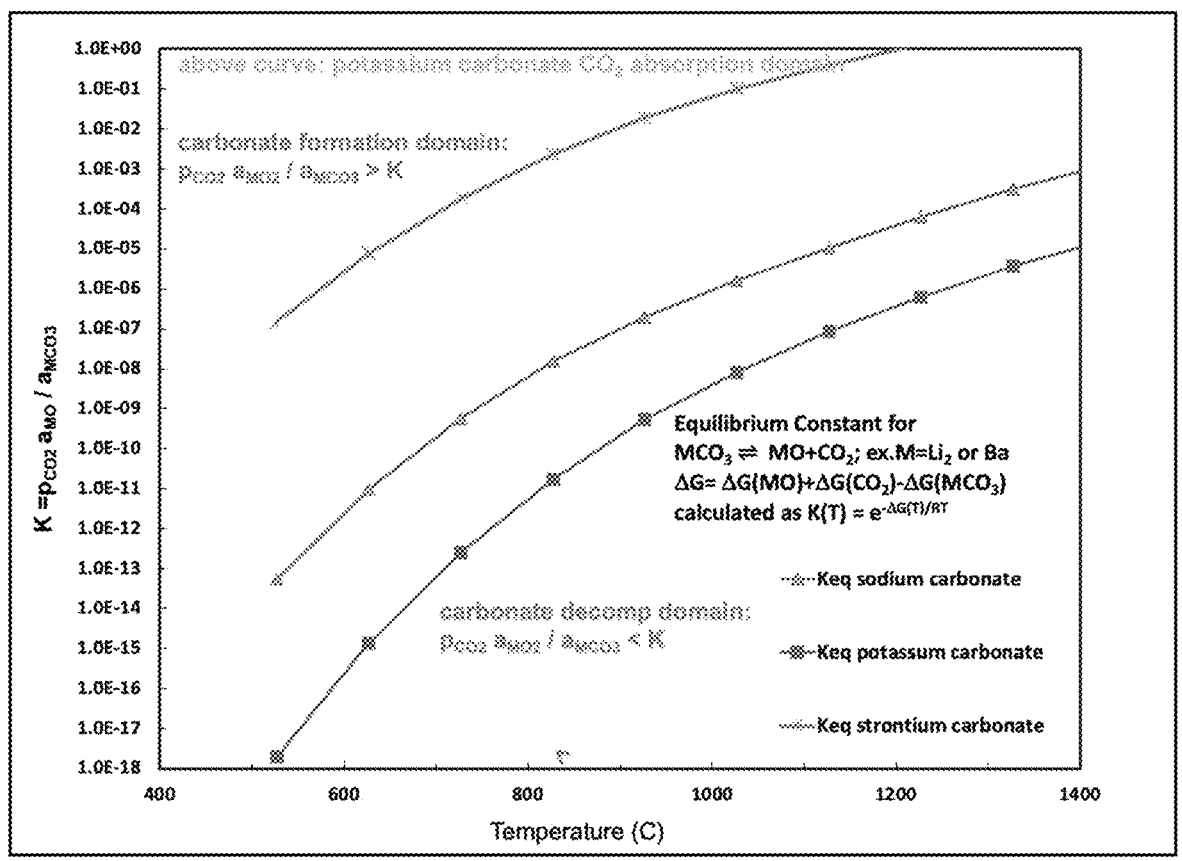
FIG. 7 shows a comparison of the carbonate to carbon dioxide and metal oxide equilibrium constants for strontium, lithium, sodium, potassium, and barium carbonate.

FIG. 7 presents a comparison of carbonate equilibrium constants to bind and release carbon dioxide by strontium carbonate compared to that of sodium or potassium carbonate. These are plotted as a function of temperature. Interestingly, it is seen in FIG. 7 that strontium carbonate more loosely binds carbon dioxide than these other higher melting point carbonates with a higher melting point than lithium carbonate. This is particularly important in the low temperature domain in which strontium carbonate can also be soluble in molten lithium carbonate. Without being bound by any particular theory, this molten domain and loose binding of $CO_2$, provides an unusual media conducive for the electrolytic splitting of carbon dioxide and its transformation to GNCs.

Example 6

The electrolysis production of high purity CNTs in a binary $SrCO_3/Li_2CO_3$ molten electrolyte.

This example used many of the same steps as Example 1. The primary difference with Example 1 was the partial replacement of the lithium carbonate electrolyte with strontium carbonate or strontium oxide.

As opposed to the $Na_2CO_3$ or $K_2CO_3$ mixes in $Li_2CO_3$ in Example 3, we discover that the binary $SrCO_3/Li_2CO_3$ electrolyte mix has the capability to form highly perfect GNC structures. FIG. 7 presents SEM of the carbon nanotube product of a 25 wt % $SrCO_{3/75}$ wt % $Li_2CO_3$ electrolysis of $CO_2$ at 750° C. with a Muntz brass cathode and a stainless steel 304 anode.

Figure 8:
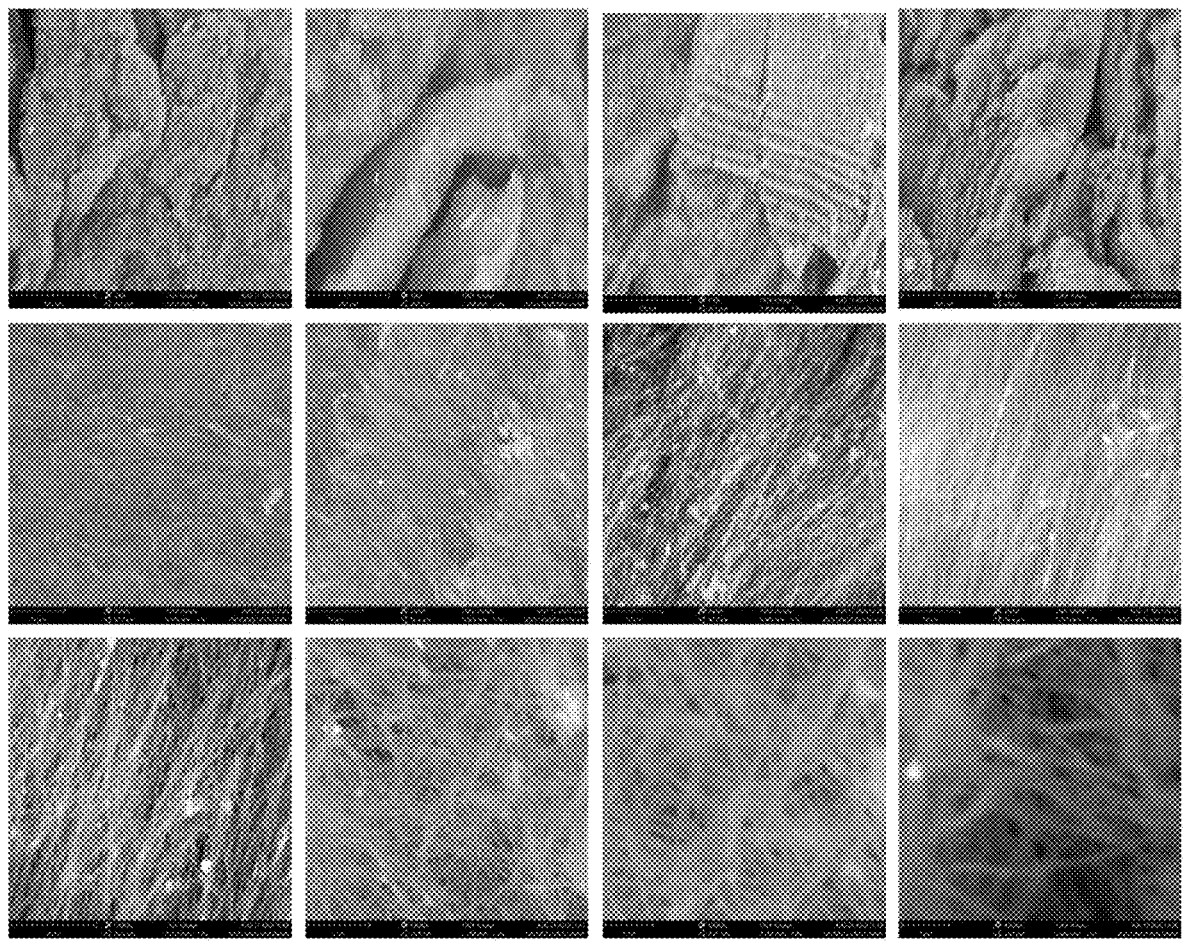
FIG. 8 shows SEM images of the washed carbon nanotube product of electrolysis in a 750° C. 25 wt % $SrCO_3$ to 75 wt % $Li_2CO_3$, electrolyte at 0.2 A/cm² with a stainless steel 304 anode and a brass cathode. Top row from left to right SEM magnification is 400×, 390×, 400× and 390× magnification. Bottom row from left to right SEM magnification is 5,200×, 5,400×, 10,000× and 45,000× magnification.

In comparison to FIG. 1, the carbon nanotube product in FIG. 8 is superior to that of the CNTs grown in the pure $Li_2CO_3$ electrolyte. In particular, the purity is high and the desirable property of the CNT aspect ratio of the Sr/Li carbonate CNTs increases compared the pure $Li_2CO_3$ electrolyte, as both the diameter decreases (to 60 to 80 nm), while the CNT length increases (to 200 to 500 µm in length).

Example 7

750° C. strontium binary salt (SrO or $SrCO_3$)/$Li_2CO_3$ production of high purity CNTs in a wide range of electrochemical conditions.

This example used many of the same steps as Example 6. The primary differences with Example 5 were a change in the strontium salt to strontium oxide from strontium carbonate, or change in the wt % of strontium carbonate, or change in the electrolysis current density, electrolysis duration of the number of times the electrolyte and electrodes were reused to form the carbon nanotube product.

Figure 9:
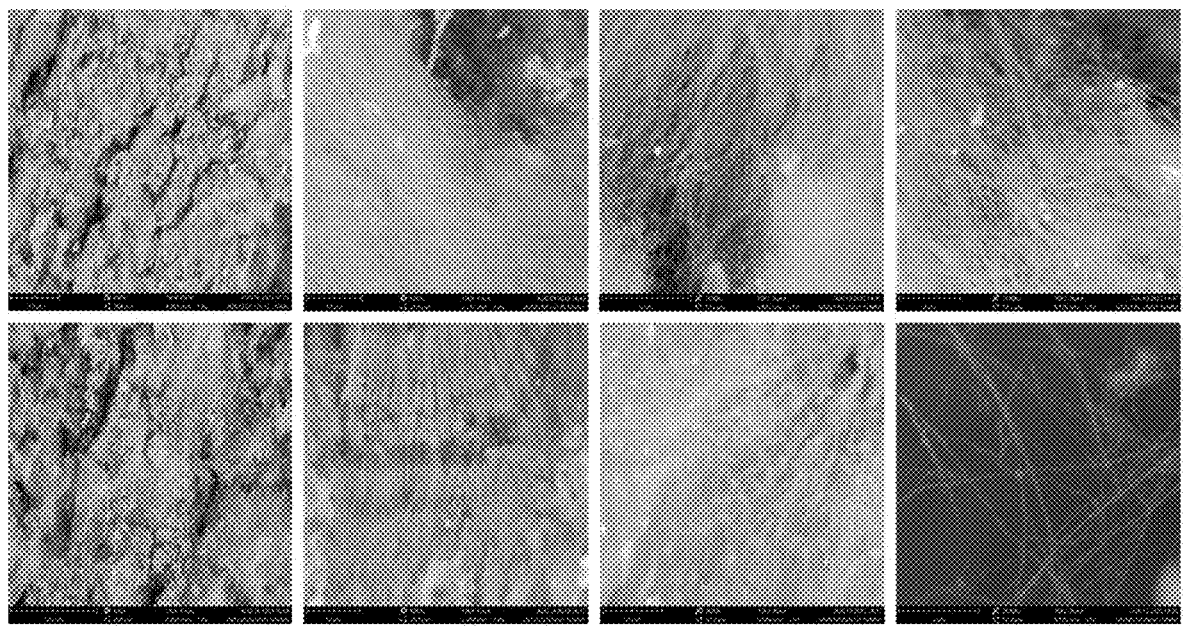
FIG. 9 shows SEM images of the washed carbon nanotube product of an electrolysis performed with a current density of 0.2 A/cm² in a 750° C. with a stainless steel 304 anode and a brass cathode in a strontium carbonate mixed an alkali carbonate electrolyte. Top row: in 35 wt % $SrCO_3$ to 65 wt % $Li_2CO_3$ electrolyte; from left to right SEM magnification is 460×, 5,400×, 10,500× and 19,000× magnification. Bottom row: in 33.3 wt % $SrCO_3$, 33.3 wt % $Na_2CO_3$ and 33.3 wt % $Li_2CO_3$ electrolyte; from left to right SEM magnification is 410×, 5,000×, 5,600× and 25,000× magnification.

Table 1 compares for several lower lithium content electrolyte, under various electrochemical conditions the carbon nanotube product to that of the comparable product in a pure grown in a pure $Li_2CO_3$ electrolyte. Each synthesis is conducted with a Muntz brass cathode and a stainless steel 304 anode at 750° C. Table 1 summarizes that the quality of the binary electrolyte CNT product is comparable to that formed by electrolysis in pure $Li_2CO_3$, if either SrO or $SrCO_3$ is used as the binary strontium salt. The term "superior quality" refers to CNTs with an average length over about 70 µm and an average aspect ratio of over about 1,000. Superior quality also refers to CNTs with an average purity of over about 98%. The term "comparable quality" is in reference to those CNTs made in an electrolysis process with a pure $Li_2CO_3$ electrolyte and refers to CNTs with an aspect ratio of about 100 to about 1,000, and/or a lower fraction of the CNTs with an aspect ratio of about 10 to about 100. Comparable quality also refers to CNTs with an average purity of about 90 to about 95% and/or a lower fraction of the CNTS with an average purity of about 90% to about 95%. The high quality of the strontium binary electrolyte product appears to be independent of the electrolysis current density or the duration of the electrolysis over a wide range, and furthermore it is evident that the electrolyte and electrodes can be reused for multiple syntheses. The top row of FIG. 9 presents SEM of the carbon nanotube product of a 35 wt % $SrCO_3/75$ wt % $Li_2CO_3$ electrolysis of $CO_2$ at 750° C. with a brass cathode and a stainless steel 304 anode.

TABLE 1

Comparison of the CNT product quality for several lower lithium content electrolytes by electrolysis at 750° C.

| Strontium salt | Wt % Sr salt | Wt % $Li_2CO_3$ | Electrolysis current density, A/cm² | Electrolysis time, hours | Times reuse of electrolyte & electrodes | Quality of CNT compared to pure $Li_2CO_3$ product |
|---|---|---|---|---|---|---|
| SrO | 10% | 90% | 0.2 | 4 | 1 | comparable |
| $SrCO_3$ | 10% | 90% | 0.2 | 4 | 1 | comparable |
| $SrCO_3$ | 25% | 75% | 0.1 | 16 | 2 | comparable |
| $SrCO_3$ | 25% | 75% | 0.2 | 4 | 3 | superior |
| $SrCO_3$ | 25% | 75% | 0.2 | 4 | 9 | comparable |

TABLE 1-continued

Comparison of the CNT product quality for several lower lithium content electrolytes by electrolysis at 750° C.

| Strontium salt | Wt % Sr salt | Wt % $Li_2CO_3$ | Electrolysis current density, $A/cm^2$ | Electrolysis time, hours | Times reuse of electrolyte & electrodes | Quality of CNT compared to pure $Li_2CO_3$ product |
|---|---|---|---|---|---|---|
| $SrCO_3$ | 35% | 65% | 0.1 | 16 | 4 | comparable |
| $SrCO_3$ | 35% | 65% | 0.4 | 4 | 5 | comparable |
| $SrCO_3$ | 45% | 55% | 0.2 | 4 | 2 | comparable |

Example 8

750° C. $SrCO_3/Li_2CO_3/Na_2CO_3$ ternary production of high purity CNTs.

This example used many of the same steps as Example 6. The primary differences with Example 6 was a lower concentration of lithium carbonate in the lower-lithium carbonate electrolyte. This was accomplished by changing the electrolyte from a binary mix of $SrCO_3$ and $Li_2CO_3$ to a ternary mix of 33.3 wt % $SrCO_3$/33.3 wt % $Li_2CO_3$/33.3 wt % $Na_2CO_3$. Separate electrolysis processes were conducted both at either 0.1 $A/cm^2$ (for 16 hours) or 0.2 $A/cm^2$ (for 4 hours). The electrolyte was reused for several electrolysis processes. The bottom row of FIG. 9 presents SEM of the carbon nanotube product of this ternary electrolyte prepared with a third use of the electrolyte over a 4 hour electrolysis at a current density of 0.2 $A/cm^2$ with a brass cathode and a stainless steel 304 anode at 750° C. The quality of the CNT product is comparable to the product prepared by electrolysis in the simple $Li_2CO_3$ electrolyte.

Example 9

780° C. lower lithium $SrCO_3/Li_2CO_3$ binary production of high purity CNTs.

Figure 10:
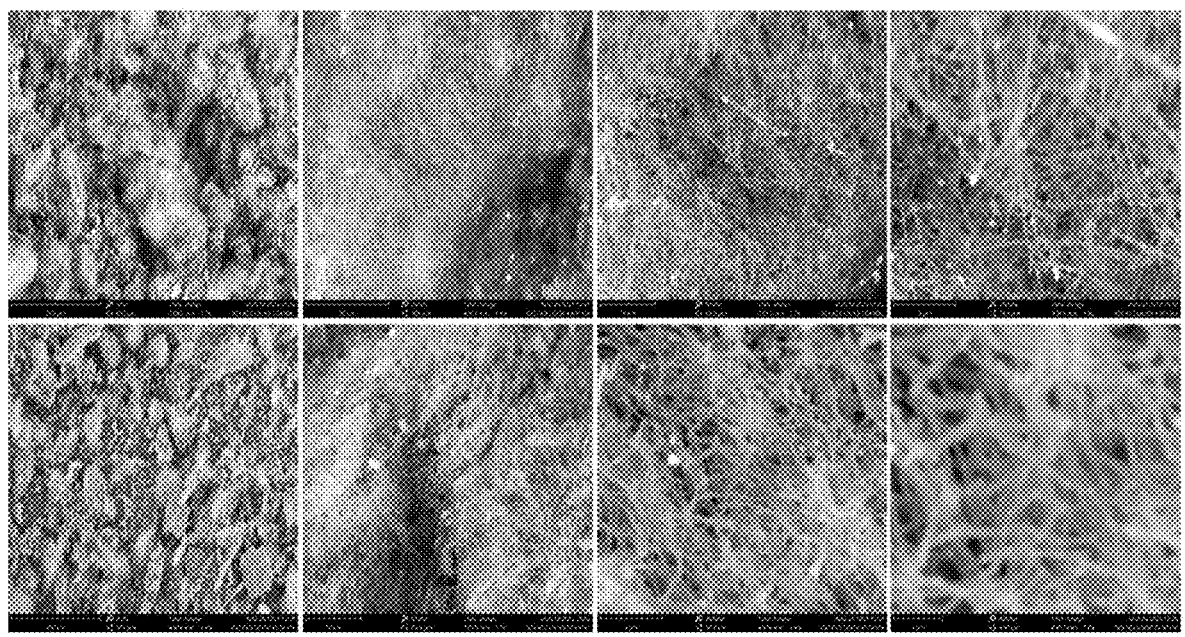
FIG. 10 shows SEM images of the washed carbon nanotube product of electrolysis at 780° C. with a stainless steel 304 anode and a brass cathode in a 50 wt % strontium carbonate 50 wt % lithium carbonate electrolyte at low (0.07 A/cm² for 16 hours) or high (0.5 A/cm² for 1 hour) current density. Top row: the from left to right SEM magnification is 410×, 2,550×, 5,100× and 19,000× magnification. Bottom row: from left to right SEM magnification is 410×, 5,100×, 19,000× and 24,000× magnification.

This example used many of the same steps as Example 7. The primary difference with Example 7 was the electrolysis was conducted at a higher temperature (780° C. rather than 750° C.) to facilitate a higher solubility of strontium carbonate (increasing the fraction of $SrCO_3$ to 50 wt %) to investigate a lower fraction (50 wt %) of lithium carbonate in the binary electrolysis electrolyte. This was accomplished at 780° C. conducting separate electrolysis processes, while reusing a stainless steel 304 anode and a brass cathode. Similarly in the different electrolysis processes, the, electrolyte was reused for electrolysis processes at a wide range of different current densities: from 0.07 or 0.1 $A/cm^2$ for 16 hours, 0.2 $A/cm^2$ for 4 hours, and 0.4 or 0.5 $A/cm^2$ for 1 hour. FIG. 10 presents SEM images of the washed carbon nanotube product of electrolysis at a low current density (0.07 $A/cm^2$ for 16 hours) and a high current density (0.5 $A/cm^2$ for 1 hour).

Figure 11:
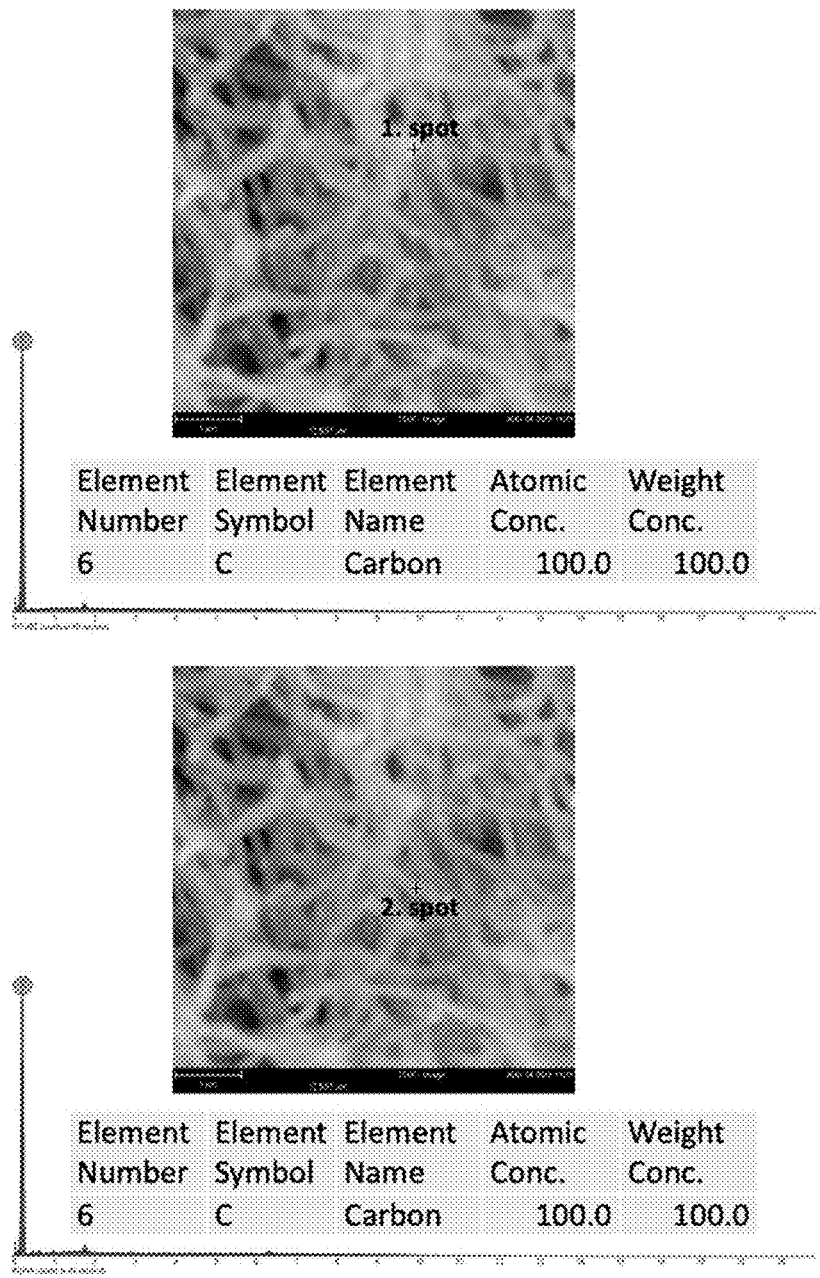
FIG. 11 shows energy dispersive X-ray spectroscopy (EDS) images of the carbon nanotube product of electrolysis with a stainless steel 304 anode and a brass cathode in a 780° C. 50 wt % strontium carbonate 50 wt % lithium carbonate electrolyte at 0.5 A/cm² for 1 current density hour.

FIG. 11 presents SEM elemental analysis by EDS (Electron Dispersive Spectroscopy) at two different locations noted by hatch marks in FIG. 11 of the 0.5 $A/cm^2$ carbon nanotube product shown in the bottom row of FIG. 10. As seen in FIG. 11, the CNT consists of 100% carbon. As seen in FIG. 10 and FIG. 11, the quality of the CNT product is comparable to the product prepared by electrolysis in the simple $Li_2CO_3$ electrolyte.

It is also observed that with addition to the binary $SrCO_3/Li_2CO_3$ electrolyte, that 0 to 15 wt % of a barium salt, such as $BaO_3$ or BaO, or the addition of a boron salt, such as $Na_2B_4O$ or $B_2O_3$, that a variety of GNC structures can be synthesized by electrolysis upon their addition to a binary $SrCO_3/Li_2CO_3$ electrolyte, As with lithium or barium oxide, and unlike calcium oxide, strontium oxide is also highly soluble in carbonate electrolytes. The GNC product is also evident with the addition of 1% or 5% of either borate or oxide salts to the electrolytes of Examples 5 and 6. The inclusion of the lithium borate in the electrolyte can form boron doped carbon nanotubes.

The remaining examples describe further electrolysis processes that utilize a molten carbonate electrolyte with the constituent components as described therein further. The electrolysis processes employed the same operational parameters as described for the example above, except as set out below.

Figure 12:
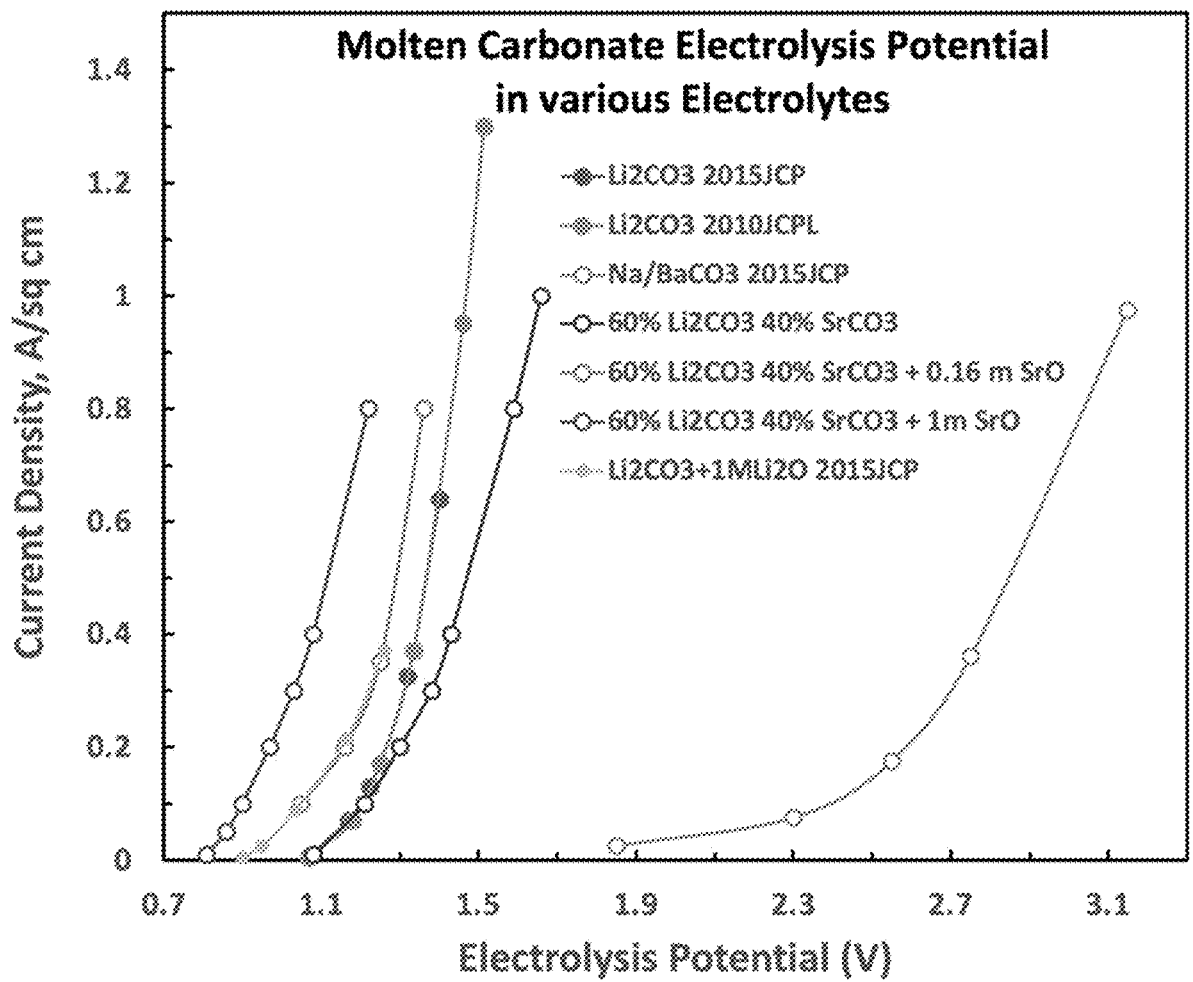
FIG. 12 is a line graph that depicts the electrolysis potential measured in various molten carbonate electrolytes.

Example 10 relates to the carbonate electrolysis potential measured in several molten carbonates. The inventors have previously synthesized CNTs by electrolysis in 50/50 wt % $Na/BaCO_3$ albeit forming CNTs at a lower purity than from the pure $Li_2CO_3$. However, that synthesis required several fold higher electrolysis power to drive the reaction. FIG. 12 depicts a comparison of the molten carbonate electrolysis potential of several electrolytes. Compared to the 1 volt which drives the CNT formation in lithium carbonate, the $Na/BaCO_3$ potential results in a two to three-fold higher voltage and inordinately high energy consumption to drive a decarbonization process.

Potentials included in pure lithium carbonate, or pure lithium carbonate with 1.0 m $Li_2O$, an equal mix of sodium and barium carbonate, a mix of 40 wt % strontium carbonate with 60 wt % $Li_2CO_3$, or a mix of the latter with either 0.16 or 1.0 m SrO. $Li_2CO_3$ with or without $Li_2O$ is from the measurements described in: Ren, J., Lau, J., Lefler, M., Licht, S. *The minimum electrolytic energy needed to convert carbon dioxide to carbon by electrolysis in carbonate melts.* J. Phys. Chem. C. 119, 23342-23349 (2015) and Licht, S.; Wang, B.; Ghosh, S.; Ayub, H.; Jiang, D.; Ganley, J. *New solar carbon capture process: STEP carbon capture.* J. Phys. Chem. Lett. 1, 2363-2368 (2010), the entire contents of which are both incorporated herein by reference. The $Na/BaCO_3$ are also described in Licht, S.; Wang, B.; Ghosh, S.; Ayub, H.; Jiang, D.; Ganley, J. *New solar carbon capture process: STEP carbon capture.* J. Phys. Chem. Lett. 1, 2363-2368 (2010).

Example 11 relates to solubility of strontium salts in molten lithium carbonate salts.

There is little, or no, information available regarding the melting point of a binary mix of pure $Li_2CO_3$ (melting point of about 723° C.) with SrCO$_3$ (which is solid to about 1494° C.). Although SrCO$_3$ fully decomposes to SrO, as temperature is increased<<1000° C. It was discovered, as described herein, that SrCO$_3$ is highly soluble in molten lithium carbonate at temperatures less than 800° C., and that the inexpensive SrCO$_3$ salt can replace a major portion of the expensive lithium carbonate salt as an electrolyte for decarbonization and CNT and GNC growth. It is described herein that strontium oxide, SrO, which can facilitate the rapid reactive dissolution of CO$_2$, is also measured here using 99% SrO to be highly soluble (at ~25 wt % in Li$_2$CO$_3$ at 750° C.). The efficacy of these salts as electrolytes for molten electrolysis at temperatures below 800° C. is of import as above these temperatures CO$_2$ increasingly electrolytically splits to gaseous carbon monoxide, rather than the desired solid phase GNC products, and by 950° C. the product is entirely CO, rather than solid GNC.

Figure 13:
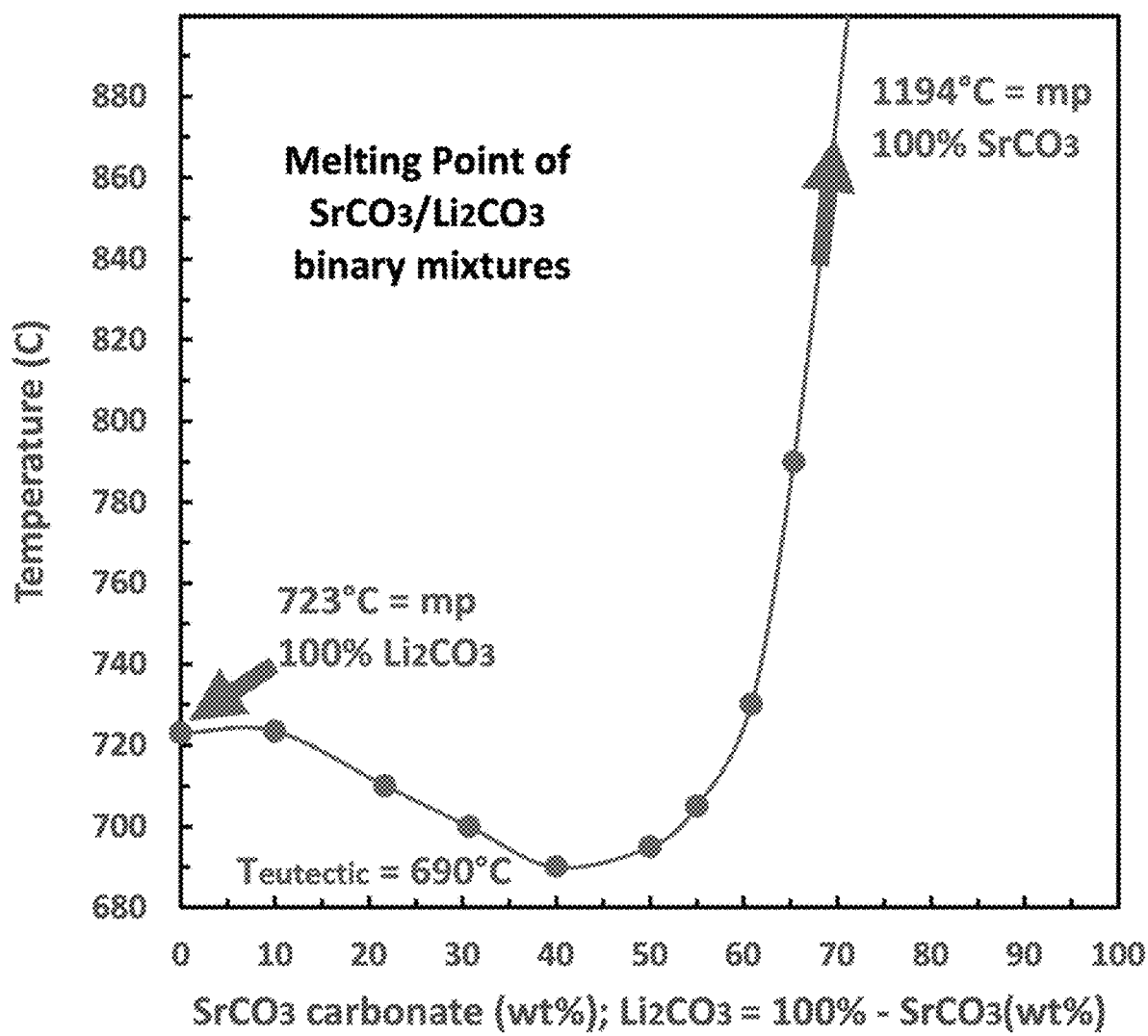
FIG. 13 is a line graph that depicts the melting point and solubility of mixes of a strontium carbonate and lithium carbonate binary salt.

The measured melting point of binary mixtures of SrCO$_3$ and Li$_2$CO$_3$ binary as a function of temperature is presented in FIG. 13. From FIG. 13, it is seen that the solubility of 99.4% SrCO$_3$ in Li$_2$CO$_3$ (99.8%, Green Chemical Co) is up to 65 wt % in the regular CO$_2$ splitting temperature domain (T<800° C.). The binary mix exhibits a minimum (eutectic point) melting point at 690° C. occurring at a composition of 40 wt % SrCO$_3$. It is likely that ternary composed of Li—SrCO$_3$ plus other salt mixes will exhibit lower eutectic temperatures. A lower 98.6% purity SrCO$_3$, containing minor ternary mix components (0.8% BaCO$_3$ and 0.2 wt % CaCO$_3$), exhibited a slightly lower eutectic temperature of 880° C. at 40 wt % composition in the same 60 wt % Li$_2$CO$_3$.

Example 12 relates to the overlapping affinity of strontium carbonate and lithium carbonate to bind and release CO$_2$.

An affinity for CO$_2$ is a critical decarbonization component in the molten carbonate electrolytic splitting and transformation of CO$_2$ to GNCs. In particular, the affinity of lithium carbon for CO$_2$ provides a balance that both facilitates rapid CO$_2$ intake into the molten salt, while providing an enriched carbon electrolytic media, that both facilitates electrochemical reduction of tetravalent carbon to carbon and as observed by the low overpotential to generate high electrolysis rates, but also to specifically generate GNCs, as observed by the high-purity of GNCs, such as CNTs. Below the CO$_2$ affinity of SrCO$_3$'s is calculated and it is revealed that unlike non-lithium alkali carbonates or other alkali earth carbonates, SrCO$_3$ exhibits a CO$_2$ affinity equivalent to that of Li$_2$CO$_3$. The equilibrium, K$_{MCO3}$, for alkali and alkali earth carbonates to separate to CO$_2$ and oxide, or to form carbonate from them in the reverse reaction, is given by the equilibrium for the decomposition, or in reverse for formation, of a carbonate from CO$_2$ and its oxide as shown in EQN. 6 above.

The equilibrium, K$_{MCO3}$ is calculated from the relationship of equilibria and free energy, where the gas constant, R=8.31 J/mol K:

$$\Delta G°M_{CO3} = -RT\ln K M_{MCO3}; K M_{CO3}(T) = e^{-\Delta G(T)/RT} \quad \text{(EQN. 8)}$$

K$_{CO3}$ is calculated from the thermochemical free energies for a variety of alkali and alkali earth carbonates, their oxides, and CO$_2$.

Figure 14:
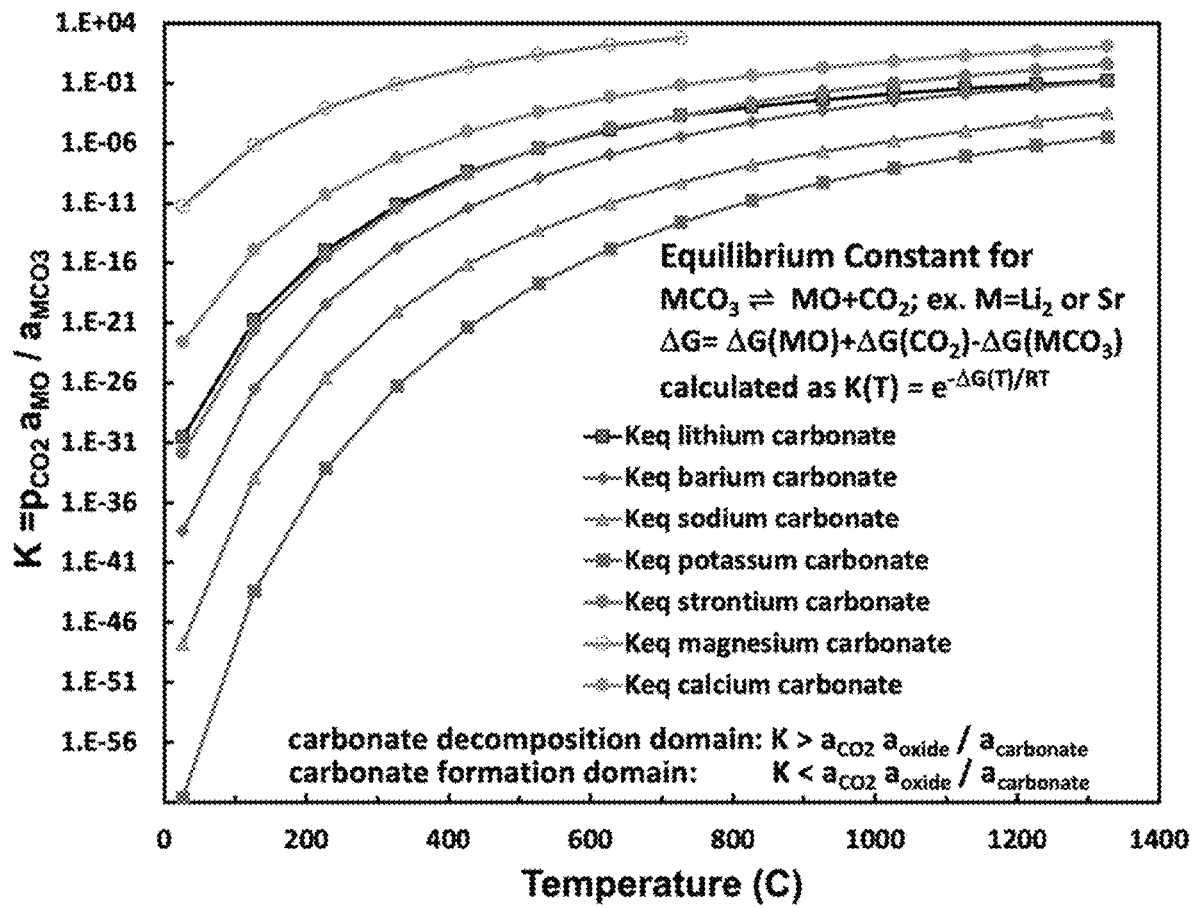
FIG. 14 is a line graph that depicts the equilibrium constant for various alkali and alkali earth carbonate salts.

FIG. 14 depicts a comparison of carbonate equilibrium constants to bind and release carbon dioxide by strontium carbonate compared to that of alkali or other alkali earth carbonates. These are plotted as a function of temperature. The equilibrium constants as a function of temperature for strontium, lithium, sodium, potassium, and barium carbonate. Equilibria constants are calculated from the free energy in accord with EQN. 8. The free energy is calculated from the metal carbonate, metal oxide, and, carbon dioxide enthalpies and entropies Above any given salt's equilibrium curve; that is in the low CO$_2$ activity domain (a$_{CO2}$ a$_{oxide}$/a$_{carbonate}$<K), the salt will spontaneously decompose, while in the high CO$_2$ activity domain, the salt will spontaneously form from CO$_2$ and the salt's oxide. Interestingly, FIG. 14 shows that the strontium carbonate equilibrium is similar to that of lithium carbonate and very different to that of the other carbonate salts. Specifically, the carbonate equilibria constants for strontium and lithium carbonate are nearly identical in the 400° C. to 800° C. domain in which lithium carbonate binary and trinary salt mixes are molten. We have previously observed a high tendency for electrolytic graphene nanocarbon formation in the 600° C. to 800° C. temperature range. At lower temperatures, the transition metal nucleation growth of carbon nanotubes is not observed, and at increasing temperatures above the 800° C., the 2-electron reduction to CO, rather than the 4-electron reduction to carbon increasingly dominates. It was postulated that the temperature domain from 600° C. to 800° C. for CO$_2$ splitting to GNCs is related to a "goldy locks" domain of affinity to bind and release CO$_2$ from molten carbonate. The comparable nature of the strontium to the lithium carbonate equilibria provides an unusual environment media conducive to the electrolytic splitting of carbon dioxide and its transformation to graphene nanocarbons.

Example 13 relates to overlapping electrolysis potentials of strontium carbonates and lithium carbonates.

FIG. 12 compared electrolysis potentials measured in 40 wt % strontium carbonate/60 wt % lithium carbonate electrolytes, both with and without added oxide, and compared these potentials to the electrolysis potentials for pure Li$_2$CO$_3$ with and without oxide, and also to the Na/BaCO$_3$ electrolyte. The electrolysis potential in a pure Li$_2$CO$_3$, as presented by the solid orange and dark blue dots, decreases when 1 m Li$_2$O is added to the electrolyte as presented by the solid yellow dots. The observed onset potential for CO$_2$ reduction decreased from 1.08V in the pure Li$_2$CO$_3$ electrolyte to 0.9 V with the 1 m Li$_2$O. As shown in FIG. 12, the onset potential is the same in pure Li$_2$O$_3$ as in the 40%/60% SrCO$_3$/Li$_2$CO$_3$ electrolyte. This correlates with the previously discussed similarity in the equilibria constants for the two salts shown in FIG. 13. The 40%/60% SrCO$_3$/Li$_2$CO$_3$ 770° C. electrolysis potential is presented as hollow dark blue circles. It is seen that this electrolyte exhibits a moderately higher overpotential at increasing current densities than the pure Li$_2$CO$_3$. Interestingly, the mixed 40%/60% electrolyte was more sensitive to oxide addition, as added SrO, than the pure Li$_2$CO$_3$ electrolyte, as added Li$_2$O. The addition of only 0.16 m SrO to the mixed electrolyte results in a similar decrease in potential to that in the 1 m Li$_2$O Li$_2$CO$_3$ electrolyte. As seen by the brown circles in FIG. 12, the addition of 1 m SrO to the 40%/60% SrCO$_3$/Li$_2$CO$_3$ electrolyte further decreased the electrolysis potential to an onset potential of only 0.8 V, and even at higher current densities, the electrolysis potential was lower than that in the $Li_2CO_3$ electrolytes.

Example 14 relates to strontium carbonate electrolyte electrolysis processes.

Figure 15:
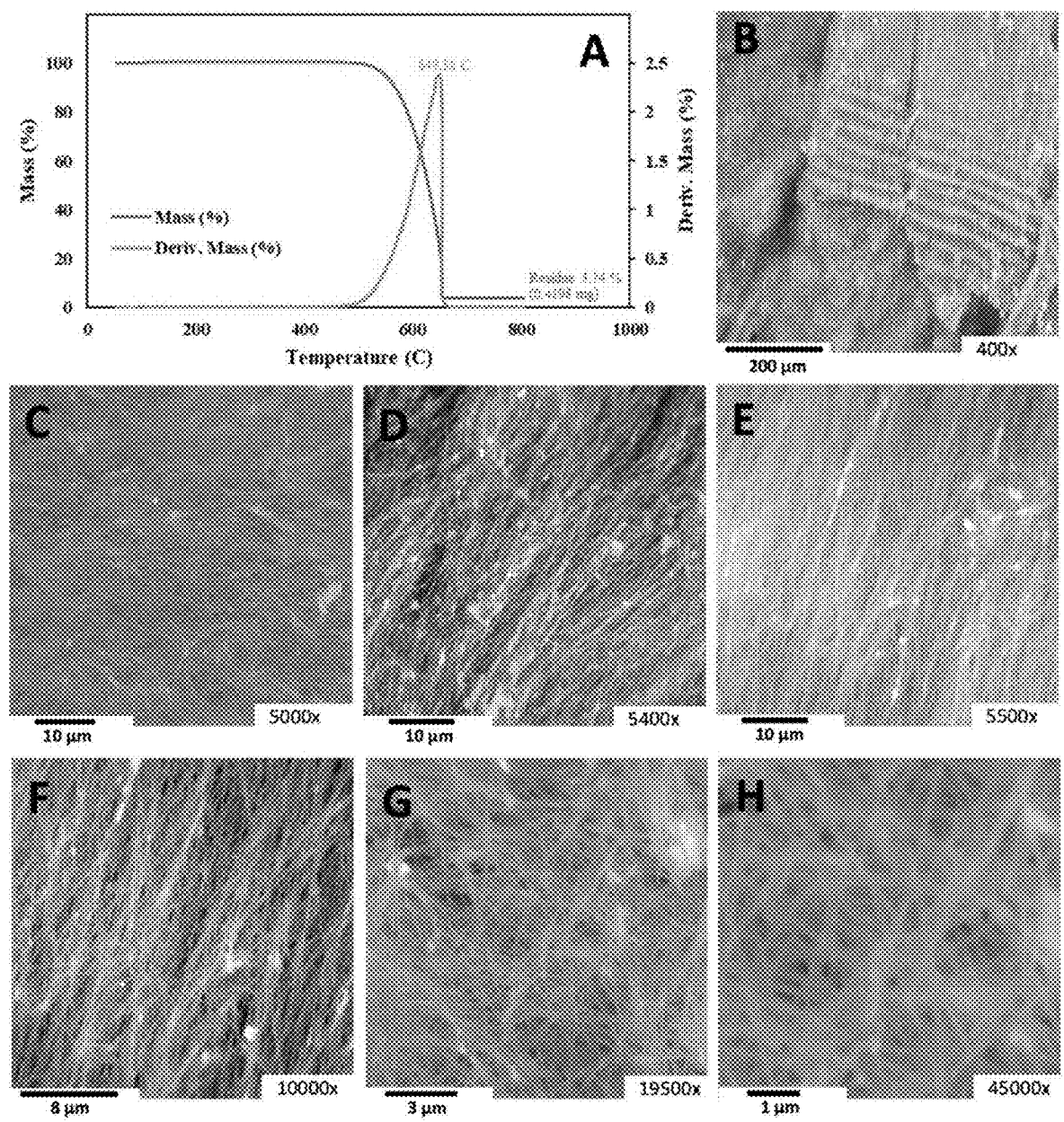
FIG. 15 shows a line graph (Panel A) that depicts TGA results for a carbon nanotube product made with an electrolyte of strontium carbonate (25 wt %) in lithium carbonate (75 wt %) and the remaining panels show SEM images of the carbon nanotube product.

Electrolysis processes were performed for 4 hours at 750° C. in lithium carbonate electrolytes with an increasing concentration of strontium carbonate using a vertical, flat Muntz brass cathode sandwiched by vertical, flat stainless steel cathodes (anodes are provided by the walls of the carbon pot). The electrolysis was studied as a function of electrolyte composition, electrolysis current density, electrolysis, electrolysis time, the number of repeat uses of the electrolyte and carbon pot, and the electrolysis electrode size. For electrolytes containing either 10, 25, 35, or 45% strontium carbonate at 750° C., the resultant high-purity CNT product was comparable to that obtained with a pure lithium carbonate electrolyte. FIG. 15 presents the TGA and SEM of the product obtained from a 25 wt % $SrCO_3$ in $Li_2CO_3$ electrolysis conducted at a current density of J=0.2 $A/cm^2$ for 4 hours. In FIG. 15 the magnification of each panel was: B: 400×, C: 5000×, D: 5400×, E: 5500×, F: 10,000×, G: 19,500×, H: 45,000×.

As seen in FIG. 15, the CNTs are of comparable, high (>>90%) purity compared to the pure $Li_2CO_3$ product of FIG. 12 and from the TGA, the post-combustion residue is less than 4% while the TGA inflection point temperature for combustion is 650° C. EDS along the CNT strands in the SEM exhibit 100% elemental carbon, while SEM bright spots at the CNT tips are iron. In prior studies, the Raman spectra has been documented, TEM, points of nucleation, EDS and HAADF elemental analysis, and X-ray diffraction of the synthesized GNCs. Herein the focus was on the physical chemistry of the solubility, equilibration, and demonstration of the synthesis of high-purity GNCs, such as CNTs and carbon nano-onions, with an unusual series of readily available strontium carbonate electrolytes to ensure its wide-spread available for large scale decarbonization A comparable CNT product was obtained at 0.2 $A/cm^2$ electrolysis current density for both less concentrated (10 wt %) and more concentrated (35 wt %) $SrCO_3$ in $Li_2CO_3$ electrolytes, each studied at a current density of J=0.2 $A/cm^2$. Additional electrolyses in the 25 wt % $SrCO_3$ electrolytes were repeated a total of 9 times reusing the same electrolyte and the same carbon pot and cathode. The electrolysis yielded comparable quality CNT product with no indication of any deterioration of the carbon pot, the anode comprising the inner walls of the carbon pot or the cathode.

Rather than a 4-hour electrolysis at 0.2 $A/cm^2$ current density, electrolysis processes were additionally conducted in the 25 wt % $SrCO_3$ electrolyte at a lower current density (0.1 $A/cm^2$) and for a longer electrolysis duration (16 hours) product. Finally, a high current density 0.4 $A/cm^2$ electrolysis for four hours was performed in the 35 wt % $SrCO_3$ electrolyte. In both cases, the 0.1A and 0.4 A electrolyses again produced a comparable quality carbon nanotube containing product.

Figure 16:
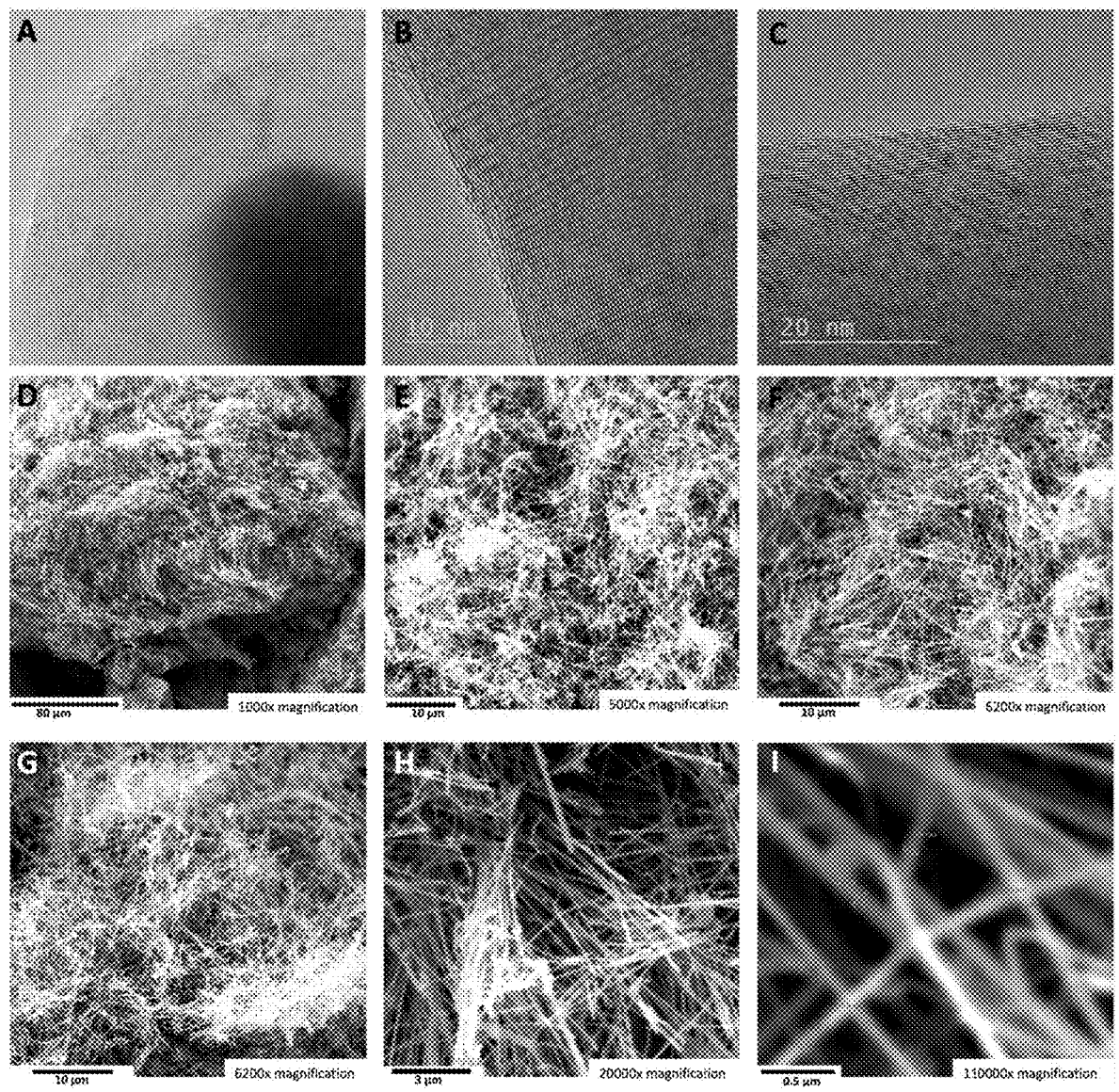
FIG. 16 shows SEM images of a carbon nanotube product made with a high current density and a strontium carbonate (45 wt %) and lithium carbonate (55 wt %) binary electrolyte.

FIG. 16 shows TEM SEM images of a carbon nanotube containing product from a high current 0.6$A/cm^2$, four hour electrolysis in a 45 wt % $SrCO_3$ in 55 wt % $Li_2CO_3$ electrolyte at of 790° C. with a stainless steel 304 anode and a 120 $cm^2$ area brass cathode. TEM (6A to C) show the product as comprising pure carbon nanotubes graphene walls adjacent to a hollow core. The nucleation metal in the inner tip of the CNT is seen in FIG. 6A. TEM are shown with 20 nm (A&C) and 10 nm (B) scale (3.5 to 7 million× magnification) showing the distinctive hemispherical concentric graphene layers surrounding the nucleation catalyst (C) and the concentric graphene adjacent layers above and below the hollow carbon nanotube core (B,C). The SEM magnification of the panels in FIG. 16 are as follows: D: 1,000×, E: 5,000×, F: 6,200×, G: 6,200×, H: 20,000×, or I: 110,000×.

As shown in FIG. 16, the CNT containing product of the high current density electrolysis in the 45 wt % $SrCO_3$ electrolyte yielded comparable quality CNT product to those in FIG. 12 and FIG. 15. The inventors have previously demonstrated that high current density conditions can induce torsional growth of the CNTs, and a minor, but evident, increased tangling of the carbon nanotubes is seen in the high current density growth product in FIG. 16.

Example 15 relates to strontium carbonate electrolyte electrolysis processes with a greater amount of strontium carbonate.

Figure 17:
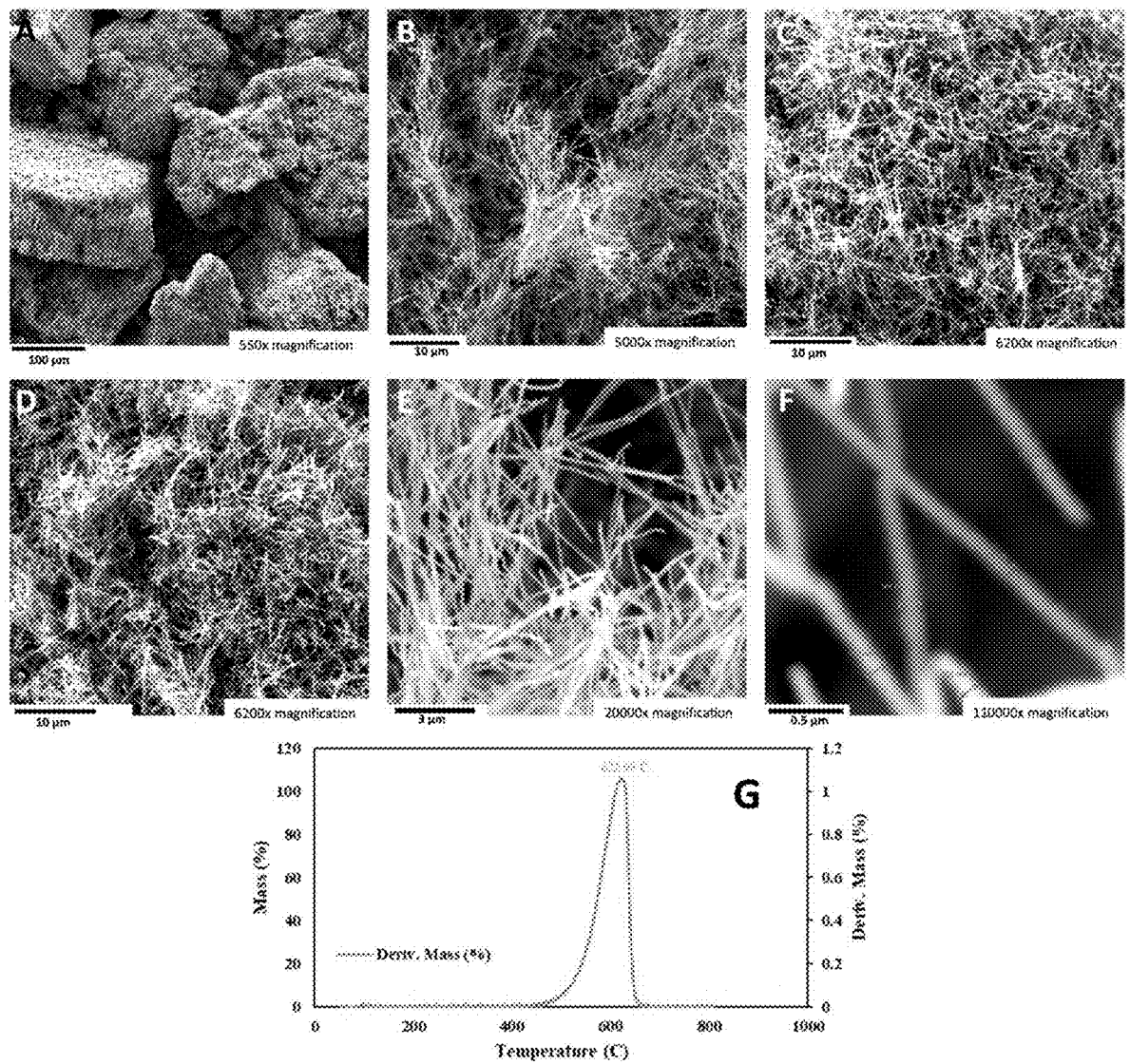
FIG. 17 shows Differential TGA and SEM images of a carbon nanotube product made with a strontium carbonate (50 wt %) and lithium carbonate (50 wt %) binary electrolyte.

FIG. 17 shows SEM images and a differential TGA of a CNT containing product of an electrolysis process performed for 16 hours with 50 wt % of each of strontium carbonate and lithium carbonate at 785° C. and a current density of 0.28 $A/cm^2$ with a stainless steel 304 anode at a 1,600 $cm^2$ area brass cathode. The magnification of the panels in FIG. 17 are as follows: A: 550×, B: 5,000×, C: 6,200×, D: 6,200×, E: 20,000×, and F: 110,000.G: shows the Differential TGA of the mass loss for the 50% Sr electrolyte product measured with a temperature ramp of 5° C./minute under air. Due to its lower combustion temperature, as compared to graphene nanocarbon, amorphous carbon is more susceptible to oxidation, burning more easily and exhibiting a TGA derivative of mass versus temperature inflection point, $T_{infl}$, at approximately 300° C. Alternatively, the carbon nanotubes synthesized in the strontium-based electrolytes retain this high degree of graphitization, as exemplified for the 50% strontium carbonate electrolyte in FIG. 6G, with measured $T_{infl}$=622° C.

The higher amount of strontium carbonate (50 wt %) electrolysis processes were conducted at higher temperatures and a current density lower than 0.6 $A/cm^2$ to overcome anticipated mass transfer limitations. As shown in FIG. 17, the product of a 785° C. electrolysis at a current density of 0.28 $A/cm^2$ is high-purity CNT containing product.

Figure 18:
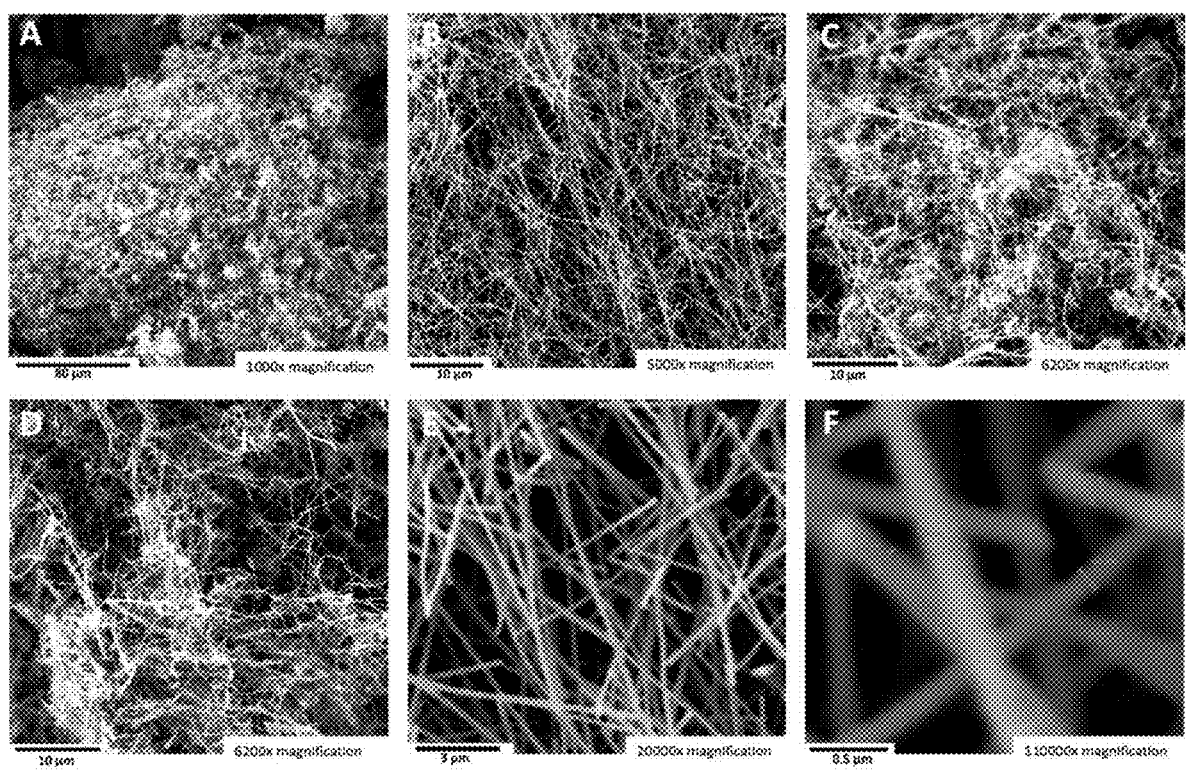
FIG. 18 shows SEM images of a carbon nanotube product made with a strontium carbonate (60 wt %) and lithium carbonate (40 wt %) binary electrolyte.

The success of the 50% $SrCO_3$ electrolysis process suggested that lower temperatures were viable for these strontium carbonate concentrated electrolytes. Therefore, a 60% $SrCO_3$ in 40% $Li_2CO_3$ electrolyte process was conducted for 16 hours at 770° using a current density of 0.2 $A/cm^2$ with a stainless steel 304 anode at a 288 $cm^2$ area brass cathode. FIG. 18 depicts the SEM images of this product of the 60% $SrCO_3$ and 40 wt % $Li_2CO_3$ electrolysis. The magnification of the panels in FIG. 18 are as follows: A: 1000×, B: 5,000×, C: 6200×, D: 6,200×, E: 20,000×, or F: 110,000×. Once again, a high-purity CNT product is attained.

Example 16 relates to electrolysis processes that use low-lithium carbonate electrolyte mixtures with more than two constituent components.

It has been demonstrated previously that low-level $Li_2O$ additions can improve purities of the products of electrolysis processes that use a $Li_2CO_3$ electrolyte. The oxide can induce the formation of some twisting of the carbon nanotubes due to an increase of $sp^3$ defects and in one case branched, rather than discrete CNTs can form. As with $Li_2CO_3$, $Li_2O$ is an expensive lithium salt due to scarcity. As with $SrCO_3$, SrO is an inexpensive, and it can be inexpensive addition to a molten carbonate electrolyte for decarbonization.

Figure 19:
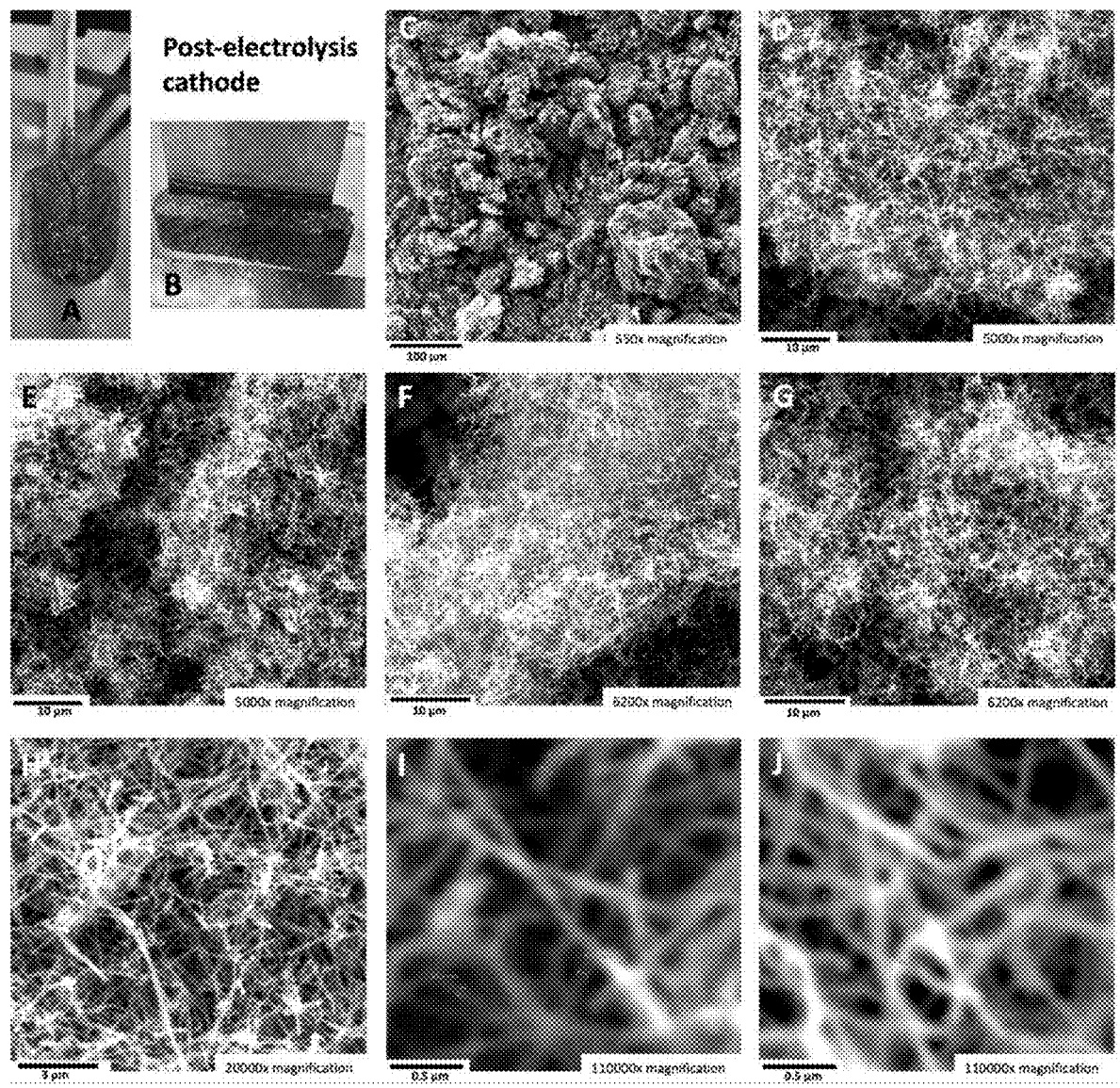
FIG. 19 shows a graphene nanocarbon product made with a strontium carbonate (64 wt %), lithium carbonate (35 wt %) and strontium oxide (1 wt %) electrolyte. Panels A and B show photographs of the product and the remaining panels show SEM images of the product.

It was hypothesized that in the domain of using an electrolyte with a high strontium concentration, the addition of strontium oxide as a ternary compound to the binary $SrCO_3/Li_2CO_3$ electrolyte mixture may improve mass transfer (from carbon dioxide to the solid GNC product) by increasing strontium solubility and decreasing the viscosity. As shown in FIG. 19, a high-purity CNT product is indeed formed in a low $Li_2CO_3$ concentration, and high $SrCO_3$ concentration electrolyte upon the addition of SrO as a ternary component. The electrolysis was conducted for four hours at 770° C. at a current density of 0.6 A/cm² with a stainless steel 304 anode at a 96 cm² area brass cathode. The magnification of the panels in FIG. 19 are: C: 550×, D&E: 5,000×, F&G: 6,200×, H: 20,000×, and I&J: 110,000× magnification. The 64 wt % $SrCO_3$ plus 1% SrO electrolyte contained only 35 wt % $Li_2CO_3$. The product continued to comprise high-purity CNTs. As expected with the addition of an oxide, the CNTs are more twisted, but remain of high-purity. Interestingly, as seen in panels I and J of FIG. 19, the diameter of the carbon nanotube ranges from 70 to 90 nm, which is smaller than over 100 nm generally observed in the electrolytes without added oxide.

Example 17 relates to use of a strontium containing low-lithium carbonate electrolyte to produce a CNO product.

Figure 20:
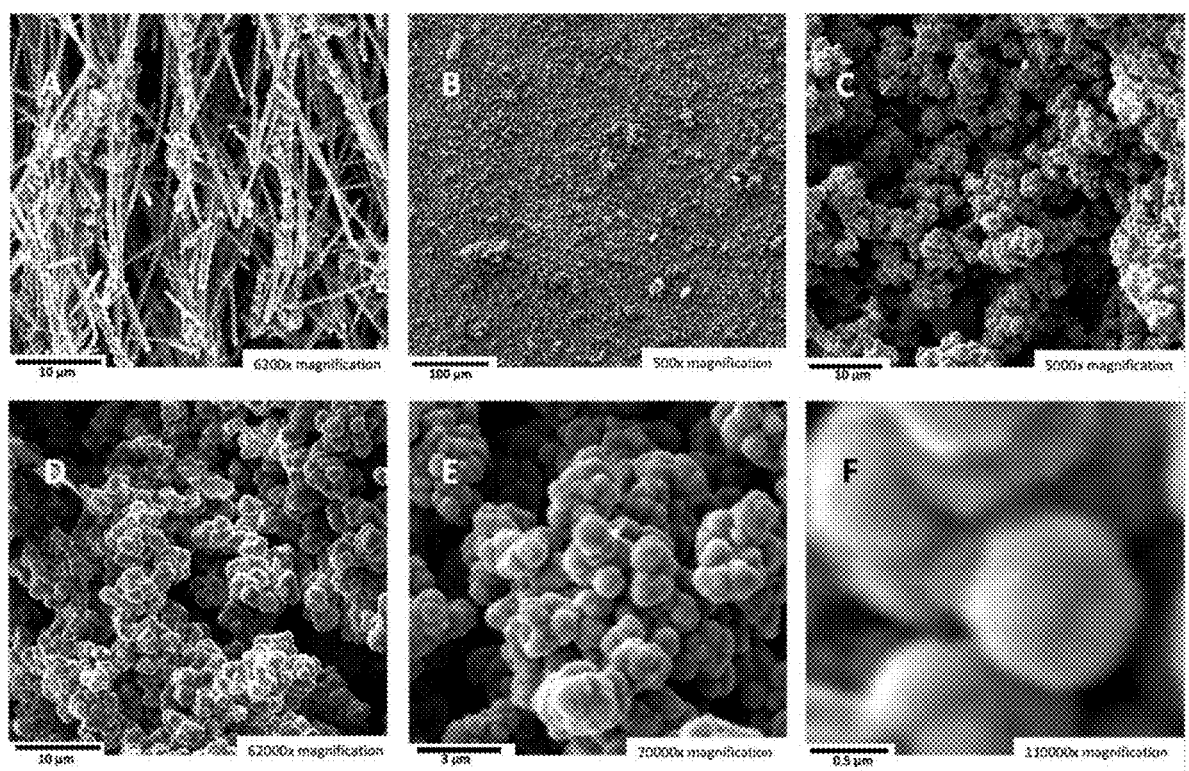
FIG. 20 shows SEM images of a carbon nano-onion product made with a strontium carbonate (54 wt %), lithium carbonate (41 wt %) electrolyte and sodium carbonate (5 wt %) ternary electrolyte.

FIG. 20 shows the SEM images of CNOs synthesized using 54 wt % $SrCO_3$, 41 wt % $Li_2CO_3$, and 5 wt % $Na_2CO_3$ electrolyte at 770° C. with a current density of 0.6 A/cm² using a stainless steel 304 carbon pot case as the anode and a 168 cm² area brass cathode. The magnification of the panels in FIG. 20 are: A: 6200×, B: 500×, C: 5,000×, D: 6,200×, E: 20,000×, or F: 110,000× magnification.

Panel A of FIG. 20 shows an SEM of a lower purity CNO product grown in the same electrolyte exhibiting a mix of CNT, CNO, and carbon nano-bamboos. Panels B through G show SEM of a product with higher purity CNO product. Electrolysis processes were conducted with sodium carbonate added as an alternative ternary component to the strontium/lithium binary mixture to probe alternative low lithium carbonate domains. A mix containing ⅓ $Li_2CO_3$, ⅓ $SrCO_3$, and ⅓ $Na_2CO_3$ was fully molten at 750° C., and at 750° C. a 4-hour electrolysis was conducted at 0.2 A/cm². The CNT product was a good quality, at 80-90% purity by inspection of the SEM, but not as high as the >>90% purity evident in the unitary $Li_2CO_3$ and binary $Li_2CO_3/SrCO_3$ electrolyte, as described hereinabove. However, as expected from the sodium-containing electrolysis potentials shown in FIG. 12, the electrolysis potential was 0.6 V higher when using sodium-containing electrolyte rather than the sodium-free electrolytes. A 45 wt % $Li_2CO_3$, 45% $SrCO_3$, 9 wt % $Na_2CO_3$ and 1% $LiO_2$ was again higher in voltage, and at 750° C. a 4-hour electrolysis at 0.4 A/cm² formed CNT product of good quality, at 85-90% purity.

A lower concentration of $Na_2CO_3$, along with a high concentration of $SrCO_3$ electrolyte did facilitate CNT formation, albeit at a lower quality. This 770° C. electrolysis at 0.6 A/cm² in 50%/45%/5% lithium/strontium carbonate produced 80% purity CNTs by SEM inspection. The addition of 1% strontium oxide consistently yielded an improved, good quality 85% purity CNT formation in 770° C. electrolytes at 0.4 or 0.6 A/cm² both in 40%/50%/9% and in 40%/54%/5% lithium/strontium/sodium carbonate electrolytes containing 1 wt % strontium oxide.

Interestingly as shown in FIG. 20, an electrolyte with a lower concentration of sodium carbonate can generate a product with a high-purity (i.e. high wt % or a high percentage of the constituent structures shown in the images of the product) of carbon nano-onion (CNO) as constituent carbon nanostructures, rather than a product with a high-purity of CNT as constituent carbon nanostructures. In a lithium electrolyte without other alkali or alkali earth cations, the inventors have previously demonstrated production of the carbon nano-onions; such as is in $Li_2CO_3$ containing concentrated (5.9 m) $Li_2O_3$. As seen in FIG. 20, CNOs were generated using a high strontium concentration electrolyte at 770° C. in a 54%/41%/5% lithium/strontium/sodium carbonate at 0.6 A/cm². The electrolysis (in the 3rd electrolysis run) generated a product with greater than 90% CNOs. The percent of CNOs the product grew from 35% CNO in the first electrolysis, to 65% CNO in the second electrolysis, and in the third electrolysis still in the same electrolyte, and at the same electrodes, to 95% purity CNO (as shown in FIG. 20 panels B-F). The third electrolysis product showed substantially less than 1% CNTs, as seen in panels B-F. A subsequent fourth electrolysis continued to yield similar high-purity CNOs. SEM of a run of the electrolyte batch that had lower CNO product, is shown in FIG. 20 Panel A, and exhibited a mixed CNT, CNO, and carbon nano-bamboo products indicating that the growth of the three products GNCs are interrelated. The high-purity CNO product was also observed using a 770° C. 65%/25%/10% lithium/strontium/sodium carbonate at 0.2 A/cm².

The product with a high purity of CNOs was also generated in the absence of sodium carbonate, when the electrolysis was perturbed, such as by lowering the cell temperature or by changing the electrolysis anode. For example, when the cell is lined with Nichrome A, the anode is made of Nichrome A (composition of 80% Ni and 20% chrome), rather than 304 stainless, and iron is then effectively excluded from the cell. Modifying and inhibiting transition metal nucleation can enhance CNO formation. Electrolysis in this Nichrome A anode cell at 770° C. electrolysis in a 75%/25% lithium/strontium carbonate at 0.2 A/cm² produced a product with 90% CNOs, by SEM inspection.

Without added oxide, a 50% strontium carbonate electrolyte containing barium 25% carbonate did not produce CNOs and <10% CNTs, as electrolyzed at 770° C. 25 wt % $Li_2CO_3$/50 wt % $SrCO_3$/25 wt % $BaCO_3$ at 0.6A cm². An electrolyte containing both sodium carbonate and barium oxide, further increased the electrolysis potential by 0.1V and generated<50% lower quality purity CNTs at either 0.07, 10, 0.20, or 0.40 A/cm² in 40 wt % $SrCO_3$, 40 wt % $Li_2CO_3$, 15 wt % $Na_2CO_3$, and 5 wt % BaO electrolyte 775° C.

Example 18 relates to doping carbon nanostructures made with a low-lithium carbonate electrolyte It is known that boron, added as borate salts to the lithium electrolyzed during molten carbonate electrolyses, can dope the CNT acting to increase the conductivity of the CNT product by an order of magnitude. Here, the addition of borax ($Na_2B_4O_7 \cdot 10H_2O$) to a strontium-rich electrolyte was investigated to add boron and probe its effect on the purity of an electrolysis product. It is known that borax loses its water contents at temperatures greater than 602° C. Electrolytes were probed in x/y/z as $Li_2CO_3$ wt %/$SrCO_3$ wt %/borax wt % electrolytes. Electrolysis in both 75/24/1, 75/22/3, and 75/20/5 electrolytes for both 4 and 16 hours at 0.6 A/cm$^2$ in 800° C. yielded good quality CNTs by SEM analysis.

Example 19 relates to use of a low-lithium, strontium-containing carbonate electrolyte with a scaled-up electrode.

Electrolysis processes described herein above were studied using small or medium-sized Muntz brass cathodes. Specifically, the electrolyses in FIGS. 15, 16 and 18-20 were conducted using cathodes with a surface area under 200 cm$^2$, while the electrolysis that produced the product shown in FIG. 17 electrolysis utilized a cathode with an area of 1,600 cm$^2$. Strontium electrolyte electrolyses can be routinely performed with larger cathodes (and at higher current densities) to facilitate large-scale carbon capture.

Figure 21:
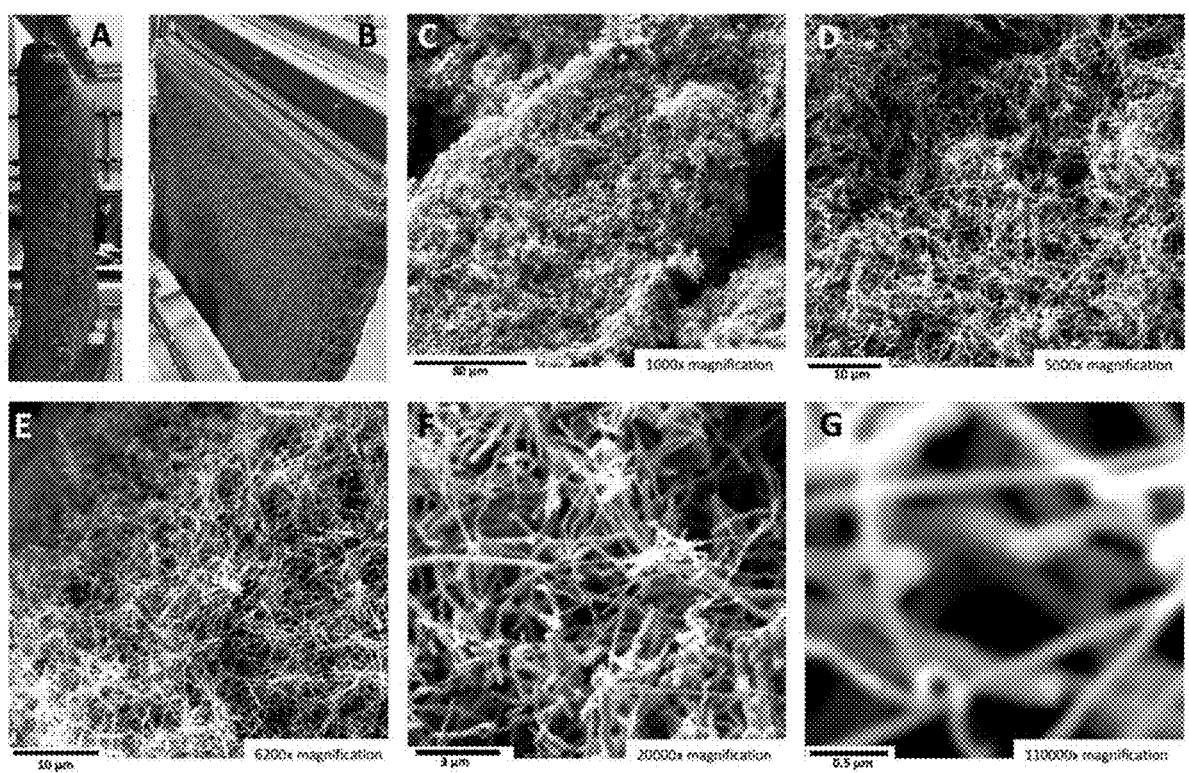
FIG. 21 shows images of a carbon nanotube product made with a strontium carbonate (50 wt %) and lithium carbonate (50 wt %) binary electrolyte using a high current density and a large area cathode. Panels A and B show photos of the product and the remaining panels show SEM images of the product.

FIG. 21 shows the product of a 770° C. 50% $SrCO_3$ and 50% $Li_2CO_3$ 0.6 A/cm$^2$ current density electrolysis conducts at 770° C. and J=0.6 A/cm$^2$ utilizing the stainless steel 304 carbon pot case as the anode with an 11,000 cm$^2$ surface area Muntz brass cathode. The magnification of each SEM panel in FIG. 21 is as follows: C: 1,000×, D: 5000×, E; 6200×; F: 20,000×, G: 110,000×.

Panel A of FIG. 21 shows a photograph of the hot Muntz brass cathode subsequent to electrolysis as lifted from the electrolysis chamber below. Panel B of FIG. 21 shows a photograph of the same cathode subsequent to cooling. The cathode deposit is approximately 4" thick. SEM characterization of the product of the high surface area, high current density 40% $SrCO_3$ electrolysis is seen in panels C-G of FIG. 21. Once again, a high-purity CNT product is attained, and as was seen in the other high-current density electrolysis product of FIG. 16, an increased tangling of the carbon nanotubes is also evident in the carbon nanotube containing product.

Note that the cathode in FIG. 21 is vertically oriented. This considerably decreases the physical plant footprint required for the molten carbonate electrolysis processes for decarbonization described herein.

Without being bound by any particular theory, lithium carbonate is less available than strontium carbonate, both due to its lower natural abundance and lithium carbonate's increasing EV and Li-ion battery demand. The high cost of lithium carbonate can be an impediment to the electrolytic processes described herein for molten carbonate decarbonization. Carbonate carbonization electrolytes prepared from concentrated strontium carbonate described herein are substantially more cost-effective than lithium-based electrolytes. The incompatibility of the high solidus point of $SrCO_3$ to the preferred molten carbonate decarbonization range of <800° C. has been overcome by determining that strontium carbonate is unusually soluble (to 65% at 790° C. in lithium carbonate. Ternary or higher carbonate mixed electrolytes may further decrease lithium concentration levels in the carbonate electrolyte. Thermodynamic equilibrium for the affinity of strontium carbonate to absorb and release carbon dioxide have been calculated, and are shown to be comparable to lithium carbonate, and substantially different than that of the other corresponding alkali and alkali earth carbonate equilibria.

The use of a low-lithium electrolyte that can provide an electrolyte melting point within the optimal process range for molten carbonate electrolytic conversion of $CO_2$ to GNC growth of between about 700° C. to about 850° C. has been investigated for concentrated strontium carbonate electrolytes. The electrochemical potential of molten carbonate electrolysis was investigated, and it is shown that the electrolysis potential is low in both pure lithium and binary strontium/lithium electrolytes, but higher in sodium or barium carbonate electrolytes.

Low-lithium electrolysis processes were performed using a vertical planar Monel, cathode and vertical anodes comprised of stainless steel or Nichrome. Effective high-concentration strontium demonstrated electrolytes which produce high-quality GNC products include both binary mixtures (for example, strontium/lithium carbonate or strontium oxide/lithium carbonate) and ternary mixture electrolytes (for example, strontium carbonate/lithium carbonate/strontium oxide or borate or sodium salts).

A high current density of 0.6 A/cm$^2$ is consistent with industrial-rate electrochemical processes. Binary and ternary strontium carbonate electrolytes were tested for $CO_2$ electrolytic decarbonization using an electrolysis temperature of 770° C., a high current density of 0.6 A/cm$^2$ and a low-lithium carbonate electrolyte comprising 64 wt % $SrCO_3$ and 35 wt % $Li_2CO_3$ with about 1 wt % SrO. This low-lithium carbonate electrolyte was among those demonstrated as effective for high-purity carbon nanotube electrosynthesis and that substantially decreased the concentration of lithium carbonated required within the electrolyte. This low-lithium carbonate electrolyte may also be effective for synthesizing a product with a high purity of CNOs using carbon dioxide as a source of carbon.

Example 20 relates to use of a ternary or quaternary, low-lithium carbonate electrolyte with strontium borate This example relates to use of a ternary, low-lithium carbonate electrolyte that comprises strontium borate to lower the lithium carbonate content of a $CO_2$ splitting electrolyte salt and to produce a product with high-quality CNTs.

The strontium borate was synthesized according to the general procedure of T. K. Seshagiri, et al., Spectroscopic studies of thulium doped strontium borate glass, *J. Non-Crystalline Solids*, 356, 1032-1036, the entire contents of which are incorporated herein by reference, which describes the following equation:

$$SrCO_3 + 4H_3BO_3 \rightarrow SrB_4O_7 + 6H_2O + CO_2 \quad \text{(EQN 9)}$$

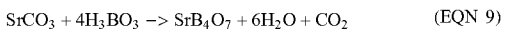

Stoichiometric ratios of reactants were used with 5% excess for acid boric. Specifically, 148 g $SrCO_3$ was mixed with 260 g of boric acid and then ground with a Magic Bullet Blender to decrease particle size and enhance uniformity. The mixture was then placed in a 600° C. kiln for about 4 hours at 600° C. and then cooled down to room temperature to produce a sintered sample. The sintered sample was then re-ground and placed in a 900° C. kiln overnight. The initial weight of powder was 408 g, after the first stage the mass was around 261 g and after the second treatment it was around 240 g, close to the theoretical yield of 242 g.

It was found that a simplified synthesis reaction can also be performed which prevents the evolution of water vapor by using $B_2O_3$ (Chemsavers Boron oxide, 99% pure) according to the following equation:

$$SrCO_3 + 2B_2O_3 \rightarrow SrB_4O_7 + CO_2 \quad \text{(EQN 10)}$$

An electrolysis process for splitting $CO_2$ was performed using three strontium borate ternary electrolytes. The electrolytes were composed of 10 wt % $SrB_4O_7$, and either (1) 60, (2) 55, or (3) 45 wt % $SrCO_3$ and either (1) 30, (2) 35, or (3) 45 wt % $Li_2CO_3$. The electrolytes were melted at 770° C. Each of these ternary melted strontium borate containing electrolytes appear to have a lower viscosity than the equivalent binary mix electrolyte without strontium borate.

The electrolysis process was conducted using three ternary borates at 770° C., applying an electrolysis current density of 0.6 A/cm² using a Muntz Brass cathode and the electrolysis case was made 304 stainless steel with the walls of the case serving as the anode.

Figure 22:
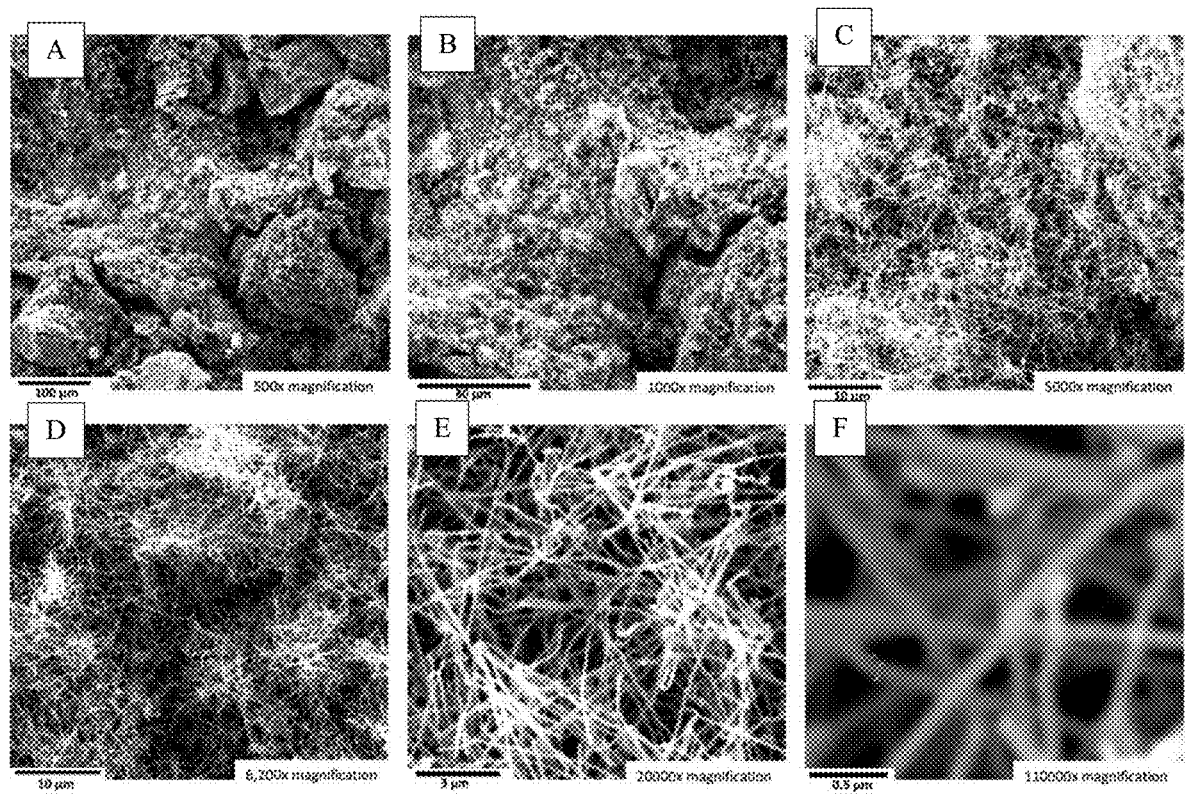
FIG. 22 shows images of a carbon nanostructure comprising product made with a ternary, strontium carbonate (45 wt %), lithium carbonate (45 wt %) electrolyte that comprised strontium borate (10 wt %).
Figure 23:
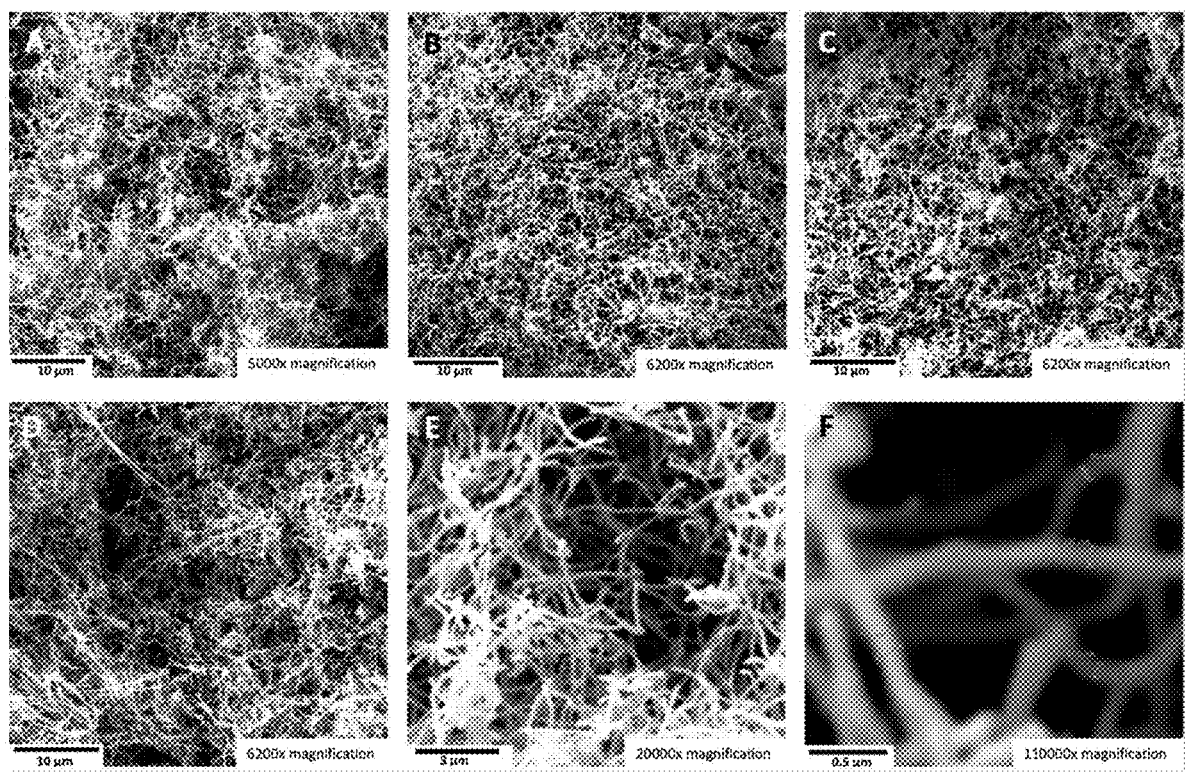
FIG. 23 shows images of a carbon nanostructure comprising product made with a ternary, strontium carbonate (62 wt %), lithium carbonate (30 wt %) electrolyte that comprised boron oxide (6 wt %) and strontium oxide (2 wt %).
Figure 24:
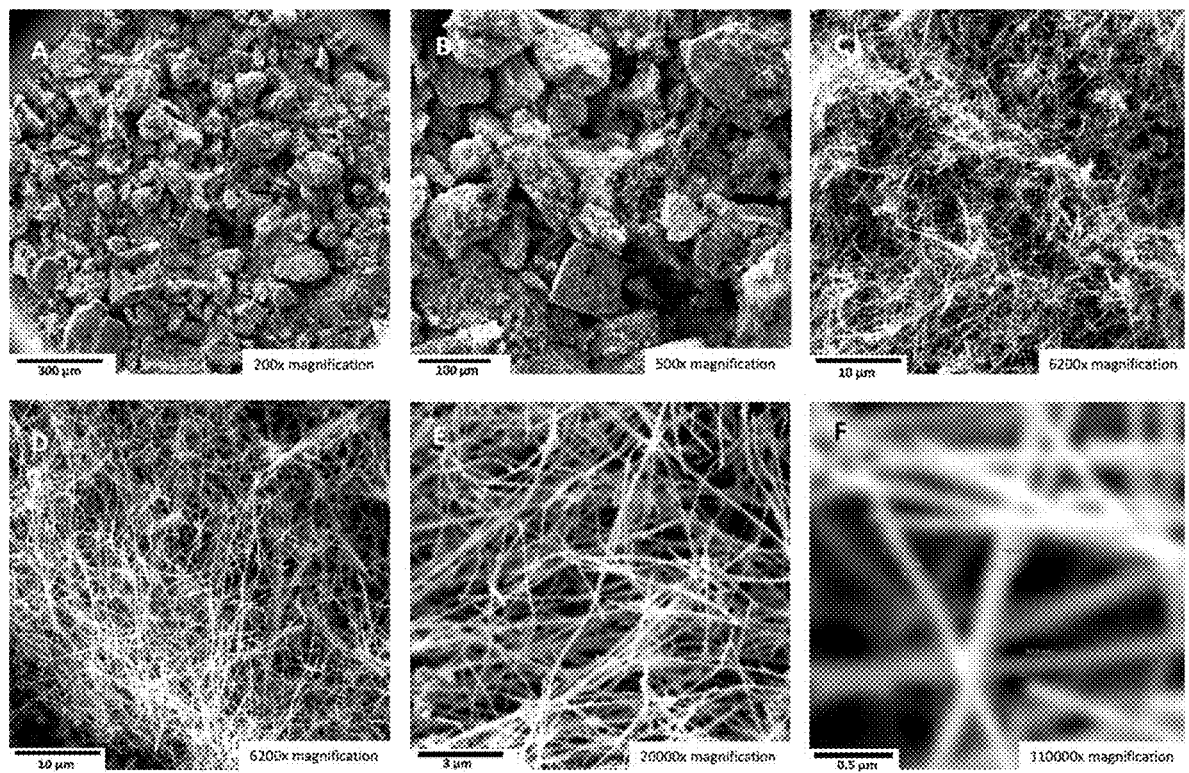
FIG. 24 shows images of a carbon nanostructure comprising product made with a quaternary, strontium carbonate (62 wt %), lithium carbonate (30 wt %) electrolyte that comprised boron oxide (6 wt %) and strontium oxide (2 wt %).

The carbon product grew uniformly on each side of the cathode facing one or the other of the anode walls. Each of the electrolyses in the four component ternary borate containing electrolytes formed a high-quality CNT product. SEM of the product made using the 10/45/45 wt % $SrB_4O_7$/$SrCO_3$/$Li_2CO_3$ electrolyte is shown in FIG. 22 with the following magnifications: panel A: 5000×, panel B: 1,000×, panel C: 5,000×, panel D: 6,200×, panel E: 20,000 and panel F: 110,000× magnification. SEM of the product made using a 10/60/30 wt % $SrB_4O_7$/$SrCO_3$/$Li_2CO_3$ electrolyte is shown in FIG. 23 with the following magnifications: panel A: 5000×, panel B: 5,000×, panel C: 6,200×, panel D: 6,200×, panel E: 20,000 and panel F: 110,000× magnification. Boron oxide, $B_2O_3$ also maintains the same boron valence state B (+3), as $SrB_4O_7 \cdot B_2O_3$ also has a low melting point of 450° C. Rather than an initial step of the synthesis of $SrB_4O_7$, instead boron oxide ($B_2O_3$ with a melting point (mp) of about 450° C.) was added directly as a component in the electrolyte. A straightforward quaternary $SrCO_3$ electrolyte also containing, only 30 wt % $Li_2CO_3$ and boron oxide, leads to the electrosynthesis of high-purity carbon CNTs. $B_2O_z$ was added directly as a component in the electrolyte. Additionally, strontium oxide was added and the solid mix was heated to 800° C. for the electrolysis of the quaternary Jun. 2, 1962/30 wt % $B_2O_3$/ScO/$SrCO_3$/$Li_2CO_3$ electrolyte that is shown in FIG. 24 with the following magnifications: panel A: 200×, panel B: 500×, panel C: 6,200×, panel D: 6,200×, panel E: 20,000 and panel F: 110,000× magnification. A quaternary electrolyte such as May 2, 1964/30 wt % $B_2O_3$/SrO/$SrCO_3$/$Li_2CO_3$ and other similar quaternary electrolytes are also of use. Similarly, an electrolyte mix of greater than 4 parts can further decrease the molten electrolyte viscosity of melting point.

Additionally, binary electrolyte mixes were prepared with 0, 1 or 3% $SrB_4O_7$ in $Li_2CO_3$. It had been previously observed that the electrical conductivity of CNTs prepared by electrolysis in 0% borate of 11,500 S/m was increased to 29,000 S/m when 2.9 wt % lithium borate, $LiBO_3$, was added to the electrolysis electrolyte.

A similar phenomenon of increased CNT electrical conductivity was observed when 1% or 3% $SrB_4O_7$, rather than lithium borate, was added to the electrolysis electrolyte. Note, the boron valence state, B (+3) remains the same in the added $LiBO_2$ and $SrB_4O_7$ salts. The 1% or 3% $SrB_4O_7$ CNT products have measured electrical conductivity of 19,100 and 27,600 S/m respectively. Conductivity was measured with a two-point probe (1.3 cm diameter plates) cell, under pressure to remove powder voids, and digital calipers used to measure thickness of the pressed powder between the plates, with a Teledyne 5 digit ohmmeter.

Example 21 relates to quinary (meaning five part) and senary (meaning six part) $SrCO_3$ electrolytes containing as little as 15% (on a weight basis) $Li_2CO_3$.

Sodium carbonate was added as an alternative ternary component to the strontium/lithium binary mixture to probe alternative low lithium carbonate domains. A mixture comprising ternary of $Li_2CO_3$, ⅓ of $SrCO_3$, and ⅓ of $Na_2CO_3$ was fully molten at 750° C., and at 750° C., a 4-hour electrolysis was conducted at 0.2 A/cm². The CNT product was of good quality according to inspection via SEM. However, as expected from the sodium-containing electrolysis potentials in FIG. 12, the electrolysis potential was 0.6 V higher than that of the Na-free electrolytes. The quaternary electrolyte 45 wt % $Li_2CO_3$, 45% $SrCO_3$, 9 wt % $Na_2CO_3$ and 1% SrO concentrations were again higher in voltage, and at 750° C., 4 hours of electrolysis at 0.4 A/cm² and resulted in a good quality CNT products.

A lower concentration of $Na_2CO_3$, along with a high concentration of $SrCO_3$ electrolyte, also facilitated CNT formation. This includes 770° C. electrolysis at 0.6 A/cm² in 50%/45%/5% lithium/strontium/sodium carbonate ternary electrolyte. The addition of 1% strontium oxide consistently yielded improved CNT quality formation in 770° C. electrolytes at 0.4 or 0.6 A/cm² in 40%/50%/9% or in 40%/54%/5% lithium/strontium/sodium carbonate quaternary electrolytes containing 1 wt % strontium oxide.

Without adding oxide, such as a 50% strontium carbonate electrolyte containing barium 25% carbonate and generated lower quality CNTs; this ternary 25 wt % $Li_2CO_3$/50 wt % $SrCO_3$/25 wt % $BaCO_3$ at 0.6 A cm² electrolyte was electrolyzed at 770° C. A ternary electrolyte containing sodium carbonate and barium oxide, rather than barium carbonate, further increased the electrolysis potential by 0.1 V and generated lower quality purity CNTs at 0.07, 10, 0.20, or 0.40 A/cm² in 40 wt % $SrCO_3$, 40 wt % $Li_2CO_3$, 15 wt % $Na_2CO_3$, and 5 wt % BaO electrolyte at 775° C.

Quinary and senary component strontium carbonate electrolytes provide a clear path to a further decrease in the expensive lithium carbonate component of molten carbonate $CO_2$ splitting electrolytes. Specifically, higher order mix strontium carbonate electrolytes are studied at 800° C. and 0.6 A/cm² of $CO_2$ splitting electrolysis. The 25% $Li_2CO_3$ electrolytes studied contain 62 wt % $SrCO_3$, 6 wt % $B_2O_3$, 2 wt % SrO and either 5% $Na_2CO_3$ (mp 851° C.) or 5% $SrCl_2$ (mp 874° C.) and exhibit a high purity CNT product. Although more expensive than strontium chloride, both strontium iodide (mp 645° C.) and strontium iodide (mp 645° C.) and strontium boride (mp 643° C.) have a lower melting point than strontium chloride, and are also promising molten strontium carbonate electrolyte components. Similarly, the senary 20% $Li_2CO_3$ electrolyte containing 62 wt % $SrCO_3$, 6 wt % $B_2O_3$, 2 wt % SrO, 5% $Na_2CO_3$ and 5% $SrCl_2$ and also exhibits a high purity CNT product as does the electrolysis product of a 20% $Li_2CO_3$ senary electrolyte containing 57 wt % $SrCO_3$, 5 wt % $B_2O_3$, 6 wt % SrO, 10% $Na_2CO_3$ and 2% $SrCl_2$. Finally, a senary 15%

Li$_2$CO$_3$ electrolyte that contains 62 wt % SrCO$_3$, 6 wt % B$_2$O$_3$, 2 wt % SrO, 5% Na$_2$CO$_3$ and 10% SrCl$_2$ also exhibits a good melt at 800° C.

Example 22 relates to use of a low-lithium carbonate electrolyte that comprises beryllium.

This example relates to a use of beryllium carbonate alone and in combination with alkali and alkali earth carbonates ability to act as a carbon capture agent.

When modelled, beryllium carbonate has a high capacity, carbon capture storage material. Carbon dioxide is stored in beryllium carbonate and is released in the reaction to CO$_2$ and beryllium oxide:

$$BeCO_3 \rightleftharpoons CO_2 + BeO \quad \text{(EQN 11)}$$

Amines are well known carbon capture absorbents and have been used in liquid form or are affixed to membranes to bind CO$_2$. Typically, the CO$_2$ is bound at a lower temperature and released in concentrated form at a higher temperature. Repeat low temperature binding and higher temperature release cycles are used to capture CO$_2$. Amino acids, amines and ionic liquids have also been utilized in temperature (or pressure) cycles to capture dilute CO$_2$ and release concentrated CO$_2$. Similarly, calcium carbonate is reversibly calcinated as a dry powder to calcium oxide, or as precipitated from an aqueous hydroxide solution has been used to capture dilute CO$_2$ at a lower temperature and, upon heating, release concentrated CO$_2$. Molten carbonate solutions have also been used to capture CO$_2$ with calcium oxide, reversibly forming calcium carbonate in the molten salt. Rather than just concentrating the CO$_2$, this process also stores this captured greenhouse gas by transforming it to solid carbon (and releasing the O$_2$ from the capture CO$_2$).

In Table 2, the various capacity of CO$_2$ captured, in typical units of kg CO$_2$ captured per kg absorbent, are compiled for common absorbents in the last column. The capacities are will be lower than those compiled when a matrix (such as an inert membrane or solvent stabilizer) is required as an additional mass component in the CO$_2$ carbon capture process. In order of increasing capacity, the absorbents are ionic liquids<amino acids & amines<calcium oxide (to calcium carbonate).

TABLE 2

The high carbon storage capacity of beryllium carbonate, sources: (1) S. Y. W. Chai, et al., Review of carbon capture absorbents for CO$_2$ utilization, *Greenhouse Gas Sci. Technol.*, 2022, 12, 394-427; (2) S. Licht, Efficient solar-driven synthesis, carbon capture and desalinization, STEP, *Advanced Materials*, 2011, 23, 5592-5612; (3) J. Ren et al., Recent advances in solar thermal electrochemical process (STEP) for carbon neutral products and high value nanocarbons, *Accounts of Chemical Research*, 2019, 52, 3177-3187.

| Chemical absorbent/product | Acronym | Formula | Formula Weight | CO$_2$ Storage Mechanism | Average Capacity, mol CO$_2$/mol absorbent | Source | Capacity, kg CO$_2$/kg absorbent |
|---|---|---|---|---|---|---|---|
| 1-Butyl-3-methylimidazolium bis(trifluoromethylsulfonyl)imide | [Bmim][Tf$_2$N] | C$_{10}$H$_{15}$F$_6$N$_3$O$_4$S$_2$ | 419.37 | ionic liquid absorbent | 0.68 | 1 | 0.07 |
| 1-aminopropyl-3-methylimidazolium tetraborafluorate/various products | APMim[BF4] | C$_7$H$_{14}$N$_3$BF$_4$ | 227.01 | ionic liquid absorbent | 0.34 | 1 | 0.07 |
| 1-Butyl-3-methylimidazolium hexafluorophosphate/"" products | [Bmim][PF$_6$] | C$_8$H$_{15}$F$_6$N$_2$P | 284.186 | ionic liquid absorbent | 0.51 | 1 | 0.08 |
| 1-Butyl-3-methylimidazolium tetrafluoroborate/various products | [Bmim][BF$_4$] | C$_8$H$_{15}$BF$_4$N$_2$ | 226.03 | ionic liquid absorbent | 0.44 | 1 | 0.09 |
| Taurine to protonated acid, HCO$_3^-$ or carbamate | | C$_2$H$_7$NO$_3$S | 125.14 | amino acid absorbent | 0.7 | 1 | 0.25 |
| Proline to protonated acid, HCO$_3^-$ or carbamate | | C$_5$H$_9$NO$_2$ | 115.132 | amino acid absorbent | 0.7 | 1 | 0.27 |
| Glycine to protonated acid, HCO$_3^-$ or carbamate | | C$_2$H$_5$NO$_2$ | 75.067 | amino acid absorbent | 0.6 | 1 | 0.35 |
| monoethanolamine to RNHCOO$^-$ | MEA | C$_5$H$_{13}$NO$_2$ | 61.08 | amine absorbent | 0.5 | 1 | 0.36 |
| diethanolamine to RNHCOO$^-$ | DEA | C$_4$H$_{11}$NO$_2$ | 105.14 | amine absorbent | 0.5 | 1 | 0.21 |
| methyldiethanolamine to "" | MDEA | C$_5$H$_{13}$NO$_2$ | 119.164 | amine absorbent | 1 | 1 | 0.37 |
| diethylethanolamine to "" | DEAE | C$_6$H$_{15}$NO | 117.192 | amine absorbent | 0.5 | 1 | 0.19 |
| calcium oxide to carbonate | | CaO | 56.08 | CaO + CO$_2$ -> CaCO$_3$ | 1 | 2 | 0.78 |
| lithium oxide to carbonate | | Li2O | 29.88 | Li$_2$O + CO$_2$ -> Li$_2$CO$_3$ | 1 | 3 | 1.47 |
| beryllium oxide to carbonate | | BeO | 24.01 | BeO + CO$_2$ -> BeCO$_3$ | 1 | | 1.83 |

The lithium carbonate/lithium oxide was introduced as amongst the highest carbon capture materials as delineated in the last row of Table 2 with a storage capacity of 1.47 kg $CO_2$ per kg $Li_2O$. Under argon gas, $Li_2CO_3$ entirely dissociates to $CO_2+Li_2O$ (L. Shi, et al., Process of thermal decomposition of lithium carbonate, in monograph Materials Processing Fundamentals, Springer International, 2020, ISBN: 9783030365561). Under even small partial pressures of $CO_2$, such as the 426 ppm (and rising) of $CO_2$ in the air, $Li_2CO_3$ only fractionally dissociates to $CO_2$, attaining a concentration of 0.3 molal $Li_2O$ per kg (J. Ren et al., The minimum electrolytic energy needed to convert carbon dioxide to carbon by electrolysis in carbonate melts, J. Phys. Chem. C, 2019, 52, 3177-3187). This high capacity was experimentally realized in the form of the electrolytic splitting of $CO_2$ in molten $Li_2CO_3$. The small concentration of dissolved lithium oxide sustained in molten lithium carbonate under air is sufficient to support high $CO_2$ splitting electrochemical current and continuous renewal of the molten $Li_2CO_3$ electrolyte.

Beryllium carbonate is as an even lower molecular weight (per carbon dioxide stored) salt. As calculated and included in the last row of Table 2, beryllium oxide with a 1.83 kg $CO_2$/kg absorbent has even higher potential storage capacity than lithium oxide. In addition to the general need for effective carbon dioxide trapping materials to mitigate $CO_2$ induced global warming and climate change, an example of the need for lightweight carbon-capture materials for $CO_2$ air scrubbing, such as needed by submersibles, submarines, and spacecraft. At first consideration, beryllium carbonate could be disregarded for carbon mitigation due to the potential toxicity of beryllium oxide as a powder and the potential for inhalation or digestion of that powder. However, it is demonstrated that this beryllium carbonate carbon dioxide scrubbing method does not result in the formation of powdered BeO, but rather forms molten $BeO_y \cdot (BeCO_3)_y$, and the BeO is contained within the molten $BeO_y \cdot (BeCO_3)$ y mixture. At the highest $CO_2$ release temperatures, which approach the formation of pure BeO; due to the high temperature, BeO forms a sintered, rather than as an easily dispersible powder. With a melting point of 54° C., $BeCO_3$ has the lowest melting point, by over 300° C., of any combination of other alkali or alkali earth carbonates. Beryllium carbonate is less prevalent as a salt than lithium or strontium carbonate, and its oxide under certain circumstances has a higher toxicity. However, the storage of $CO_2$ by $BeCO_3$ serves as a model towards amongst the highest carbon storage capacity materials and lowest mass $CO_2$ scrubbers. Additionally, it is shown that $BeCO_3$ can lower the melting point of other alkali/alkali earth carbonates useful for molten carbonate electrolysis.

Figure 25:
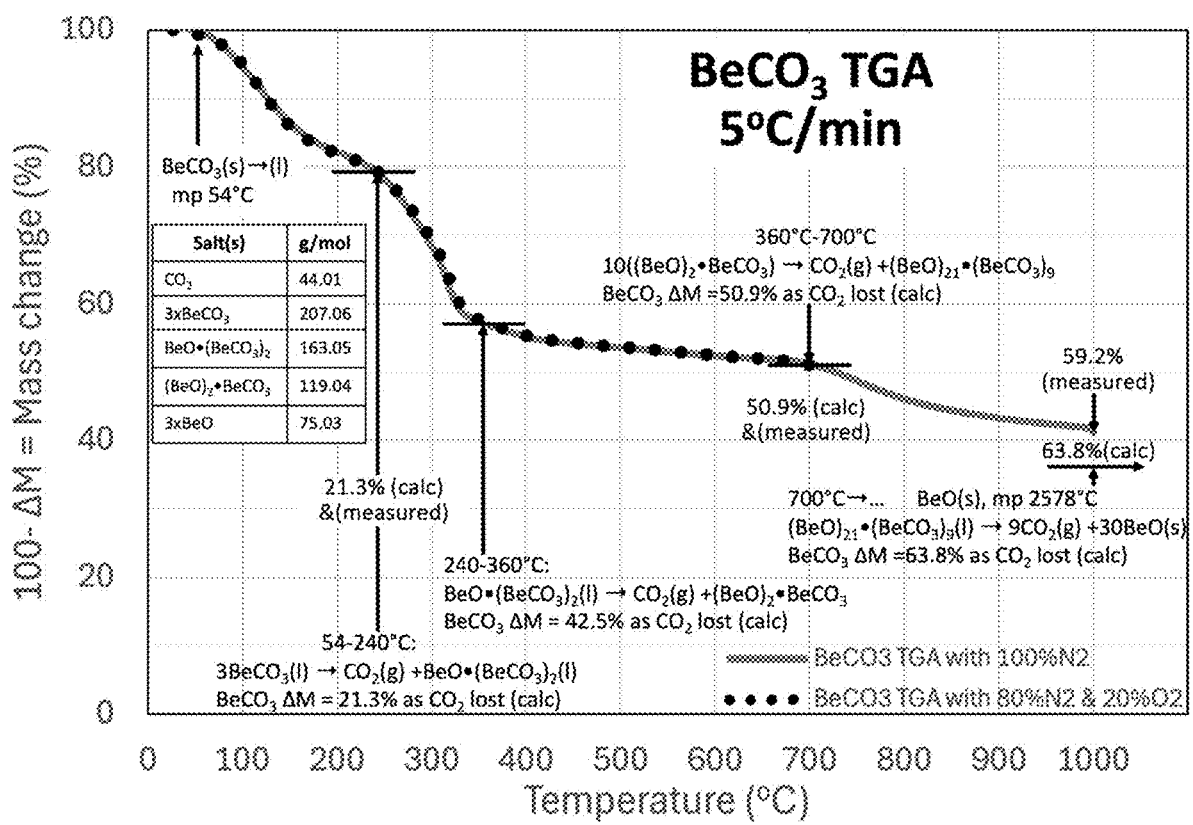
FIG. 25 shows TGA analysis of beryllium carbonate.

FIG. 25 presents the TGA results of beryllium carbonate conducted starting from 30° C., with a 5° C. temperature increase per minute, and in atmospheres of either (1) 80% $N_2$/20% $O_2$ gas mix shown in the orange curve from 30 to 730° C. or (2) 100% $N_2$ shown in the blue curve from 30° C. to 1000° C. In the figure, the known 54° C. melting of $BeCO_3$ is shown. The equivalence of the curves with or without an atmosphere containing $O_2$ provides primary evidence that $O_2$ is neither evolved or absorbed by beryllium carbonate during the TGA, and support the notion that within molten species related to $O_2$, including oxides, peroxides and superoxides, those species are not participants in reactions related to the TGA temperature sweep.

FIG. 25 includes a first interpretation of that TGA. This is an observation of the observed TGA events. The interpretation is without wishing to be bound by any particularly theory. Above 54° C. beryllium carbonate rapidly evolves $CO_2$ upon melting (at increasing temperature the release of $CO_2$ from $BeCO_3$ is an exergonic, spontaneous reaction). Salts evolving $CO_2$ from the liquid, as opposed to from the solid form, facilitate the rapid release of $CO_2$ and the concurrent observed increased rate of mass loss acts as an indicator of the melting point of that salt. In solid salts that can release $CO_2$ by decomposition, $CO_2$ release is constrained by the slow diffusion of $CO_2$ to the solid surface, whereas in the molten state, the liquid surface is continuously replenished sustaining facile $CO_2$ access to the surface. The mass loss and temperature are noted at the start of rapid mass declines with increasing temperature in the figure, and a mechanism of $CO_2$ mass loss is then determined by calculating mass consistent changes of chemical formulas of calcinated beryllium oxide and beryllium carbonate salts.

As seen in FIG. 25, the molten $BeCO_3$ evolves $CO_2$ to become molten BeO. $(BeCO_3)_2$ from about 54° C. to about 240° C., consistent with the equivalence of both the observed and the calculated mass loss of 21.3% when one $CO_2$ is evolved from $3BeCO_3$ to become $BeO \cdot (BeCO_3)_2$. and the rapid mass loss indicative of facile $CO_2$ evolution from a liquid. At increasing temperature, the molten $BeO \cdot (BeCO_3)_2$ then evolves $CO_2$ to become $(BeO)_2 \cdot BeCO_3$ from about 240° C. to about 360° C.; again as determined by the equivalence of both the observed and the calculated mass loss of 42.5%. This $(BeO)_2 \cdot BeCO_3$ formed from 360° C. to about 700° C., as evidenced by the slow rate of $CO_2$ evolution mass loss over this temperature range, has either a lower thermodynamic drive to release $CO_2$, or has reverted to the solid phase. At 700° C. the observed and calculated mass change of 50.9% is consistent with the loss of one $CO_2$ from ten $(BeO)_2 \cdot BeCO_3$ to the product $(BeO)_{21} \cdot (BeCO_3)_9$ or a similar analog. With increasing temperature from 700° C., the increased rate of mass loss, gives evidence that this product is molten or a volatile $CO_2$ evolving. Finally, this product then evolves $CO_2$ to become BeO from about 700° C. onward. As the product of the $CO_2$ loss is a solid, high melting point BeO (mp 2578° C.). The solid, rather than molten, nature of the increasing BeO product inhibits the measured rate of $CO_2$ mass loss, and by 1000° C. the mass observed mass loss has reached 59.2% of the full, calculated 63.8% $CO_2$ mass loss from $BeCO_3$. Holding the temperature at 1000° C. for 4 more hours resulted in a further mass loss of 1.2% to 60.4% of the full, calculated 63.8% $CO_2$ mass loss from $BeCO_3$. Note, that a range of BeO and $BeCO_3$ admixtures comprises $(BeO)_x \cdot (BeCO_3)$ y, wherein x any number greater than or equal to 0 and wherein y equals any number greater than or equal 0. When $X_{initial}$ equals the number of moles in the initial pure $BeCO_3$ used in the TGA scan, then in the final state the number of moles of BeO upon complete release of $CO_2$ is x=y; as one example when $X_{initial}$=30:

$$30BeCO_3 \rightarrow 30CO_2 + 30BeO \quad \text{(EQN 12)}$$

During the $CO_2$ evolution process, all intermediate values of $(BeO)_x \cdot (BeCO_3)_y$, where x=30 to 0 and y=0 to 30 are, in principle, viable admixtures or intermediates. However, 30 is not an upper value of x or y, and, in principle, higher values are possible.

The kinetic and thermodynamic driven release of $CO_2$ by heating beryllium carbonate and beryllium oxide/beryllium carbonate intermediate compounds has been demonstrated.

Similarly, these compounds also release $CO_2$ by reducing the pressure over those compounds, or simultaneously by heating and reducing the $CO_2$ pressure of those compounds. Thermodynamically the opposing process, the storage of $CO_2$ by beryllium oxide and/or beryllium oxide/beryllium carbon intermediates compounds is energetically favored by the reverse process of cooling or pressurizing under $CO_2$ those compounds. Beryllium oxide is stable, and this stability to its reaction with $CO_2$ can be overcome by introducing kinetic facilitation to increase the rate of $CO_2$ uptake with cooling and/or with pressurized $CO_2$.

Energetically, the storage of the $CO_2$ by cooling or pressurizing berylium carbonate and/or beryllium oxide/beryllium carbonate intermediate compounds can facilitate by several means including, but not limited to: (i) bubbling the $CO_2$ through the various molten (liquid phase) stages of those compounds or forming a liquid aerosol of these compounds combined with $CO_2$, (ii) increasing the surface area of the various solid phase stages of those compounds, such as by forming a powder, solid aerosol, or fixing those compounds to a high surface membrane or aerogel and combining with $CO_2$, (iii) introducing the $CO_2$ by mixing with a combined solid and liquid phase (slush) of those compounds, (iv) or a multistep reaction to incorporate $CO_2$ into beryllium oxide such as, but not limited to: (iv-a) the facile reaction of $CO_2$ with ammonium compounds to form ammonium carbonates; (iv-b) the reaction of beryllium oxide with sulfate compounds to form beryllium sulfates, followed by (iv-c) the facile reaction of ammonium carbonates and beryllium sulfates to form beryllium carbonates.

Figure 26:
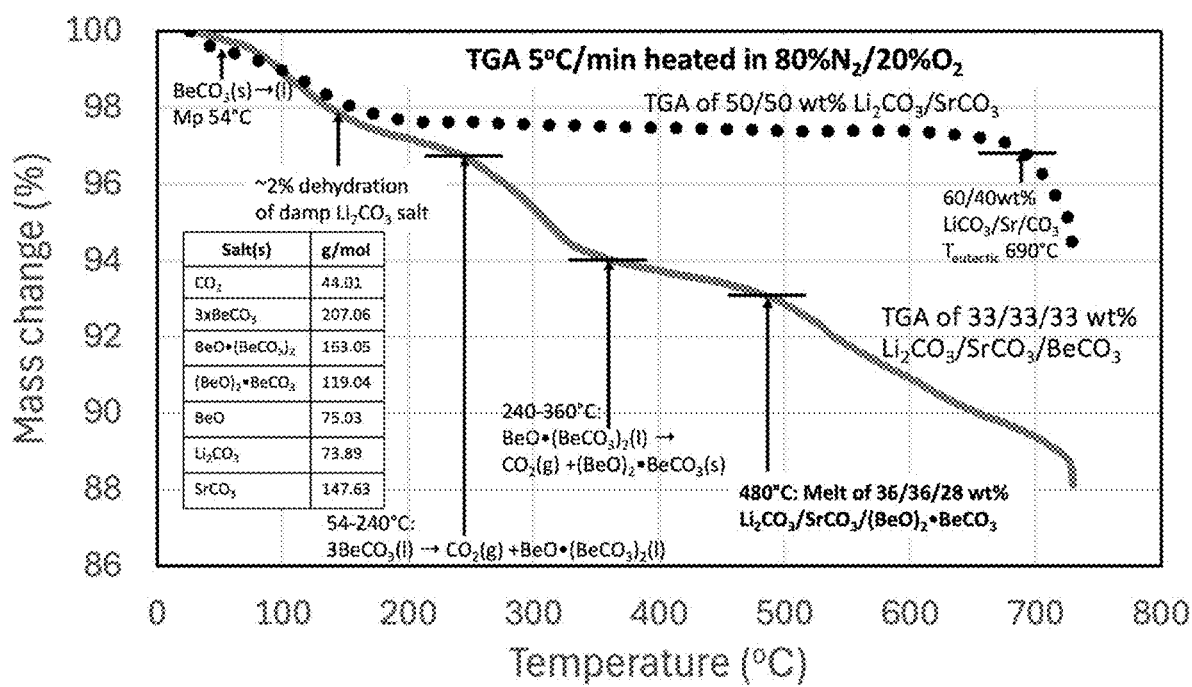
FIG. 26 shows TGA analysis of strontium carbonate and lithium carbonate with and without beryllium carbonate.

The low-lithium carbonate electrolytes made as a mixture of strontium carbonate or strontium oxide are substantially less expensive than comparable lithium-carbonate based electrolytes. The use of an electrolyte that is a binary mixture (for example, strontium carbonate/lithium carbonate or strontium oxide/lithium carbonate) and/or an electrolyte that is a ternary mixture (for example, strontium/sodium/lithium carbonate) and that can provide an electrolyte melting point within the optimal range for $CO_2$ to carbon nanomaterial growth of between about 700° C. to about 850° C. is preferred. Low-lithium carbonate electrolysis may be performed using a planar, rather than a coiled, and brass, rather than Monel, cathode without substantially affecting low-lithium CNT growth While $SrCO_3$ has a melting point of 1194° C., a binary mix of $SrCO_3$ and $Li_2CO_3$ has a melting point of 690° C. to 790° C., as the weight percent of $SrCO_3$ in the binary mix increases from 40 to 65%. FIG. 26 demonstrates that the melting point is further substantially decreased by inclusion of $BeCO_3$ in a ternary mix. Specifically, FIG. 26. compares the TGA's of a binary mix 50/50 wt % $Li_2CO_3/SrCO_3$ to that of a ternary mix composed one third by weight each in $Li_2CO_3$, $SrCO_3$, $BeCO_3$ conducted starting from 30° C., with a 5° C. temperature increase per minute, and under an 80% $N_2$/20% $O_2$ gas mix. In the TGA of the binary mix of 50/50 wt % $Li_2CO_3/SrCO_3$ a few percent weight loss is evident at low temperature as the damp material dries, then the mass is moderately constant, decreasing slowly, until a rapid weight loss occurs around the 690° C. melting point observed for a $Li_2CO_3/SrCO_3$ mixture. Alternatively, in addition to the low temperature drying, the 33/33/33 wt % $Li_2CO_3/SrCO_3/BeCO_3$ ternary mix exhibits the hallmarks of pure $BeCO_3$ up to a temperature of 360° C. However, in addition, another sharper decreases in mass loss is observed starting at 480° C. These are attributed to the melting point of new lower melting ternary mixes of $Li_2CO_3/SrCO_3/BeO$ $(BeCO_3)_2$ and specifically of 36/36/28 wt % $Li_2CO_3/SrCO_3/$ BeO, and taking into account the loss of $CO_2$ from the original $BeCO_3$ in the formation of BeO. Hence, through the inclusion of $BeCO_3$, an inorganic carbonate mix can have a lower melting point than the mix without $BeCO_3$. Similarly, a carbon dioxide capture compound can include a binary, ternary, quaternary or higher component mix of beryllium carbonate or beryllium oxide with other alkali or alkali earth carbonates, or salts that include an element from column 4, 5, 6 or 7 of the periodic table of elements can affect the melting point of beryllium compounds used as a carbon dioxide capture and release compound for use in methods for carbon dioxide capture.

We claim:

1. A method for capturing and releasing carbon dioxide comprising:
    (a) heating a beryllium carbonate containing compound to form a lower carbon dioxide content compound and releasing a first carbon dioxide containing gas;
    (b) cooling the lower carbon dioxide content compound in a presence of a second carbon dioxide containing gas to reform the beryllium carbonate containing compound; and
    (c) cycling step b to capture carbon dioxide from the second carbon dioxide containing gas, wherein the first carbon dioxide containing gas has a higher carbon dioxide content than the second carbon dioxide containing gas, and
    (d) facilitating step (b) by one or more of:
        (i) forming a liquid aerosol of the molten beryllium carbonate and/or beryllium oxide and combining with the second carbon dioxide containing gas;
        (ii) forming a powder or solid aerosol of the molten beryllium carbonate and/or the beryllium oxide and combining with the second carbon dioxide containing gas;
        (iii) fixing the beryllium carbonate and/or the beryllium oxide to a high surface membrane or aerogel and combining with the second carbon dioxide containing gas; or
        (iv) reacting the second carbon dioxide containing gas with a compound that comprises ammonium for making an ammonium carbonate and reacting a beryllium sulfate made by combining the beryllium carbonate and/or the beryllium oxide with a sulfate containing compound, then reacting the ammonium carbonate with the beryllium carbonate.

2. The method of claim 1, wherein the beryllium carbonate containing compound comprises $(BeO)_x \cdot (BeCO_3)_y$, wherein x is 0 or higher than 0 and wherein y is greater than 0.

3. The method of claim 1, wherein the beryllium carbonate containing compound comprises an alkali carbonate, an alkali earth carbonate or any combination thereof.

4. The method of claim 1, wherein the beryllium carbonate containing compound comprises a salt that comprises one or more elements from column 4, 5, 6 or 7 from the periodic table of elements.

5. The method of claim 1, wherein the beryllium carbonate containing compound is a binary, ternary, quaternary or higher component mix of beryllium carbonate or beryllium oxide with at least one of an alkali carbonate, an alkali earth carbonate, or a salt that comprises an element from column 4, 5, 6 or 7 of the periodic table of elements.

6. A method for capturing and releasing carbon dioxide comprising:
   (a) depressuring a beryllium carbonate containing compound to form a lower carbon dioxide content compound and releasing a first carbon dioxide containing gas;
   (b) pressurizing the lower carbon dioxide content compound in a presence of a second carbon dioxide containing gas to reform the beryllium carbonate containing compound; and
   (c) cycling step b to capture carbon dioxide from the second carbon dioxide containing gas, wherein the first carbon dioxide containing gas has a higher carbon dioxide content than the second carbon dioxide containing gas, and
   (d) facilitating step (b) by one or more of:
      (i) forming a liquid aerosol of the molten beryllium carbonate and/or beryllium oxide and combining with the second carbon dioxide containing gas;
      (ii) forming a powder or solid aerosol of the molten beryllium carbonate and/or the beryllium oxide and combining with the second carbon dioxide containing gas;
      (iii) fixing the beryllium carbonate and/or the beryllium oxide to a high surface membrane or aerogel and combining with the second carbon dioxide containing gas; or
      (iv) reacting the second carbon dioxide containing gas with a compound that comprises ammonium for making an ammonium carbonate and reacting a beryllium sulfate made by combining the beryllium carbonate and/or the beryllium oxide with a sulfate containing compound, then reacting the ammonium carbonate with the beryllium carbonate.

7. The method of claim 6, wherein the beryllium carbonate containing compound comprises $xBeO \cdot y(BeCO_3)$ wherein x is 0 or higher than 0 and wherein y is greater than 0.

8. The method of claim 6, wherein the beryllium carbonate containing compound comprises an alkali carbonate, an alkali earth carbonate or any combination thereof.

9. The method of claim 6, wherein the beryllium carbonate containing compound comprises a salt that comprises one or more elements from column 4, 5, 6 or 7 of the periodic table of elements.

10. The method of claim 6, wherein the beryllium carbonate containing compound is a binary, ternary, quaternary or higher component mix of beryllium carbonate or beryllium oxide with at least one of an alkali carbonate, an alkali earth carbonate, or a salt that comprises an element from column 4, 5, 6 or 7 of the periodic table of elements.

11. A method for capturing and releasing carbon dioxide comprising:
   (a) depressuring and heating a beryllium carbonate containing compound to form a lower carbon dioxide content compound and releasing a first carbon dioxide containing gas;
   (b) pressuring and cooling the lower carbon dioxide content compound in a presence of a second carbon dioxide containing gas to reform the beryllium carbonate containing compound; and
   (c) cycling step b to capture carbon dioxide from the second carbon dioxide containing gas, wherein the first carbon dioxide containing gas has a higher carbon dioxide content than the second carbon dioxide containing gas, and
   (d) facilitating step (b) by one or more of:
      (i) forming a liquid aerosol of the molten beryllium carbonate and/or beryllium oxide and combining with the second carbon dioxide containing gas;
      (ii) forming a powder or solid aerosol of the molten beryllium carbonate and/or the beryllium oxide and combining with the second carbon dioxide containing gas;
      (iii) fixing the beryllium carbonate and/or the beryllium oxide to a high surface membrane or aerogel and combining with the second carbon dioxide containing gas; or
      (iv) reacting the second carbon dioxide containing gas with a compound that comprises ammonium for making an ammonium carbonate and reacting a beryllium sulfate made by combining the beryllium carbonate and/or the beryllium oxide with a sulfate containing compound, then reacting the ammonium carbonate with the beryllium carbonate.

12. The method of claim 11, wherein the beryllium carbonate containing compound comprises $xBeO \cdot y(BeCO_3)$ wherein x is 0 or higher than 0 and wherein y is greater than 0.

13. The method of claim 11, wherein the beryllium carbonate containing compound comprises an alkali carbonate, an alkali earth carbonate or any combination thereof.

14. The method of claim 11, wherein the beryllium carbonate containing compound comprises a salt that comprises one or more elements from column 4, 5, 6 or 7 from the periodic table of elements.

15. The method of claim 11, wherein the beryllium carbonate containing compound is a binary, ternary, quaternary or higher component mix of beryllium carbonate or beryllium oxide with at least one of an alkali carbonate, an alkali earth carbonate, or a salt that comprises an element from column 4, 5, 6 or 7 of the periodic table of elements.

* * * * *